US011310859B2

(12) United States Patent
Zhou et al.

(10) Patent No.: US 11,310,859 B2
(45) Date of Patent: *Apr. 19, 2022

(54) CONFIGURATION FOR BEAM FAILURE RECOVERY

(71) Applicant: Comcast Cable Communications, LLC, Philadelphia, PA (US)

(72) Inventors: Hua Zhou, Herndon, VA (US); Esmael Dinan, McLean, VA (US); Ali Cirik, Herndon, VA (US); Alireza Babaei, Fairfax, VA (US); Hyoungsuk Jeon, Centreville, VA (US); Kyungmin Park, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/157,352

(22) Filed: Jan. 25, 2021

(65) Prior Publication Data

US 2021/0144794 A1    May 13, 2021

Related U.S. Application Data

(63) Continuation of application No. 16/370,476, filed on Mar. 29, 2019, now Pat. No. 10,904,940.

(Continued)

(51) Int. Cl.
*H04W 76/19* (2018.01)
*H04B 7/08* (2006.01)
(Continued)

(52) U.S. Cl.
CPC .............. *H04W 76/19* (2018.02); *H04B 7/06* (2013.01); *H04B 7/08* (2013.01); *H04W 72/02* (2013.01);
(Continued)

(58) Field of Classification Search
CPC ..... H04W 76/19; H04W 72/02; H04W 72/04; H04W 72/0413; H04W 72/042; H04W 72/046; H04B 7/06; H04B 7/08
See application file for complete search history.

(56) References Cited

U.S. PATENT DOCUMENTS 9,125,218 B2   9/2015  Chang
9,736,795 B2   8/2017  Dinan
(Continued)

FOREIGN PATENT DOCUMENTS

CN    108809580 A    11/2018
EP    3397015 A1    10/2018
(Continued)

OTHER PUBLICATIONS

R1-1704478 3GPP TSG RAN WG1 Meeting #88bis, Spokane, USA, Apr. 3-7, 2017, Source: Fujitsu, Title: Discussion on beam failure recovery procedure.

(Continued)

*Primary Examiner* — Jaison Joseph
(74) *Attorney, Agent, or Firm* — Banner & Witcoff, Ltd.

(57) ABSTRACT

Systems, apparatuses, and methods are described for wireless communications. A base station may indicate one or more resources for beam failure recovery. The one or more resources may comprise one or more resources for downlink transmission and one or more resources for uplink transmission. A beam failure may be determined based on the one or more resources for downlink transmission. A wireless device may send, based on the one or more resources for uplink transmission, uplink information for beam failure recovery.

73 Claims, 27 Drawing Sheets

Related U.S. Application Data

(60) Provisional application No. 62/650,725, filed on Mar. 30, 2018.

(51) Int. Cl.
*H04W 72/02* (2009.01)
*H04W 72/04* (2009.01)
*H04B 7/06* (2006.01)

(52) U.S. Cl.
CPC ......... *H04W 72/04* (2013.01); *H04W 72/042* (2013.01); *H04W 72/046* (2013.01); *H04W 72/0413* (2013.01)

(56) References Cited

U.S. PATENT DOCUMENTS

| | | | |
|---|---|---|---|
| 9,949,298 B1 | 4/2018 | Akoum et al. | |
| 2010/0279700 A1 | 11/2010 | Kim et al. | |
| 2013/0039345 A1 | 2/2013 | Kim et al. | |
| 2013/0188580 A1 | 7/2013 | Dinan | |
| 2013/0250828 A1 | 9/2013 | Chou et al. | |
| 2015/0189574 A1 | 7/2015 | Ng et al. | |
| 2015/0208462 A1 | 7/2015 | Lee et al. | |
| 2015/0365921 A1 | 12/2015 | Wu | |
| 2017/0195998 A1 | 7/2017 | Zhang et al. | |
| 2017/0207843 A1 | 7/2017 | Jung et al. | |
| 2017/0332406 A1 | 11/2017 | Islam et al. | |
| 2017/0339662 A1 | 11/2017 | Lin et al. | |
| 2017/0373731 A1 | 12/2017 | Guo et al. | |
| 2018/0006770 A1 | 1/2018 | Guo et al. | |
| 2018/0054348 A1 | 2/2018 | Luo et al. | |
| 2018/0054382 A1 | 2/2018 | Luo et al. | |
| 2018/0054783 A1 | 2/2018 | Luo et al. | |
| 2018/0054811 A1 | 2/2018 | Luo et al. | |
| 2018/0054812 A1 | 2/2018 | Luo et al. | |
| 2018/0054832 A1 | 2/2018 | Luo et al. | |
| 2018/0083753 A1* | 3/2018 | Nagaraja | H04L 5/0048 |
| 2018/0098334 A1* | 4/2018 | Tie | H04W 4/70 |
| 2018/0110066 A1 | 4/2018 | Luo et al. | |
| 2018/0115940 A1 | 4/2018 | Abedini et al. | |
| 2018/0115990 A1 | 4/2018 | Abedini et al. | |
| 2018/0124687 A1 | 5/2018 | Park et al. | |
| 2018/0132266 A1 | 5/2018 | Chen et al. | |
| 2018/0138962 A1 | 5/2018 | Islam et al. | |
| 2018/0176958 A1 | 6/2018 | Islam et al. | |
| 2018/0191422 A1* | 7/2018 | Xia | H04B 7/061 |
| 2018/0219604 A1 | 8/2018 | Lu et al. | |
| 2018/0220448 A1 | 8/2018 | Akkarakaran et al. | |
| 2018/0227899 A1 | 8/2018 | Yu et al. | |
| 2018/0234960 A1* | 8/2018 | Nagaraja | H04W 72/046 |
| 2018/0241452 A1 | 8/2018 | Akkarakaran et al. | |
| 2018/0249453 A1 | 8/2018 | Nagaraja et al. | |
| 2018/0270698 A1 | 9/2018 | Babaei et al. | |
| 2018/0270699 A1 | 9/2018 | Babaei et al. | |
| 2018/0270700 A1 | 9/2018 | Babaei et al. | |
| 2018/0278310 A1* | 9/2018 | Lee | H04B 7/0645 |
| 2018/0279150 A1 | 9/2018 | He et al. | |
| 2018/0279193 A1 | 9/2018 | Park et al. | |
| 2018/0279229 A1 | 9/2018 | Dinan et al. | |
| 2018/0288756 A1* | 10/2018 | Xia | H04W 72/042 |
| 2018/0302889 A1* | 10/2018 | Guo | H04B 7/0617 |
| 2018/0310321 A1 | 10/2018 | Basu Mallick et al. | |
| 2018/0317123 A1 | 11/2018 | Chen et al. | |
| 2018/0323856 A1* | 11/2018 | Xiong | H04L 1/16 |
| 2018/0324723 A1 | 11/2018 | Akkarakaran et al. | |
| 2018/0324867 A1 | 11/2018 | Basu Mallick et al. | |
| 2018/0343653 A1* | 11/2018 | Guo | H04W 16/28 |
| 2018/0351611 A1* | 12/2018 | Nagaraja | H04W 56/0065 |
| 2018/0367374 A1 | 12/2018 | Liu et al. | |
| 2018/0368126 A1* | 12/2018 | Islam | H04L 5/1469 |
| 2018/0368142 A1 | 12/2018 | Liou | |
| 2019/0028174 A1* | 1/2019 | Chakraborty | H04B 7/0408 |
| 2019/0037423 A1* | 1/2019 | Yu | H04W 74/0833 |
| 2019/0037498 A1 | 1/2019 | Tseng et al. | |
| 2019/0059129 A1 | 2/2019 | Luo et al. | |
| 2019/0074882 A1 | 3/2019 | Zhou et al. | |
| 2019/0075014 A1* | 3/2019 | Zhou | H04W 72/042 |
| 2019/0103908 A1* | 4/2019 | Yu | H04B 7/0851 |
| 2019/0141552 A1* | 5/2019 | Chen | H04W 24/08 |
| 2019/0173740 A1 | 6/2019 | Zhang et al. | |
| 2019/0268893 A1* | 8/2019 | Tsai | H04W 76/19 |
| 2019/0306850 A1* | 10/2019 | Zhang | H04L 5/0044 |
| 2019/0349061 A1* | 11/2019 | Cirik | H04W 80/02 |
| 2020/0178338 A1* | 6/2020 | Ahn | H04B 7/0626 |

FOREIGN PATENT DOCUMENTS

| | | |
|---|---|---|
| EP | 3424152 A1 | 1/2019 |
| WO | 2013025142 A1 | 2/2013 |
| WO | 2017024516 A1 | 2/2017 |
| WO | 2017123060 A1 | 7/2017 |
| WO | 2017135803 A1 | 8/2017 |
| WO | 2017151876 A1 | 9/2017 |
| WO | 2017196612 A1 | 11/2017 |
| WO | 2017217898 A1 | 12/2017 |
| WO | 2018017840 A1 | 1/2018 |
| WO | 2018031327 A1 | 2/2018 |
| WO | 2018031799 A1 | 2/2018 |
| WO | 2018038859 A1 | 3/2018 |
| WO | 2018038860 A1 | 3/2018 |
| WO | 2018038861 A1 | 3/2018 |
| WO | 2018038862 A1 | 3/2018 |
| WO | 2018038864 A1 | 3/2018 |
| WO | 2018075985 A1 | 4/2018 |
| WO | 2018084544 A1 | 5/2018 |
| WO | 2018128426 A1 | 7/2018 |
| WO | 2018129300 A1 | 7/2018 |
| WO | 2018136300 A1 | 7/2018 |
| WO | 2018141303 A1 | 8/2018 |
| WO | 2018144592 A1 | 8/2018 |
| WO | 2018148552 A1 | 8/2018 |
| WO | 2018156299 A1 | 8/2018 |
| WO | 2018156696 A1 | 8/2018 |
| WO | 2018169848 A1 | 9/2018 |
| WO | 2018170481 A1 | 9/2018 |
| WO | 2018171476 A1 | 9/2018 |
| WO | 2018174667 A1 | 9/2018 |
| WO | 2018174800 A1 | 9/2018 |
| WO | 2018175303 A1 | 9/2018 |
| WO | 2018190617 A1 | 10/2018 |
| WO | 2018195975 A1 | 11/2018 |
| WO | 2018196520 A1 | 11/2018 |
| WO | 2018199074 A1 | 11/2018 |
| WO | 2018199079 A1 | 11/2018 |
| WO | 2018199100 A1 | 11/2018 |
| WO | 2018199162 A1 | 11/2018 |
| WO | 2018199243 A1 | 11/2018 |
| WO | 2018200579 A1 | 11/2018 |
| WO | 2018201450 A1 | 11/2018 |
| WO | 2018201990 A1 | 11/2018 |
| WO | 2018203719 A1 | 11/2018 |
| WO | 2018203785 A1 | 11/2018 |
| WO | 2018204255 A1 | 11/2018 |
| WO | 2018204718 A1 | 11/2018 |
| WO | 2018204922 A1 | 11/2018 |
| WO | 2018222276 A1 | 12/2018 |
| WO | 2018227464 A1 | 12/2018 |
| WO | 2018227551 A1 | 12/2018 |
| WO | 2018228187 A1 | 12/2018 |
| WO | 2018230862 A1 | 12/2018 |
| WO | 2018231655 A1 | 12/2018 |
| WO | 2018232090 A1 | 12/2018 |
| WO | 2018232259 A1 | 12/2018 |
| WO | 2018237400 A1 | 12/2018 |
| WO | 2019004694 A1 | 1/2019 |
| WO | 2019032882 A1 | 2/2019 |

OTHER PUBLICATIONS

R1-1704723 3GPP TSG RAN WG1 Meeting #88bis, Spokane, USA, Apr. 3-7, 2017, Source: Intel Corporation, Title: Details for UL Beam Management.

(56) References Cited

OTHER PUBLICATIONS

R1-1704725 3GPP TSG RAN WG1 Meeting #88bis, Spokane, USA, Apr. 3-7, 2017, Source: Intel Corporation, Title: On UE Initiated Beam Recovery.
R1-1705582 3GPP TSG RAN WG1 Meeting #88bis, Spokane, USA, Apr. 3-7, 2017, Source: Qualcomm Incorporated, Title: Beam recovery procedures.
R1-1705893 3GPP TSG RAN WG1 Meeting #88bis, Spokane, USA, Apr. 3-7, 2017, Source: Ericsson, Title: Beam failure detection and beam recovery actions.
R1-1705961 3GPP TSG RAN WG1 Meeting #88bis, Spokane, USA, Apr. 3-7, 2017, Source: Nokia, Alcatel-Lucent Shanghai Bell, Title: Beam Recovery in NR.
R1-1706928 3GPP TSG RAN WG1 Meeting #89, Hangzhou, China, May 15-19, 2017, Source: Huawei, HiSilicon, Title: Beam management across multiple carriers.
R1-1707255 3GPP TSG RAN WG1 Meeting #89, Hangzhou, China, May 15-19, 2017, Source: Fujitsu, Title: Discussion on beam failure recovery procedure.
R1-1707356 3GPP TSG RAN WG1 Meeting #89, Hangzhou, China, May 15-19, 2017, Source: Intel Corporation, Title: Discussion for Mechanism to Recover from Beam Failure.
R1-1707477 3GPP TSG RAN WG1 Meeting #89, Hangzhou, China, May 15-19, 2017, Source: CATT, Title: Discussion on DL beam recovery.
R1-1707698 3GPP TSG RAN WG1 Meeting #89, Hangzhou, China, May 15-19, 2017, Source: Guangdong OPPO Mobile Telecom, Title: On Beam Recovery Mechanism.
R1-1707782 3GPP TSG RAN WG1 Meeting #89, Hangzhou, China, May 15-19, 2017, Source: Spreadtrum Communications, Title: Discussion on UE initiated recovery from beam failure.
R1-1707814 3GPP TSG RAN WG1 Meeting #89, Hangzhou, China, May 15-19, 2017, Source: NEC, Title: Low latency beam failure recovery by PRACH/PRACH-like.
R1-1707954 3GPP TSG RAN WG1 Meeting #89, Hangzhou, China, May 15-19, 2017, Source: Samsung, Title: Discussion on beam recovery procedure.
R1-1708678 3GPP TSG RAN WG1 Meeting #89, Hangzhou, China, May 15-19, 2017, Source: Ericsson, Title: Beam failure recovery mechanism.
R1-1708905 3GPP TSG RAN WG1 Meeting #89, Hangzhou, China, May 15-19, 2017, Source: Nokia, Alcatel-Lucent Shanghai Bell, Title: Beam Recovery.
R1-1710144 3GPP TSG RAN WG1 NR Ad-Hoc #2, Qingdao, China, Jun. 27-30, 2017, Source: Guangdong OPPO Mobile Telecom, Title: On Beam Recovery Mechanism.
R1-1710185 3GPP TSG RAN WG1 NR Ad-Hoc #2, Qingdao, China, Jun. 27-30, 2017, Source: ZTE, Title: Discussion on beam recovery mechanism.
R1-1710527 3GPP TSG RAN WG1 NR Ad-Hoc #2, Qingdao, China, Jun. 27-30, 2017, Source: Intel Corporation, Title: Discussion for mechanism to recover from beam failure.
R1-1710655 3GPP TSG RAN WG1 NR Ad-Hoc #2, Qingdao, China, Jun. 27-30, 2017, Source: Samsung, Title: Beam failure recovery.
R1-1714251 3GPP TSG RAN WG1 Meeting #90, Prague, Czech Republic, Aug. 21-25, 2017, Source: Nokia, Nokia Shanghai Bell, Title: Beam recovery in NR.
R1-1715468 3GPP TSG RAN WG1 Meeting NR#3, Nagoya, Japan, Sep. 18-21, 2017, Source: Huawei, HiSilicon, Title: Beam Failure Recovery Design Details.
R1-1715860 3GPP TSG RAN WG1 Meeting NR#3, Nagoya, Japan, Sep. 18-21, 2017, Source: LG Electronics, Title: Discussion on beam failure recovery.
R1-1800362 3GPP TSG RAN WG1 Meeting AH 1801, Vancouver, Canada, Jan. 22-26, 2018, Source: LG Electronics, Title: Clarification on PDCCH beam indication by higher-layers.
R1-1800363 3GPP TSG RAN WG1 Meeting AH 1801, Vancouver, Canada, Jan. 22-26, 2018, Source: LG Electronics, Title: Text proposals on UL beam management.
R1-1800364 3GPP TSG RAN WG1 Meeting AH 1801, Vancouver, Canada, Jan. 22-26, 2018, Source: LG Electronics, Title: Discussion on PHY and MAC operation for beam failure recovery.
R1-1800401 3GPP TSG RAN WG1 Meeting AH 1801, Vancouver, Canada, Jan. 22-26, 2018, Source: Lenovo, Motorola Mobility, Title: Corrections on beam management.
R1-1800402 3GPP TSG RAN WG1 Meeting AH 1801, Vancouver, Canada, Jan. 22-26, 2018, Source: Lenovo, Motorola Mobility, Title: Corrections on beam failure recovery.
R1-1800432 3GPP TSG RAN WG1 Meeting AH 1801, Vancouver, Canada, Jan. 22-26, 2018, Source: Samsung, Title: Issues on beam management.
R1-1800433 3GPP TSG RAN WG1 Meeting AH 1801, Vancouver, Canada, Jan. 22-26, 2018, Source: Samsung, Title: Aperiodic beam reporting.
R1-1800434 3GPP TSG RAN WG1 Meeting AH 1801, Vancouver, Canada, Jan. 22-26, 2018, Source: Samsung, Title: Issues on beam failure recovery.
R1-1800472 3GPP TSG RAN WG1 Meeting AH 1801, Vancouver, Canada, Jan. 22-26, 2018, Source: Samsung, Title: PHR for CA.
R1-1800498 3GPP TSG RAN WG1 Meeting AH 1801, Vancouver, Canada, Jan. 22-26, 2018, Source: OPPO, Title: Text Proposal for Beam Management.
R1-1800499 3GPP TSG RAN WG1 Meeting AH 1801, Vancouver, Canada, Jan. 22-26, 2018, Source: OPPO, Title: Text Proposal for Beam Failure Recovery.
R1-1715941 3GPP TSG RAN WG1 Meeting NR#3, Nagoya Japan, Sep. 18-21, 2017, Source: Samsung, Title: Beam Failure recovery.
R1-1716295 3GPP TSG RAN WG1 Meeting NR#3, Nagoya, Japan, Sep. 18-21, 2017, Source: Intel Corporation, Title: Remaining Issues on Beam Failure Recovery.
R1-1716397 3GPP TSG RAN WG1 Meeting NR#3, Nagoya, Japan, Sep. 18-21, 2017, Source: Qualcomm Incorporated, Title: Beam recovery procedure.
R1-1716500 3GPP TSG RAN WG1 Meeting NR#3, Nagoya, Japan, Sep. 18-21, 2017, Source: Nokia, Nokia Shanghai Bell, Title Beam Recovery in NR.
R1-1716469 3GPP TSG RAN WG1 Meeting NR#3, Nagoya, Japan, Sep. 18-21, 2017: Source: InterDigital, Inc., Title: Remaining issues on beam recovery.
R1-1717302 3GPP TSG RAN WG1 Meeting #90bis, Prague, Czech Republic, Oct. 9-13, 2017, Source: Huawei, HiSilicon Title: Beam failure recovery design details.
R1-1717369 3GPP TSG RAN WG1 Meeting #90bis, Prague, Czech Republic, Oct. 9-13, 2017, Source: Intel Corporation, Title: Remaining Issues on Beam Failure Recovery.
R1-1717473 3GPP TSG RAN WG1 Meeting #90bis, Prague, Czech Republic, Oct. 9-13, 2017, Source: vivo, Title: Discussion on beam failure recovery.
R1-1717606 3GPP TSG RAN WG1 Meeting #90bis, Prague, Czech Republic, Oct. 9-13, 2017, Source: Samsung, Title: Beam failure recovery.
R1-1717942 3GPP TSG RAN WG1 Meeting #90bis, Prague, Czech Republic, Oct. 9-13, 2017, Source: LG Electronics, Title: Discussion on beam failure recovery.
R1-1718010 3GPP TSG RAN WG1 Meeting #90bis, Prague, Czech Republic, Oct. 9-13, 2017, Source: NEC, Title: Discussion on Beam Failure Recovery.
R1-1718055 3GPP TSG RAN WG1 Meeting #90bis, Prague, Czech Republic, Oct. 9-13, 2017, Source: OPPO, Title: Discussion on Beam Recovery Mechanism.
R1-1718193 3GPP TSG RAN WG1 Meeting #90bis, Prague, Czech Republic, Oct. 9-13, 2017, Source: NTT DOCOMO, Title: Views on beam recovery.
R1-1718389 3GPP TSG RAN WG1 Meeting #90bis, Prague, Czech Republic, Oct. 9-13, 2017, Source: AT&T, Title: Beam Recovery for Full and Partial Control Channel Failure.
R1-1718512 3GPP TSG RAN WG1 Meeting #90bis, Prague, Czech Republic, Oct. 9-13, 2017, Source: Nokia, Nokia Shanghai Bell, Title: Beam Recovery in NR.
R1-1718542 3GPP TSG RAN WG1 Meeting #90bis, Prague Czech Republic, Oct. 9-13, 2017, Source: Qualcomm Incorpated, Title: Beam recovery procedure.

(56) References Cited

OTHER PUBLICATIONS

R2-1707001 3GPP TSG-RAN WG2 Meeting #AH, Qingdao, China, Jun. 27-29, 2017, Source: Lenovo, Motorola Mobility, Title: Random access procedure for beam recovery request.
R1-17111617 3GPP TSG RAN WG1 NR AH#2, Qingdao, China, Jun. 27-30, 2017, Source: CATT, Title: RACH power control and power ramping procedure (revision of R1-1710034).
R1-1711161 3GPP TSG RAN WG1 NR#2, Qingdao, China, Jun. 27-30, 2017, Source: Qualcomm Incorporated, Title: Beam recovery procedures.
International Search Report and Written Opinion for PCT/US2018/046368 dated Dec. 13, 2018.
Apr. 15, 2019—Extented European Search Report—EP 19150964.5.
R1-1708678 3GPP TSG-RAN WG1 #89, Hangzhou, China, May 15-19, 2017, Source: Ericsson, Title: Beam failure recovery mechanism.
May 22, 2019—Extended European Search Report—19156175.2.
R2-1800560 3GPP TSG-RAN WG2 NR, Vancouver, Canada, Jan. 22-26, 2018, Source: Sharp, Title: Remaining issues on beam failure recovery.
R2-1800632 3GPP TSG-RAN WG2 AH, Vancouver, Canada, Jan. 22-26, 2018, Source: Huawei, HiSilicon, Title: Remaining issue for beam failure recovery.
R2-1801049 3GPP TSG-RAN WG2 AH, Vancouver, Canada, Jan. 22-26, 2018, Source: Huawei, HiSilicon, Title: Non-contention based random access for beam failure recovery in CA.
3GPP TS 38.321 V15.0.0 (Dec. 2017); Technical Specification; 3rd Generation Partnership Project; Technical Specification Group Radio Access Network; NR; Medium Access Control (MAC) protocol specification (Release 15).
3GPP TS 38.213 V15.0.1 (Feb. 2018); Technical Specification; 3rd Generation Partnership Project; Technical Specification Group Radio Access Network; NR; Physical layer procedures for control (Release 15).
R2-1804475 3GPP TSG-RAN WG2 Meeting #101bis, Sanya, China, Apr. 16-20, 2018, Source: Spreadtrum Communications, Title: Beam Failure recovery on SCell.
May 14, 2019—European Extended Search Report—19157460.7.
R2-1710562 3GPP TSG-RAN WG2 #99bis, Prague, Czech Republic, Oct. 9-13, 2017, Source: Huawei, HiSilicon, Title: RAN2 aspects of DL beam management (revision of R2-1708695).
3GPP TS 36.211 V14.3.0 (Jun. 2017); Technical Specification; 3rd Generation Partnership Project; Technical Specification Group Radio Access Network; Evolved Universal Terrestrial Radio Access (E-UTRA); Physical channels and modulation (Release 14).
3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures (Release 14).
3GPP TS 36.321 V.14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification (Release 14).
3GPP TS 36.331 V.14.3.0 (Jun. 2017); Technical Specification; 3rd Generation Partnership Project; Technical Specification Group Radio Access Network; Evolved Universal Terrestrial Radio Access (E-UTRA); Radio Resource Control (RRC); Protocol specification (Release 14).
3GPP TR 38.802 V14.1.0 (Jun. 2017), Technical Report, 3rd Generation Partnership Project; Technical Specification Group Radio Access Network; Study on New Radio Access Technology Physical Layer Aspects (Release 14).
3GPP TR 38.912 V14.0.0 (Mar. 2017), Technical Report, 3rd Generation Partnership Project; Technical Specification Group Radio Access Network; Study on New Radio (NR) Access Technology (Release 14).
R1-171xxxx 3GPP TSG RAN WG1 Meeting #90, Prague, Czech Republic, Aug. 21-25, 2017, Source: MCC Support, Title: Draft Report of 3GPP TSG RAN WG1 #89 v0.2.0 (Hangzhou, China, May 15-19, 2017).
R1-171xxxx 3GPP TSG RAN WG1 Meeting #90, Prague, Czech Republic, Aug. 21-25, 2017, Source: MCC Support, Title: Draft Report of 3GPP TSG RAN WG1 #AH NR2 v0.1.0 (Qingdao, China, Jun. 27-30, 2017).
R1-1708890 3GPP TSG RAN WG1 Meeting #89, Hangzhou, China, May 15-19, 2017, Source: MCC Support, Title: Final Report of 3GPP TSG RAN WG1 #88bis v1.0.0 (Spokane, Washington, Apr. 3-7, 2017).
R1-1709907 3GPP TSG RAN WG1 NR Ad-Hoc#2, Qingdao, China, Jun. 27-30, 2017, Source: Xinwei, Title: Discussion on Beam Failure Recovery.
R1-1709929 3GPP TSG RAN WG1 NR Ad Hoc Meeting, Qingdao, China, Jun. 27-30, 2017, Source: Huawei, HiSilicon, Title: General views on beam failure recovery.
R1-1710058 3GPP TSG RAN WG1 NR Ad-Hoc#2, Qingdao, China, Jun. 27-30, 2017, Source: CATT, Title: Considerations on DL beam failure and recovery.
R1-1710283 3GPP TSG RAN WG1 NR Ad-Hoc#2, Qingdao, China, Jun. 27-30, 2017, Source: LG Electronics, Title: Discussion on beam failure recovery.
R1-1710400 3GPP TSG RAN WG1 NR Ad-Hoc#2, Qingdao, China, Jun. 27-30, 2017, Source: Vivo, Title: Beam failure recovery procedure.
R1-1710596 3GPP TSG RAN WG1 NR Ad-Hoc#2, Qingdao, China, Jun. 27-30, 2017, Source: Lenovo, Motorola Mobility, Title: Discussion of beam recovery procedure.
R1-1710810 3GPP TSG RAN WG1 AH_NR Meeting, Qingdao, China, Jun. 27-30, 2017, Source: MediaTek Inc., Title: Mechanism for flexible beam failure recovery.
R1-1710926 3GPP TSG RAN WG1 NR Ad-Hoc#2, Qingdao, China, Jun. 27-30, 2017, Source: InterDigital, Inc., Title: On Remaining Details of Beam Failure Recovery.
R1-1711017 3GPP TSG RAN WG1 #89ah-NR, Qingdao, China, Jun. 27-30, 2017, Source: Ericsson, Title: Mechanism to recover from beam failure.
R1-1711291 3GPP TSG RAN WG1 NR Ad-Hoc#2, Qingdao, China, Jun. 27-30, 2017, Source: Nokia, Alcatel-Lucent Shanghai Bell, Title: Beam Recovery.
R2-1706680 3GPP TSG-RAN WG2 NR-Adhoc, Qingdao, China, Jun. 27-29, 2017, Source: AT&T, Title: Beam Failure Recovery Mechanism and RLF.
3GPP TSG-RAN WG2 NR Ad Hoc, Qingdao, China, Jun. 27-29, 2017, Source: RAN2 Chairman (Intel), Object: Chairman Notes.
PRACH—Preamble Detection and Timing Advance Estimation for multi-UE in 3GPP LTE, 3GPP LTE Solutions, from www.mymowireless.com.
Jul. 16, 2019—European Extended Search Report—EP 19166184.2.
R1-1702078 3GPP TSG RAN WG1 Meeting #88, Athens, Greece, Feb. 13-17, 2017, Source: CATT, Title: Considerations on beam recovery mechanism.
R1-1707121 3GPP TSG RAN WG1 Meeting #89, Hangzhou, China, May 15-19, 2017, Source: ZTE, Title: Discussion on beam recovery mechanism.
3GPP TS 38.213 V15.0.0 (Dec. 2017); Technical Specification; 3rd Generation Partnership Project; Technical Specification Group Radio Access Network; NR; Physical layer procedures for control (Release 15).
3GPP TS 38.213 V15.1.0 (Mar. 2018); Technical Specification; 3rd Generation Partnership Project; Technical Specification Group Radio Access Network; NR; Physical layer procedures for control (Release 15).
3GPP TS 38.321 V15.1.0 (Mar. 2018); Technical Specification; 3rd Generation Partnership Project; Technical Specification Group Radio Access Network; NR; Medium Access Control (MAC) protocol specification (Release 15).

(56) References Cited

OTHER PUBLICATIONS

3GPP TS 38.331 V15.1.0 (Mar. 2018); Technical Specification; 3rd Generation Partnership Project; Technical Specification Group Radio Access Network; NR; Radio Resource Control (RRC) protocol specification (Release 15).
R1-180xxxx 3GPP TSG RAN WG1 Meeting #93 Busan, South Korea, May 21-25, 2018, Source: Ericsson, Title: Feature lead summary for beam measurement and reporting.
R1-180xxxx 3GPP TSG RAN WG1 Meeting #92bis, Sanya, China, Apr. 16-20, 2018, Source: MediaTek, Inc., Title: Summary 1 on Remaining issues on Beam Failure Recovery.
R1-1803362 3GPP TSG RAN WG1 Meeting #92, Athens, Greece, Feb. 26-Mar. 2, 2018, Source:MediaTek, Inc., Title: Summary on remaining issues on Beam Failure Recovery.
R1-180xxxx 3GPP TSG RAN WG1 Meeting #93 Busan, South Korea, May 21-25, 2018, Source: MediaTek Inc., Title: Summary on Remaining issues on Beam Failure Recovery.
R1-1704400 3GPP TSG RAN WG1 Meeting #88bis, Spokane, USA, Apr. 3-7, 2017, Source: ZTE, ZTE Microelectronics, Title: Discussion on beam recovery mechanism.
R1-1704465 3GPP TSG RAN WG1 Meeting #88bis, Spokane, USA, Apr. 3-7, 2017, Source: MediaTek, Inc., Title: Discussion on beam recovery mechanism.
R1-1719423 3GPP TSG RAN WG1 Meeting #91, Reno, USA, Nov. 27-Dec. 1, 2017, Source: Huawei, HiSilicon, Title: Remaining details on beam failure recovery.
R1-1719619 3GPP TSG RAN WG1 Meeting #91, Reno, USA, Nov. 27-Dec. 1, 2017, Source: Fujitsu, Title: Discussion on beam failure recovery.
R1-1719633 3GPP TSG RAN WG1 Meeting #91, Reno, USA, Nov. 27-Dec. 1, 2017, Source: AT&T, Title: Remaining Details on Mechanisms to Recover from Beam Failure.
R1-1719695 3GPP TSG RAN WG1 Meeting #91, Reno, USA, Nov. 27-Dec. 1, 2017, Source: Spreadtrum Communications, Title: Remaining issues on beam failure recovery mechanism.
R1-1719770 3GPP TSG RAN WG1 Meeting #91, Reno, USA, Nov. 27-Dec. 1, 2017, Source: vivo, Title: Remaining details on mechanism to recover from beam failure.
R1-1719809 3GPP TSG RAN WG1 Meeting #91, Reno, USA, Nov. 27-Dec. 1, 2017, Source: Huawei, HiSilicon, Title: Design of PUCCH-based Beam Failure Recovery.
R1-1719908 3GPP TSG RAN WG1 Meeting #91, Reno, USA, Nov. 27-Dec. 1, 2017, Source: LG Electronics, Title: Discussion on beam failure recovery.
R1-1719988 3GPP TSG RAN WG1 Meeting #91, Reno, USA, Nov. 27-Dec. 1, 2017, Source: Discussion on Beam Recovery Mechanism.
R1-1720072 3GPP TSG RAN WG1 Meeting #91, Reno, USA, Nov. 27-Dec. 1, 2017, Source: Intel Corporation, Title: Remaining Issues on Beam Failure Recovery.
R1-1720291 3GPP TSG RAN WG1 Meeting #91, Reno, USA, Nov. 27-Dec. 1, 2017, Source Samsung, Title: Beam failure recovery.
R1-1720305 3GPP TSG RAN WG1 Meeting #91, Reno, USA, Nov. 27-Dec. 1, 2017, Source: Samsung, Title: Discussion on cross-carrier beam management.
R1-1720574 3GPP TSG RAN WG1 Meeting #91, Reno, USA, Nov. 27-Dec. 1, 2017, Source: NEC, Title: On Partial Beam Failure Recovery.
R1-1720631 3GPP TSG RAN WG1 Meeting #91, Reno, USA, Nov. 27-Dec. 1, 2017, Source: InterDigital, Inc., Title: Remaining issues on beam recovery.
R1-1720804 3GPP TSG RAN WG1 Meeting #91, Reno, USA, Nov. 27-Dec. 1, 2017, Source: NTT DOCOMO, Title: Remaining issue on beam recovery.
R1-1720891 3GPP TSG RAN WG1 Meeting #91, Reno, USA, Nov. 27-Dec. 1, 2017, Source: Nokia, Nokia Shanghai Bell, Title: Beam Recovery in NR.
R1-1721523 3GPP TSG RAN WG1 Meeting #91, Reno, USA, Nov. 27-Dec. 1, 2017, Source: NTT DOCOMO, Samsung, Mediatek, AT&T, ZTE, Intel, Huawei, CATT, Qualcomm, Fujitsu, Spreadtrum, Title: WF for handling partial beam failure.
R1-1721673 3GPP TSG RAN WG1 Meeting #91, Reno, USA, Nov. 27-Dec. 1, 2017, Source: NTT DOCOMO, Intel, Huawei, NEC, Spreadtrum, Mediatek, China Telecom, AT&T, Samsung, ZTE, CATT, Qualcomm, Fujitsu, Nokia, Title: WF for handling partial beam failure.
R1-1800100 3GPP TSG RAN WG1 Meeting Ad Hoc, Vancouver, Canada, Jan. 22-26, 2018, Source: Huawei, HiSilicon, Title: Summary of remaining issues of beam measurement, reporting and indication.
R1-1800101 3GPP TSG RAN WG1 Meeting Ad Hoc, Vancouver, Canada, Jan. 22-26, 2018, Source: Huawei, HiSilicon, Title: Summary of remaining issues on beam failure recovery.
R1-1800110 3GPP TSG RAN WG1 Meeting Ad Hoc, Vancouver, Canada, Jan. 22-26, 2018, Source: ZTE, Sanechips, Title: Remaining details on bean management.
R1-1800111 3GPP TSG RAN WG1 Meeting Ad Hoc, Vancouver, Canada, Jan. 22-26, 2018, Source: ZTE, Sanechips, Title: Remaining details on mean management.
R1-1800312 3GPP TSG RAN WG1 Meeting Ad Hoc, Vancouver, Canada, Jan. 22-26, 2018, Source: Intel Corporation, Title: Remaining Issues on Beam Failure Recovery.
R1-1800526 3GPP TSG RAN WG1 Meeting Ad Hoc, Vancouver, Canada, Jan. 22-26, 2018, Source: Huawei, HiSilicon, Title: Remaining details of PHR.
R1-1800542 3GPP TSG RAN WG1 Meeting Ad Hoc, Vancouver, Canada, Jan. 22-26, 2018, Source: CMCC, Title: Discussion on remaining issues for beam indication.
R1-1800543 3GPP TSG RAN WG1 Meeting Ad Hoc, Vancouver, Canada, Jan. 22-26, 2018, Source: CMCC, Title: Discussion on beam recovery mechanism.
R1-1800582 3GPP TSG RAN WG1 Meeting Ad Hoc, Vancouver, Canada, Jan. 22-26, 2018, Source: AT&T, Title: TCI states configuration design to support dynamic BWP switching.
R1-1800583 3GPP TSG RAN WG1 Meeting Ad Hoc, Vancouver, Canada, Jan. 22-26, 2018, Source: AT&T, Title: In support of partial beam failure.
R1-1800622 3GPP TSG RAN WG1 Meeting Ad Hoc, Vancouver, Canada, Jan. 22-26, 2018, Source: ASUSTeK, Title: Remaining Issues for Beam Failure Recovery Procedure.
R1-1800629 3GPP TSG RAN WG1 Meeting Ad Hoc, Vancouver, Canada, Jan. 22-26, 2018, Source: InterDigital, Inc., Title: Remaining details on beam failure recovery.
R1-1800642 3GPP TSG RAN WG1 Meeting Ad Hoc, Vancouver, Canada, Jan. 22-26, 2018, Source: ITRI, Title: Discussion on timer for beam failure recovery.
R1-1800660 3GPP TSG RAN WG1 Meeting Ad Hoc, Vancouver, Canada, Jan. 22-26, 2018, Source: NTT DOCOMO, Title: Remaining Issue on Beam Indication.
R1-1800661 3GPP TSG RAN WG1 Meeting Ad Hoc, Vancouver, Canada, Jan. 22-26, 2018, Source: NTT DOCOMO, Title: Remaining issue on beam recovery.
R1-1800682 3GPP TSG RAN WG1 Meeting Ad Hoc, Vancouver, Canada, Jan. 22-26, 2018, Source: NTT DOCOMO, Inc., Title: Remaining issues on PHR.
R1-1800699 3GPP TSG RAN WG1 Meeting Ad Hoc, Vancouver, Canada, Jan. 22-26, 2018, Source: Ericsson, Title: Remaining details on beam management.
R1-1800700 3GPP TSG RAN WG1 Meeting Ad Hoc, Vancouver, Canada, Jan. 22-26, 2018, Source: Ericsson, Title: Remaining details and corrections for beam recovery.
R1-1800734 3GPP TSG RAN WG1 Meeting Ad Hoc, Vancouver, Canada, Jan. 22-26, 2018, Source: InterDigital, Inc., Title: Remaining issues on beam management.
R1-1800751 3GPP TSG RAN WG1 Meeting Ad Hoc, Vancouver, Canada, Jan. 22-26, 2018, Source: Nokia, Nokia Shanghai Bell, Title: Remaining details on beam indication, measurement and reporting.
R1-1800752 3GPP TSG RAN WG1 Meeting Ad Hoc, Vancouver, Canada, Jan. 22-26, 2018, Source: Nokia, Nokia Shanghai Bell, Title: Remaining Details on Beam Recovery.

(56) References Cited

OTHER PUBLICATIONS

R1-1800859 3GPP TSG RAN WG1 Meeting Ad Hoc, Vancouver, Canada, Jan. 22-26, 2018, Source: Qualcomm, Title: Beam management for NR.
R1-1800860 3GPP TSG RAN WG1 Meeting Ad Hoc, Vancouver, Canada, Jan. 22-26, 2018, Source: Qualcomm Incorporated, Title: Remaining details on beam recovery procedure.
R1-1801006 3GPP TSG RAN WG1 Meeting Ad Hoc, Vancouver, Canada, Jan. 22-26, 2018, Source: Ericsson, Title; Feature lead summary 1 of beam measurement and reporting.
R1-1801089 3GPP TSG RAN WG1 Meeting Ad Hoc, Vancouver, Canada, Jan. 22-26, 2018, Source: Media Tec Inc., Title: Summary for Remaining issue on Beam Failure Recovery.
R1-1801143 3GPP TSG RAN WG1 Meeting Ad Hoc, Vancouver, Canada, Jan. 22-26, 2018, Source: Ericsson, Title: Feature lead summary 2 of beam measurement and reporting.
R1-1801160 3GPP TSG RAN WG1 Meeting Ad Hoc, Vancouver, Canada, Jan. 22-26, 2018, Source: NTT DOCOMO, Qualcomm, Huawei, HiSilicon, ZTE, Sanechips, Fujitsu, Title: Updated offline proposal on PHR.
R1-1801187 3GPP TSG RAN WG1 Meeting Ad Hoc, Vancouver, Canada, Jan. 22-26, 2018, Source: Ericsson, Title: Feature lead summary 3 of beam measurement and reporting.
R1-1801197 3GPP TSG RAN WG1 Meeting Ad Hoc, Vancouver, Canada, Jan. 22-26, 2018, Source: MediaTek Inc., Title: Offline Summary for Remaining issues on Beam Failure Recovery.
R1-1801223 3GPP TSG RAN WG1 Meeting Ad Hoc, Vancouver, Canada, Jan. 22-26, 2018, Source: MediaTek Inc., Title: Offline Discussion Summary for Beam Failure Recovery.
R1-1801228 3GPP TSG RAN WG1 Meeting Ad Hoc, Vancouver, Canada, Jan. 22-26, 2018, Source: Ericsson, Title: Text proposal on source QCL for semi-persistent CSI-RS.
R1-1801229 3GPP TSG RAN WG1 Meeting Ad Hoc, Vancouver, Canada, Jan. 22-26, 2018, Source: Ericsson, Title: Text proposal for source spatial relation for semi-persistent SRS.
R1-1801230 3GPP TSG RAN WG1 Meeting Ad Hoc, Vancouver, Canada, Jan. 22-26, 2018, Source: Ericsson, Title: Text proposal on priority rules for PUCCH carrying RSRP reports and SRS.
R2-1806120 3GPP TSG-RAN WG2 Meeting #101, Sanya, China, Apr. 16-20, 2018, Source: ITL, Title: Beam Failure Recovery on SCell.
R2-1806166 3GPP TSG-RAN WG2 Meeting #101, Sanya, China, Apr. 16-20, 2018, Source: MediaTek, Inc., Title: On switching between CFRA and CBRA.
R2-1806774 3GPP TSG-RAN WG2 Meeting #102, Sanya, China, Apr. 16-20, 2018, Source: Nokia, Nokia Shanghai Bell, Title: Finalization of dormant SCell state.
R2-1806819 3GPP TSG-RAN WG2 Meeting #102, Busan, Korea, May 21-25, 2018, Source: Samsung, Title: MAC Impacts: Beam Failure Recovery for SCell.
R2-1806924 3GPP TSG-RAN WG2 Meeting #102, Busan, Korea, May 21-25, 2018, Source: Qualcomm, Inc., Title: SCell Dormant State Transitions based on New Timers & MAC-CEs.
R2-1806998 3GPP TSG-RAN WG2 Meeting #102, Busan, Korea, May 21-25, 2018, Source: CATT, Title: The validity of CFRA resources for BFR.
R2-1807160 3GPP TSG-RAN WG2 Meeting #102, Busan, Korea, May 21-25, 2018, Source: Panasonic, Title: Timer associated with the dedicated BFR PRACH resource.
R2-1807405 3GPP TSG-RAN WG2 Meeting #102, Busan, Korea, May 21-25, 2018, Source: ZTE, Title: Discussion on the beam failure recovery timer.
R2-1807415 3GPP TSG-RAN WG2 Meeting #102, Busan, Korea, May 21-25, 2018, Source: OPPO, Title: MAC impacts on supporting BFR procedure on SCell.
R2-1807444 3GPP TSG-RAN WG2 Meeting #102, Busan, Korea, May 21-25, 2018, Source: Huawei, HiSilicon, Title: BWP switch for BFR.
R2-1807481 3GPP TSG RAN WG2 Meeting #102, Busan, Korea, May 21-25, 2018, Source: Huawei, HiSilicon, Title: Remaining issues of temporary CQI reporting.
R2-1807584 3GPP TSG RAN WG2 Meeting #102, Busan, Korea, May 21-25, 2018, Source: vivo, Title: Discussion on the SCell BFR.
R2-1807961 3GPP TSG-RAN WG2 Meeting #102, Busan, Korea, May 21-25, 2018, Source: Huawei, HiSilicon, Title: Discussion on BFR-config for SCell BFR.
R2-1807975 3GPP TSG-RAN WG2 Meeting #102, Busan, Korea, May 21-25, 2018, Source: Huawei, HiSilicon, Title: Discussion on beam failure recovery for SCell.
R2-1808024 3GPP TSG-RAN WG2 Meeting #102, Busan, Korea, May 21-25, 2018, Source: Nokia, Nokia Shanghai Bell, Title: SCell Beam Failure Recovery.
R2-1808570 3GPP TSG RAN WG2 Meeting #102, Busan, Korea, May 21-25, 2018, Source: Qualcomm Incorporated, Title: Dormant BWP for fast SCell activation.
R2-1808658 3GPP TSG-RAN WG2 Meeting #102, Busan, Korea, May 21-25, 2018, Source: ITL, Title: Beam failure recovery on SCell.
R2-1808809 3GPP TSG RAN WG2 Meeting #102, Busan, Korea, May 21-25, 2018, Source: Ericsson, Title: CR on Dormat SCell state transition MAC CE.
R2-1809515 3GPP TSG RAN WG2 AH-1807, Montreal, Canada, Jul. 2-6, 2018, Source: CATT, Title: Further issues with DL BWP switching for CFRA.
R2-1809523 3GPP TSG RAN WG2 AH-1807, Montreal, Canada, Jul. 2-6, 2018, Source: CATT, Title: Further discussion on BFR termination criterion.
R2-1809721 3GPP TSG RAN WG2 AH-1807, Montreal, Canada, Jul. 2-6, 2018, Source: InterDigital, Title: BWP switching for RA-BFR.
R2-1809872 3GPP TSG RAN WG2 AH-1807, Montreal, Canada, Jul. 2-6, 2018, Source: vivo, Title: Remaining configuration issues for BFR.
R2-1809894 3GPP TSG RAN WG2 AH-1807, Montreal, Canada, Jul. 2-6, 2018, Source: vivo, Title: Preamble Selection when CFRA Resource Available.
R2-1809925 3GPP TSG RAN WG2 AH-1807, Montreal, Canada, Jul. 2-6, 2018, Source: OPPO, Title: The issue of BWP switching for BFR RACH.
R2-1810008 3GPP TSG RAN WG2 AH-1807, Montreal, Canada, Jul. 2-6, 2018, Source: Sharp, Title: Remaining issues on DL BWP switching upon RACH procedure initiation.
R2-1810063 3GPP TSG RAN WG2 AH-1807, Montreal, Canada, Jul. 2-6, 2018, Source: Ericsson, Title: Dormant SCell state in NR.
R2-1810091 3GPP TSG RAN WG2 AH-1807, Montreal, Canada, Jul. 2-6, 2018, Source: Huawei, HiSilicon, Title: BWP switch for BFR.
R2-1810424 3GPP TSG RAN WG2 AH-1807, Montreal, Canada, Jul. 2-6, 2018, Source: Qualcomm Inc., Title: BFD procedure in DRX mode.
R2-1810513 3GPP TSG RAN WG2 AH-1807, Montreal, Canada, Jul. 2-6, 2018, Source: Huawei, HiSilicon, Title: Clarification on RA procedure for BFR on BWPs without CBRA occasions.
R2-1810641 3GPP TSG RAN WG2 AH-1807, Montreal, Canada, Jul. 2-6, 2018, Source: Huawei, HiSilicon, Title: Issues on BWP switch and search space configuration for BFR.
R2-1810643 3GPP TSG RAN WG2 AH-1807, Montreal, Canada, Jul. 2-6, 2018, Source: Huawei, HiSilicon, Title: RACH configuration on BWPs.
R2-1810797 3GPP TSG RAN WG2 AH-1807, Montreal, Canada, Jul. 2-6, 2018, Source: CATT, Title: Offline discussion #100 on DL-UL linking for CFRA.
R2-1811482 3GPP TSG-RAN WG2 Meeting #103, Gothenburg, Sweden, Aug. 20-24, 2018, Source: ZTE, Sanechips, Title: Consideration on implicit configuration of RS for BFD.
R2-1811896 3GPP TSG-RAN WG2 Meeting #103, Gothenburg, Sweden, Aug. 20-24, 2018, Source: Huawei, HiSilicon, Title: BWP switch for BFR.
R2-1812639 3GPP TSG-RAN WG2 Meeting #103, Gothenburg, Sweden, Aug. 20-24, 2018, Source: LG Electronics Inc., Title: BWP operation for BFR RA.

(56) References Cited

OTHER PUBLICATIONS

R2-1814198 3GPP TSG-RAN WG2 Meeting #103bis, Chengdu, China, Oct. 8-12, 2018, Source: vivo, Title: Clarification on the beam change during BFR.
RP-181344 3GPP TSG RAN Meeting #80, La Jolla, USA, Jun. 11-14, 2018, Source: Ericsson, Nokia, Nokia Shanghai Bell, Huawei, Title: New WID on MR-DC enhancements (NR_MRDC_Enh).
Dec. 16, 2019—European Extended Search Report—EP 19191018.1.
Dec. 20, 2019—European Extended Search Report—EP 19199208.0.
R2-1811208 3GPP TSG-RAN WG2 Meeting #103, Gothenburg, Sweden, Aug. 20-24, 2018, Source: CATT, Title: UL/DL BWP linkage for PDCCH order initiated CFRA.
R1-1807210 3GPP TSG RAN WG1 Meeting #93, Busan, Korea, May 21-25, 2018, Source: ASUSTeK, Title: Remaining issues on beam management.
R1-1804788 3GPP TSG RAN WG1 Meeting #92b, Sanya, China, Apr. 16-20, 2018, Source: Qualcomm, Title: Beam failure recovery procedure.
Jan. 24, 2020—European Extended Search Report—EP 19199658.6.
R2-1802554 3GPP TSG-RAN WG2 #101, Athens, Greece, Feb. 26-Mar. 2, 2018, Source: ASUSTeK, Title: Discussion on Beam Failure Recovery Request in NR.
R2-1803195 3GPP TSG-RAN WG2 #101, Athens, Greece, Feb. 26-Mar. 2, 2018, Source: Ericsson, Title: Beam Failure Recovery in Scell.
R2-1804877 3GPP TSG-RAN WG2 Meeting #101bis, Sanya, China, Apr. 16-20, 2018, Source: Xiaomi, Title: Consideration on SR Transmission Occasion Overlap with a UL-SCH Resource.
R2-18006164 3GPP TSG-RAN WG2 Meeting #101bis, Sanya, China, Apr. 16-20, 2018, Source: Media Tek Inc., Title: On Parallel SR and RACH Procedure in NR.
R1-170xxxx 3GPP TSG RAN WG1 Meeting #88b, Spokane, USA, Apr. 3-7, 2017, Source: Huawei, HiSilicon, Title: WF on Beam Failure Recovery.
R1-171xxxx 3GPP TSG RAN WG1 Meeting #90, Prague, Czech Republic, Aug. 21-25, 2017, Source: MediaTek Inc. Title: Offline Discussion on Beam Recovery Mechanism.
R1-1704230 3GPP TSG RAN WG1 Meeting #88b, Spokane, USA, Apr. 3-7, 2017, Source: Huawei, HiSilicon, Title: Link recovery procedure for beam failure.
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).
3GPP TSG RAN WG1 Meeting #90, Prague, Czech Republic, Aug. 21-25, 2017, Title: RAN1 Chairman's Notes.
R1-1705719 3GPP TSG RAN WG1 Meeting #88bis, Spokane, USA, Apr. 3-7, 2017, Source: NTT DOCOMO, Inc., Title: Further views on mechanism to recover from beam failure.
R1-1711016 3GPP TSG RAN WG1 #89AH-NR, Qingdao, China, Jun. 27-30, 2017, Source: Ericsson, Title: UL beam management details.
R1-1712223 3GPP TSG RAN WG1 Meeting #90, Prague, Czech Republic, Aug. 21-25, 2017, Source: Huawei, HiSilicon, Title: UL beam management.
R1-1712224 3GPP TSG RAN WG1 Meeting #90, Prague, Czech Republic, Aug. 21-25, 2017, Source: Huawei, HiSilicon, Title: Procedure details for beam failure recovery.
R1-1712268 3GPP TSG RAN WG1 Meeting #90, Prague, Czech Republic, Aug. 21-25, 2017, Source: Xinwei, Title: Discussion on beam failure recovery.
R1-1712299 3GPP TSG RAN WG1 Meeting #90, Prague, Czech Republic, Aug. 21-25, 2017, Source: ZTE, Title: UL beam management for NR MIMO.
R1-1712378 3GPP TSG RAN WG1 Meeting #90, Prague, Czech Republic, Aug. 21-25, 2017, Source: CATT, Title: Considerations on UL beam management.
R1-1712379 3GPP TSG RAN WG1 Meeting #90, Prague, Czech Republic, Aug. 21-25, 2017, Source: CATT, Title: Beam failure detection and recovery.
R1-1712551 3GPP TSG RAN WG1 Meeting #90, Prague, Czech Republic, Aug. 21-25, 2017, Source: Intel Corporation, Title: Details for UL beam management.
R1-1712552 3GPP TSG RAN WG1 Meeting #90, Prague, Czech Republic, Aug. 21-25, 2017, Source: Intel Corporation, Title: Discussion for mechanism to recover from beam failure.
R1-1721672 3GPP TSG RAN WG1 Meeting #90, Prague, Czech Republic, Aug. 21-25, 2017, Source: Lenovo, Motorola Mobility, Title: Discussion of beam failure recovery.
R1-1712713 3GPP TSG RAN WG1 Meeting #90, Prague, Czech Republic, Aug. 21-25, 2017, Source: AT&T, Title: Mechanisms to recover from beam failure.
R1-1712838 3GPP TSG RAN WG1 Meeting #90, Prague, Czech Republic, Aug. 21-25, 2017, Source: Vivo, Title: Discussion on uplink beam management.
R1-1712966 3GPP TSG RAN WG1 Meeting #90, Prague, Czech Republic, Aug. 21-25, 2017, Source: Sony, Title: Considerations on UL beam management.
R1-1713287 3GPP TSG RAN WG1 Meeting #90, Prague, Czech Republic, Aug. 21-25, 2017, Source: Guangdong OPPO Mobile Telecom, Title: Discussion on the UL beam management.
R1-1713596 3GPP TSG RAN WG1 Meeting #90, Prague, Czech Republic, Aug. 21-25, 2017, Source: Samsung, Title: Discussion on UL beam management.
R1-1714143 3GPP TSG RAN WG1 Meeting #90, Prague, Czech Republic, Aug. 21-25, 2017, Source: InterDigital, Inc., Title: On efficient UL beam management.
R1-1714250 3GPP TSG RAN WG1 Meeting #90, Prague, Czech Republic, Aug. 21-25, 2017, Source: Nokia, Nokia Shanghai Bell, Title: SRS transmission for beam management.
R1-1714292 3GPP TSG RAN WG1 Meeting #90, Prague, Czech Republic, Aug. 21-25, 2017, Source: Ericsson, Title: On UL beam management.
R1-1714383 3GPP TSG RAN WG1 Meeting #90, Prague, Czech Republic, Aug. 21-25, 2017, Source: ASUSTeK, Title: Considerations on UE Beamforming Management.
3GPP TSG RAN WG1 Meeting NR#3, Nagoya, Japan, Sep. 18-21, 2017, Title: RAN1 Chairman's Notes.
R1-1715441 3GPP TSG RAN WG1 Meeting NR#3, Nagoya, Japan, Sep. 18-21, 2017, Source: ZTE, Sanechips, Title: Discussion on beam recovery.
R1-1715620 3GPP TSG RAN WG1 Meeting NR#3, Nagoya, Japan, Sep. 18-21, 2017, Source: Vivo, Title: Discussion on beam failure recovery procedure.
R1-1715802 3GPP TSG RAN WG1 Meeting NR#3, Nagoya, Japan, Sep. 18-21, 2017, Source: CATT, Title: Beam failure detection and recovery.
R2-1708696 3GPP TSG RAN WG2 #99, Berlin, Germany, Aug. 21-25, 2017, Source: Huawei, HiSilicon, Title: Consideration on DRX with beam management.
R2-1708755 3GPP TSG RAN WG2 #99, Berlin, Germany, Aug. 21-25, 2017, Source: LG Electronics, Title: DRX related timers in NR (Revision of R2-1706750).
R2-1708791 3GPP TSG RAN WG2 #99, Berlin, Germany, Aug. 21-25, 2017, Source: Intel Corporation, Title: C-DRX enhancement in NR (Revision of R2-1707026).
R2-1709223 3GPP TSG RAN WG2 #99, Berlin, Germany, Aug. 21-25, 2017, Source: Qualcomm Incorporated, Title: Beam management in C-DRX.
R2-1709588 3GPP TSG RAN WG2 #99, Berlin, Germany, Aug. 21-25, 2017, Source: Samsung, Title: NR beamformed C-DRX operation (updated resubmission of R2-1705734).
R2-1709652 3GPP TSG RAN WG2 #99, Berlin, Germany, Aug. 21-25, 2017, Source: Qualcomm Incorporated, Apple, OPPO, Title: Wake-up Signaling for C-DRX Mode.
R2-1709916 3GPP TSG RAN WG2 #99, Berlin, Germany, Aug. 21-25, 2017, Source: Ericsson, Title: Reply LS to SA2 on 5QIs for URLLC.
Aug. 27, 2019—European Extended Search Report—EP 19173892.1.

(56) References Cited

OTHER PUBLICATIONS

3GPP TSG-RAN WG1 #89: "Beam failure recovery mechanism", May 15, 2017.
3GPP TSG-RAN WG2 Meeting#AH: "Random access procedure for beam recovery request", Jun. 27, 2017.
Sep. 25, 2019—European Extended Search Report—EP 19166863.1.
R1-1803368 3GPP TSG RAN WG1 Meeting #92, Athens, Greece, Feb. 26-Mar. 2, 2018, Source: [RAN1], Title: Draft LS reply to RAN2 on beam failure recovery.
R1-1803441 3GPP TSG RAN WG1 Meeting #92, Athens, Greece, Feb. 26-Mar. 2, 2018, Source: MediaTek Inc., Title: Summary 2 on Remaing issues on Beam Failure Recovery.
R2-1811483 3GPP TSG-RAN WG2 Meeting #103, Gothenburg, Sweden, Aug. 20-24, 2018, Source: ZTE, Sanechips, Title: CR for the reset of BFD in 38.321.
R2-1812108 3GPP TSG-RAN WG2 Meeting #103, Gothenburg, Sweden, Aug. 20-24, 2018, Source: Nokia, Nokia Shanghai Bell, Title: Reset of BFD.
3GPP TS 38.213 V15.2.0 (Jun. 2018), Technical Specification, 3rd Generation Partnership Project; Technical Specification Group Radio Access Network; NR; Physical layer procedures for control (Release 15).
R2-1806229 3GPP TSG-RAN WG2 Meeting #101bis, Sanya, China, Apr. 16-20, 2018, Source: Samsung, Title: Miscellaneous corrections.
Mar. 11, 2021—European Office Action—EP 19166184.2.
R1-1801454 3GPP TSG RAN WG1 Meeting #92, Athens, Greece, Feb. 26-Mar. 2, 2018, Source: Huawei, HiSilicon, Title: Remaining issues on beam failure recovery.
R1-1801722 3GPP TSG RAN WG1 Meeting #92, Athens, Greece, Feb. 26-Mar. 2, 2018, Source: CATT, Title: Remaining issues on DL beam failure recovery.
R1-1802393 3GPP TSG RAN WG1 Meeting #92, Athens, Greece, Feb. 26-Mar. 2, 2018, Source: Intel Corporation, Title: On beam management issues for mutli-CC operation.
R1-1802397 3GPP TSG RAN WG1 Meeting #92, Athens, Greece, Feb. 26-Mar. 2, 2018, Source: Intel Corporation, Title: Remaining Issues on Beam Failure Recovery.
R1-1802472 3GPP TSG RAN WG1 Meeting #92, Athens, Greece, Feb. 26-Mar. 2, 2018, Source: NTT DOCOMO, Title: Remaining issues on beam recovery.
R1-1802557 3GPP TSG RAN WG1 Meeting #92, Athens, Greece, Feb. 26-Mar. 2, 2018, Source: Nokia, Nokia Shanghai Bell, Title: Remaining Details on Beam Recovery.
R1-1802593 3GPP TSG RAN WG1 Meeting #92, Athens, Greece, Feb. 26-Mar. 2, 2018, Source: AT&T, Title: In support of partial beam failure.
R1-1802744 3GPP TSG RAN WG1 Meeting #92, Athens, Greece, Feb. 26-Mar. 2, 2018, Source: Ericsson, Title: Remaining details on beam recovery.
R1-1802824 3GPP TSG RAN WG1 Meeting #92, Athens, Greece, Feb. 26-Mar. 2, 2018, Source: Qualcomm Incorporated, Title: Beam recovery procedures.
R1-1803397 3GPP TSG RAN WG1 Meeting #92, Athens, Greece, Feb. 26-Mar. 2, 2018, Source: CATT, Title: Summary of Email Discussion on Beam Failure Recovery on Scell.
R1-1803745 3GPP TSG-RAN WG1 Meeting #92bis, Sanya, China, Apr. 16-20, 2018, Source: CATT, Title: Remaining Details on Beam Failure Recovery.
R1-1804210 3GPP TSG-RAN WG1 Meeting #92bis, Sanya, China, Apr. 16-20, 2018, Source: Lenovo, Motorola Mobility, Title: Discussion of Beam Measurement for Carrier Aggregation.
R1-1804363 3GPP TSG-RAN WG1 Meeting #92bis, Sanya, China, Apr. 16-20, 2018, Source: Samsung, Title: Simultaneous Reception of Physical Channels and Reference Signals.
R1-1804789 3GPP TSG-RAN WG1 Meeting #92bis, Sanya, China, Apr. 16-20, 2018, Source: Qualcomm Incorporated, Title: Details on Simultaneous Reception/Transmission of PHY Channels and RS in FR2.
R1-1804975 3GPP TSG-RAN WG1 Meeting #92bis, Sanya, China, Apr. 16-20, 2018, Source: Ericsson, Title: Remaining Issues on Beam Recovery.
R1-1804977 3GPP TSG-RAN WG1 Meeting #92bis, Sanya, China, Apr. 16-20, 2018, Source: Ericsson, Title: On Simultaneous Reception of Physical and Reference Signals Across CCs.
R1-1805538 3GPP TSG-RAN WG1 Meeting #92bis, Sanya, China, Apr. 16-20, 2018, Source: NTT DOCOMO, Inc., Title: Offline Summary for AI 7.1.3.1.2 Search Space.
R1-1806616 3GPP TSG-RAN WG1 #93, Busan, Korea, May 21-25, 2018, Source: LG Electronics, Title: Remaining Issues on Search Space.
R1-1806729 3GPP TSG-RAN WG1 #93, Busan, Korea, May 21-25, 2018, Source: Samsung, Title: Corrections on Search Space Design.
R2-1707999 3GPP TSG-RAN WG2 #99, Berlin, Germany, Aug. 21-25, 2017, Source: MediaTek Inc., Title: Beam Management and Beam Recovery in MAC.
R2-1708677 3GPP TSG RAN WG2 #99, Berlin, Germany, Aug. 21-25, 2017, Source: Nokia, Nokia Shanghai Bell, Title: Beam Recovery in NR.
R2-1708697 3GPP TSG RAN WG2 #99, Berlin, Germany, Aug. 21-25, 2017, Source: Huawei, HiSilicon, Title: Handling of Resources for Beam Failure Recovery.
R2-1709085 3GPP TSG-RAN WG2 #99, Berlin, Germany, Aug. 21-25, 2017, Source: Qualcomm Incorporated, Title: Beam Recovery Request.
R2-1709320 3GPP TSG-RAN WG2 #99, Berlin, Germany, Aug. 21-25, 2017, Source: ASUSTeK, Title: Discussion on Beam Recover Request in NR.
R2-1800042 3GPP TSG-RAN WG2 AH, Vancouver, Canada, Jan. 22-26, 2018, Source: ASUSTeK, Title: Discussion on Beam Failure Recovery Request in NR.
R2-1800049 3GPP TSG-RAN WG2 AH, Vancouver, Canada, Jan. 22-26, 2018, Source: ASUSTeK, Title: UE Behaviours Upon Beam Failure and Recovery.
R2-1800168 3GPP TSG-RAN WG2 AH, Vancouver, Canada, Jan. 22-26, 2018, Source: CATT, Title: Solution for PH Type Inconsistency Between RAN1 and RAN2.
R2-1800169 3GPP TSG-RAN WG2 AH, Vancouver, Canada, Jan. 22-26, 2018, Source: CATT, Title: PHR MAC CE for EN-DC.
R2-1800231 3GPP TSG-RAN WG2 #100, Reno, USA, Nov. 27-Dec. 1, 2017, Source: Xiaomi, Title: Consideration on PHR Trigger Condition for Supporting SUL.
R2-1800253 3GPP TSG-RAN WG2 AH, Vancouver, Canada, Jan. 22-26, 2018, Source: ASUSTeK, Title: Pathloss Change for Triggering PHR.
R2-1800254 3GPP TSG-RAN WG2 AH, Vancouver, Canada, Jan. 22-26, 2018, Source: CATT, Title: RA Procedure and Parameters for BFR.
R2-1800343 3GPP TSG-RAN WG2 AH, Vancouver, Canada, Jan. 22-26, 2018, Source: Ericsson, Title: PHR Format for SUL.
R2-1800614 3GPP TSG-RAN WG2 AH, Vancouver, Canada, Jan. 22-26, 2018, Source: Samsung, Title: Support for Type 2 PH in NR.
R2-1800619 3GPP TSG-RAN WG2 AH, Vancouver, Canada, Jan. 22-26, 2018, Source: Samsung, Title: SUL and PHR.
R2-1800642 3GPP TSG-RAN WG2 AH, Vancouver, Canada, Jan. 22-26, 2018, Source: Huawei, HiSilicon, Title: PHR Alignment Between RAN1 and RAN2.
R2-1800680 3GPP TSG-RAN WG2 AH, Vancouver, Canada, Jan. 22-26, 2018, Source: Lenovo, Motorola Mobility, Title: PHR for NR CA.
R2-1800822 3GPP TSG-RAN WG2 AH, Vancouver, Canada, Jan. 22-26, 2018, Source: Spreadtrum Communications, Title: Beam Failure Recovery Clarification.
R2-1801008 3GPP TSG-RAN WG2 AH, Vancouver, Canada, Jan. 22-26, 2018, Source: Huawei, HiSilicon, Title: Discussion on Power Sharing and its Impact on PHR for EN-DC.
R2-1801009 3GPP TSG-RAN WG2 AH, Vancouver, Canada, Jan. 22-26, 2018, Source: Huawei, HiSilicon, Title: General Consideration on RA Procedure for Beam Failure Recovery.
R2-1801041 3GPP TSG-RAN WG2 AH, Vancouver, Canada, Jan. 22-26, 2018, Source: Huawei, HiSilicon, Title: Remaining Issue of Power Management in NR.

(56) References Cited

OTHER PUBLICATIONS

R2-1801043 3GPP TSG-RAN WG2 AH, Vancouver, Canada, Jan. 22-26, 2018, Source: Huawei, HiSilicon, Title: Consideration of PHR with Multi-Beam Operation.
R2-1801404 3GPP TSG-RAN WG2 AH, Vancouver, Canada, Jan. 22-26, 2018, Source: NTT DOCOMO, Inc., Title: Discussion on Beam Failure Recovery.
R2-1801406 3GPP TSG-RAN WG2 AH, Vancouver, Canada, Jan. 22-26, 2018, Source: NTT DOCOMO, Inc., Title: Remaining Issue on PHR.
R2-1801539 3GPP TSG-RAN WG2 AH, Vancouver, Canada, Jan. 22-26, 2018, Source: CATT, Title: PHR MAC CE for EN-DC.
R2-1801540 3GPP TSG-RAN WG2 AH, Vancouver, Canada, Jan. 22-26, 2018, Source: CATT, Title: Correction on PHR MAC CE in EN-DC in TS38.321.
R2-1801564 3GPP TSG-RAN WG2 AH, Vancouver, Canada, Jan. 22-26, 2018, Source: NTT DOCOMO, Inc., Title: LS on PHR.
R2-1801568 3GPP TSG-RAN WG2 AH, Vancouver, Canada, Jan. 22-26, 2018, Source: RAN WG2, Title: LS on PHR.
R2-1801814 3GPP TSG-RAN WG2 #101, Athens, Greece, Feb. 26-Mar. 2, 2018, Source: Huawei, HiSilicon, Title: Beam Failure Recovery on SCell.
R2-1802490 3GPP TSG-RAN WG2 #101, Athens, Greece, Feb. 26-Mar. 2, 2018, Source: CATT, Huawei, HiSilicon, Title: Discussion on Beam Failure Recovery for CA.
R2-1815644 3GPP TSG-RAN WG2 Meeting #103bis, Chengdu, PR China, Oct. 8-12, 2018, Source: Ericsson, Samsung, Title: Correction for Reconfiguration of CFRA during ongoing RA.
R2-1811325 3GPP TSG-RAN WG2 Meeting #103, Gothenburg, Sweden, Aug. 20-24, 2018, Source: Samsung Electronics, Title: Handling Beam Failure Recovery Configuration Update.
3GPP TS 38.321 V15.2.0 (Jun. 2018), Technical Specification, 3rd Generation Partnership Project; Technical Specification Group Radio Access Network; NR; Medium Access Control (MAC) protocol specification (Release 15).
R2-1811149 3GPP TSG-RAN WG2 Meeting #103, Gothenburg, Sweden, Aug. 20-24, 2018, Source: OPPO, Title: CR on beam failure recovery configuration.
R2-1811593 3GPP TSG-RAN WG2 Meeting #103, Gothenburg, Sweden, Aug. 20-24, 2018, Source: ZTE Corporation, Sanechips, Title: CR for the configuration of BeamFailureRecoveryConfig.
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
R1-180XXXX 3GPP TSG-RAN WG1 Meeting #94, Gothenburg, Sweden, Aug. 20-24, 2018, Source: Ericsson, Title: Feature lead summary beam management v2.
R2-1804763 3GPP TSG-RAN WG2 Meeting #101bis, Sanya, China, Apr. 16-20, 2018, Source: Nokia, Nokia Shanghai Bell, Title: Running MAC CR for euCA.
R1-180XXXX 3GPP TSG-RAN WG1 Meeting #94, Gothenburg, Sweden, Aug. 20-24, 2018, Source: NTT DOCOMO, Inc., Title: Offline summary for PDCCH structure and search space.
R1-180XXXX 3GPP TSG-RAN WG1 Meeting #94, Gothenburg, Sweden, Aug. 20-24, 2018, Source: MediaTek Inc., Title: Summary #1 on Remaining Issues on Beam Failure Recovery.
R1-1712153 3GPP TSG RAN WG1 Meeting #90, Prague, Czech Republic, Aug. 21-25, 2017, Source: Huawei, HiSilicon, Title: Overview of bandwidth part.
R1-1713204 3GPP TSG RAN WG1 Meeting #90, Prague, Czech Republic, Aug. 21-25, 2017, Source: LG Electronics, Title: Further remaining details on wider bandwidth operation.
R1-1713978 3GPP TSG RAN WG1 Meeting #90, Prague, Czech Republic, Aug. 21-25, 2017, Source: MediaTek Inc., Title: Further Details on Bandwidth Part Operation in NR.
R1-1719650 3GPP TSG RAN WG1 Meeting #91, Reno, USA, Nov. 27-Dec. 1, 2017, Source: AT&T, Title: Remaining details on bandwidth parts.
R1-1719651 3GPP TSG RAN WG1 Meeting #91, Reno, USA, Nov. 27-Dec. 1, 2017, Source: AT&T, Title: Remaining details on carrier aggregation.
R1-1721027 3GPP TSG RAN WG1 Meeting #91, Reno, USA, Nov. 27-Dec. 1, 2017, Source: Ericsson, Title: On Carrier aggregation related aspects.
R1-1800879 3GPP TSG RAN WG1 NR Ad Hoc, Vancouver, Canada, Jan. 22-26, 2018, Source: Qualcomm Incorporated, Title: Remaining Issues on BWP.
R1-1803622 3GPP TSG RAN WG1 Meeting #92, Sanya, China, Apr. 16-20, 2018, Source: NEC, Title: Remaining issues on beam failure recovery.
R1-1804211 3GPP TSG-RAN WG1 Meeting #92bis, Sanya, China, Apr. 16-20, 2018, Source: Lenovo, Motorola Mobility, Title: Discussion of beam failure recovery for Carrier Aggregation.
R1-1806281 3GPP TSG-RAN WG1 #93, Busan, Korea, May 21-25, 2018, Source: CATT, Title: Remaining issues on beam failure recovery.
R1-1806508 3GPP TSG-RAN WG1 #93, Busan, Korea, May 21-25, 2018, Source: Intel Corporation, Title: Remaining issues on beam failure recovery.
R1-1806789 3GPP TSG-RAN WG1 #93, Busan, Korea, May 21-25, 2018, Source: MediaTek Inc., Title: Remaining issues on beam failure recovery.
R1-1807796 3GPP TSG-RAN WG1 #93, Busan, Korea, May 21-25, 2018, Source: MediaTek Inc., Title: Summary 2 on Remaining issues on beam failure recovery.
R1-1808720 3GPP TSG-RAN WG1 Meeting #94, Gothenburg, Sweden, Aug. 20-24, 2018, Source: Intel Corporation, Title: On SCell Beam Failure Recovery.
R1-1810020 3GPP TSG-RAN WG1 Meeting #94, Gothenburg, Sweden, Aug. 20-24, 2018, Source: Samsung, Title: CR to 38.213 capturing the RAN1#94 meeting agreements.
R2-1713170 3GPP TSG RAN WG2 Meeting #100, Reno, USA, Nov. 27-Dec. 1, 2017, Source: Nokia (rapporteur), Title: Report of [99bis#32][LTE/euCA] Faster activation for Scells (Nokia).
R2-1714289 3GPP TSG RAN WG2 Meeting #100, Reno, USA, Nov. 27-Dec. 1, 2017, Source: Nokia, Nokia Shanghai Bell, Title: Running CR for euCA Stage-2.
R2-1800866 3GPP TSG-RAN WG2 AH, Vancouver, Canada, Jan. 22-26, 2018, Source: vivo, Title: RACH configuration for beam recovery.
R2-1800895 3GPP TSG-RAN WG2 AH, Vancouver, Canada, Jan. 22-26, 2018, Source: vivo, Title: Discussion on the impact on beam failure recovery.
R2-1801432 3GPP TSG RAN WG2 NR Ad Hoc, Vancouver, Canada, Jan. 22-26, 2018, Source: Qualcomm Incorporated, Title: Dormant BWP for fast SCell activation.
R2-1801926 3GPP TSG-RAN WG2 #101, Athens, Greece, Feb. 26-Mar. 2, 2018, Source: ZTE, Sanechips, Title: Remaining considerations on RACH procedure for BFR.
R2-1802143 3GPP TSG-RAN WG2 #101, Athens, Greece, Feb. 26-Mar. 2, 2018, Source: CATT, Title: RACH reattempt considering beam selection.
R2-1802151 3GPP TSG-RAN WG2 #101, Athens, Greece, Feb. 26-Mar. 2, 2018, Source: CATT, Title: Beam failure recovery.
R2-1802756 3GPP TSG RAN WG2 Meeting #101, Athens, Greece, Feb. 26-Mar. 2, 2018, Source: Nokia, Nokia Shanghai Bell, Title: Remaining details on temporary CQI reporting during activation.
R2-1803229 3GPP TSG-RAN WG2 #101, Athens, Greece, Feb. 26-Mar. 2, 2018, Source: Nokia, Nokia Shanghai Bell, Title: BWP switch interaction with contention free BFR preamble.
R2-1803564 3GPP TSG RAN WG2 Meeting #101, Athens, Greece, Feb. 26-Mar. 2, 2018, Source: Qualcomm Incorporated, Title: Dormant BWP for fast SCell activation.
R2-1804279 3GPP TSG-RAN WG2 Meeting #101, Sanya, China, Apr. 16-20, 2018, Source: ASUSTeK, Title: UE behaviours upon beam failure and recovery.
R2-1804303 3GPP TSG-RAN WG2 Meeting #101, Sanya, China, Apr. 16-20, 2018, Source: Samsung, Title: MAC Impacts: Beam Failure Recovery for SCell.

(56) References Cited

OTHER PUBLICATIONS

R2-1804407 3GPP TSG-RAN WG2 Meeting #101, Sanya, China, Apr. 16-20, 2018, Source: ZTE, Sanechips, Title: Consideration on beam failure recovery for SCell.
R2-1804410 3GPP TSG-RAN WG2 Meeting #101, Sanya, China, Apr. 16-20, 2018, Source: Huawei, HiSilicon, Title: Beam failure recovery using MAC CE.
R2-1804411 3GPP TSG-RAN WG2 Meeting #101, Sanya, China, Apr. 16-20, 2018, Source: Huawei, HiSilicon, Title: BWP issues for BFR.
R2-1804434 3GPP TSG-RAN WG2 Meeting #101, Sanya, China, Apr. 16-20, 2018, Source: OPPO, Title: Issues on supporting SCell BFR RACH.
R2-1804481 3GPP TSG-RAN WG2 Meeting #101, Sanya, China, Apr. 16-20, 2018, Source: CATT, Title: Leftover issues for BFR.
R2-1804482 3GPP TSG-RAN WG2 Meeting #101, Sanya, China, Apr. 16-20, 2018, Source: CATT, Title: BFR configurations and fallback options.
R2-1804483 3GPP TSG-RAN WG2 Meeting #101, Sanya, China, Apr. 16-20, 2018, Source: CATT, Title: BFR on SCell.
R2-1804696 3GPP TSG-RAN WG2 Meeting #101, Sanya, China, Apr. 16-20, 2018, Source: vivo, Title: Discussion on the SCell BFR.
R2-1805204 3GPP TSG-RAN WG2 Meeting #101, Sanya, China, Apr. 16-20, 2018, Source: Lenovo, Motorola Mobility, Title: Dedicated PRACH resource for beam failure recovery.
R2-1805414 3GPP TSG-RAN WG2 Meeting #101, Sanya, China, Apr. 16-20, 2018, Source: Ericsson, Title: Beam Failure Recovery in SCell and contention-based BFR on SpCell.
R2-1805896 3GPP TSG-RAN WG2 Meeting #101, Sanya, China, Apr. 16-20, 2018, Source: Huawei, HiSilicon, Title: ASN.1 for Beam Failure Recovery.
R2-1805905 3GPP TSG-RAN WG2 Meeting #101, Sanya, China, Apr. 16-20, 2018, Source: Huawei, HiSilicon, Title: Discussions on RA for SCells BFR.

* cited by examiner

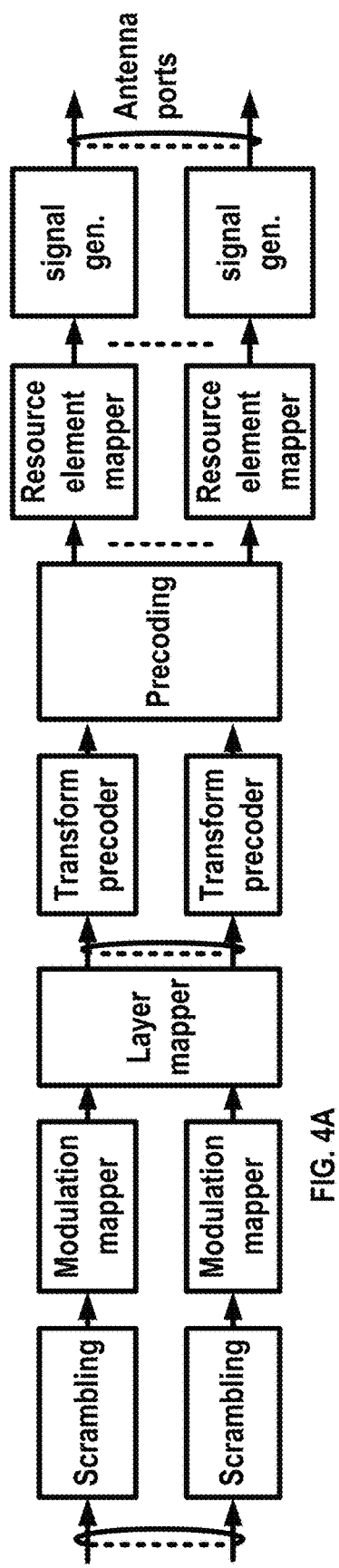
FIG. 4A
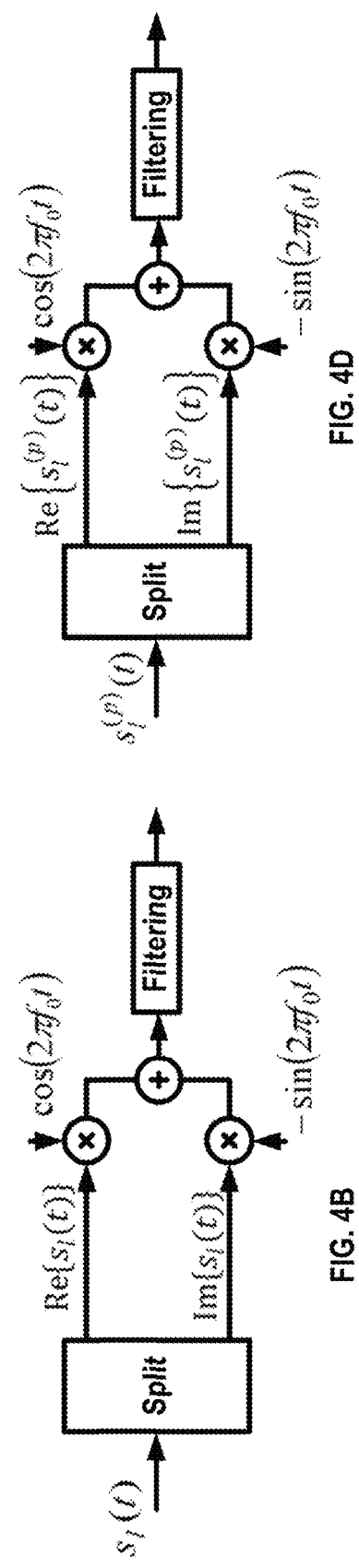
FIG. 4B
FIG. 4D
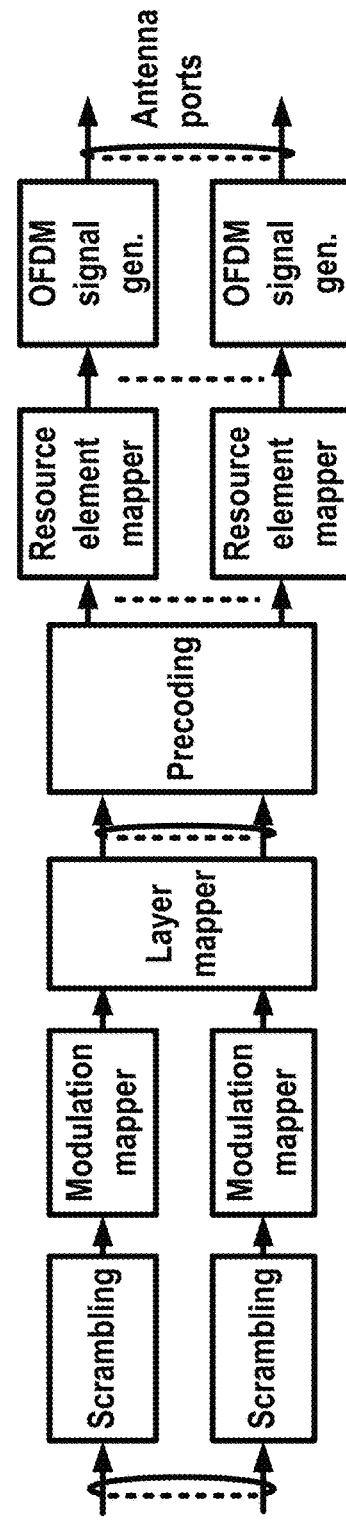
FIG. 4C

| Beam indexes in a second set of RSs | Beam Indicators in a PUCCH transmission |
|---|---|
| First beam index (e.g., RS 12) | 00 |
| Second beam index (e.g., RS 21) | 01 |
| Third beam index (e.g., RS 54) | 10 |
| Fourth beam index (e.g., RS 62) | 11 |

FIG. 23

CONFIGURATION FOR BEAM FAILURE RECOVERY

CROSS-REFERENCE TO RELATED APPLICATIONS

This application is a continuation of U.S. application Ser. No. 16/370,476, filed Mar. 29, 2019, which claims the benefit of U.S. Provisional Application No. 62/650,725, titled "PUCCH Configuration for Beam Failure Recovery" and filed on Mar. 30, 2018. The above-referenced application is hereby incorporated by reference in its entirety.

BACKGROUND

A wireless device may be configured to receive transmissions via one of multiple different beams associated with a cell. Although this capability may increase cell capacity, individual beams may be subject to interruption, interference, transmission irregularities at a cell, and/or other issues. If such problems occur and a wireless device cannot be reconfigured to receive transmissions via a different beam, service may be degraded. It is desired to improve wireless communications by increasing the likelihood for a successful beam failure recovery procedure, without adversely increasing signaling overhead and/or decreasing spectral efficiency.

SUMMARY

The following summary presents a simplified summary of certain features. The summary is not an extensive overview and is not intended to identify key or critical elements.

Systems, apparatuses, and methods are described for wireless communications. A base station may send configuration information for a beam failure recovery (BFR) procedure. A base station and/or a wireless device may have different capabilities for beam correspondence. The configuration information may comprise a transmission beam index. A wireless device may determine, based on the transmission beam index, one or more transmission beams of the wireless devices for the BFR procedure. The wireless device may select, based on a measurement of one or more downlink signals, one or more candidate beams of the base station. The wireless device may send, to the base station, one or more uplink signals to indicate the one or more candidate beams of the base station. The one or more uplink signals may be sent via the one or more transmission beams of the wireless device. The BFR procedure may be used with or without beam correspondence.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C and FIG. 4D show examples of uplink and downlink signal transmission.

FIG. 23 shows an example beam index mapping procedure.

DETAILED DESCRIPTION

Figure 1:
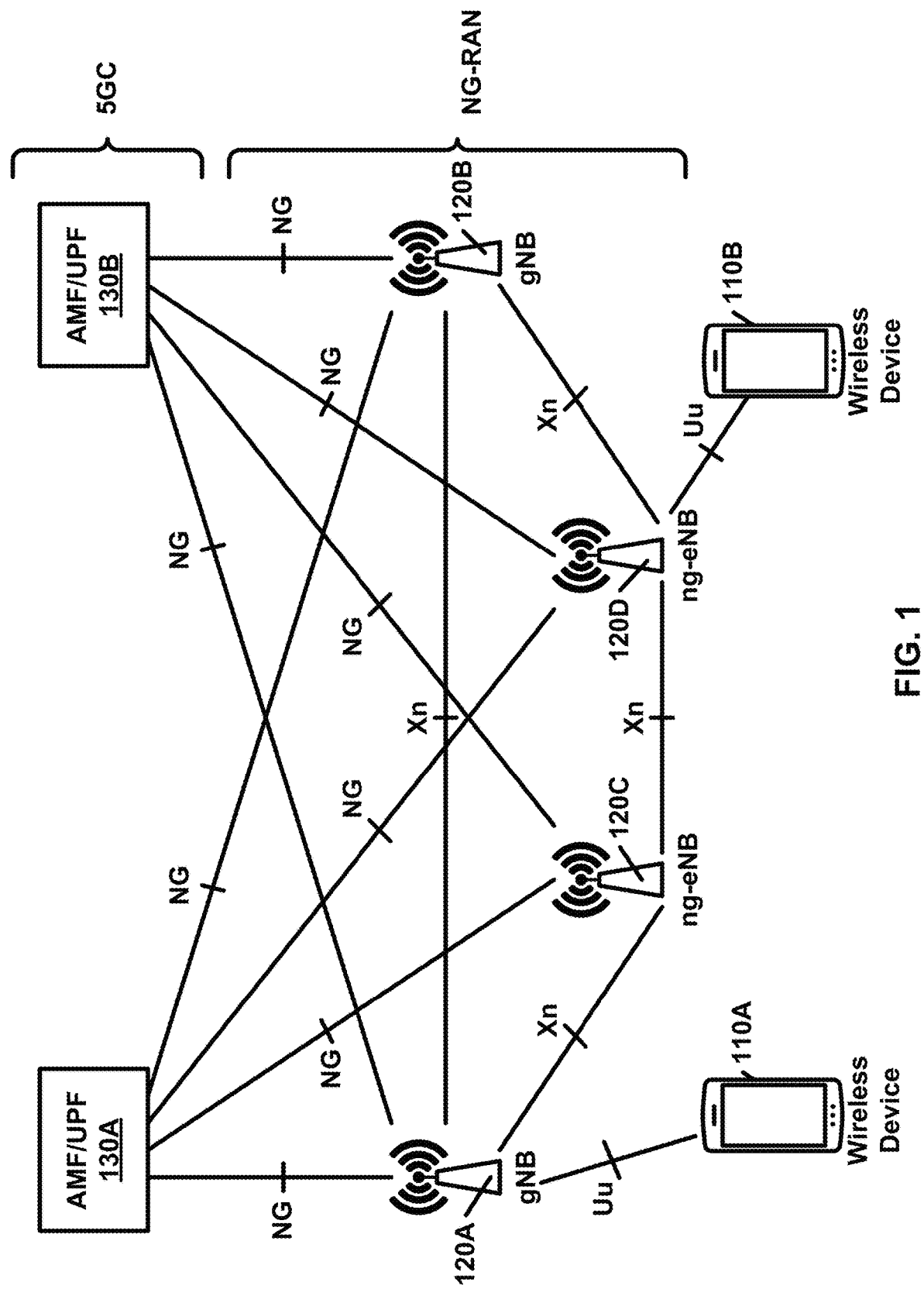
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to wireless communication systems in multicarrier communication systems.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix— Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
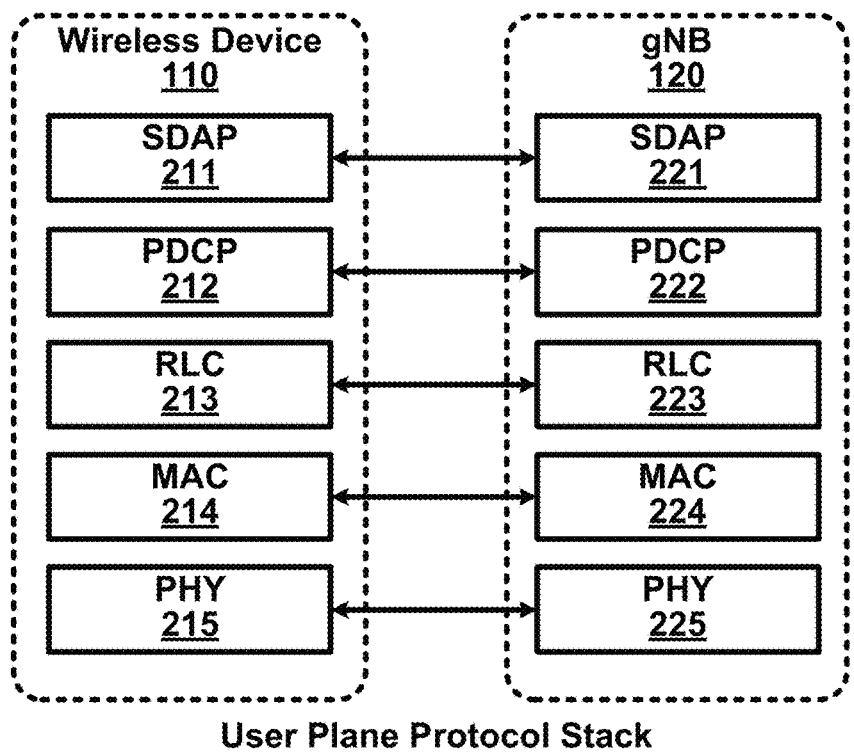
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Media Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
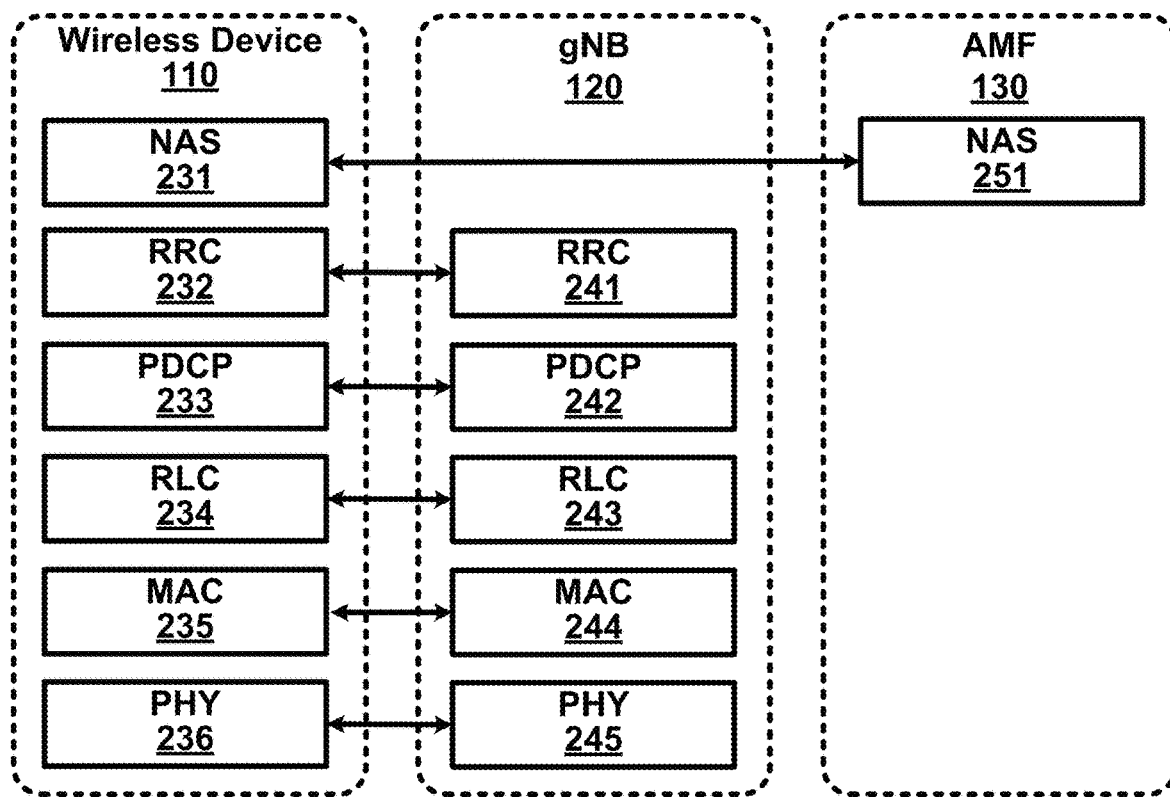
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MA CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs indicating one or more timing advance values for one or more Timing Advance Groups (TAGs).

Figure 3:
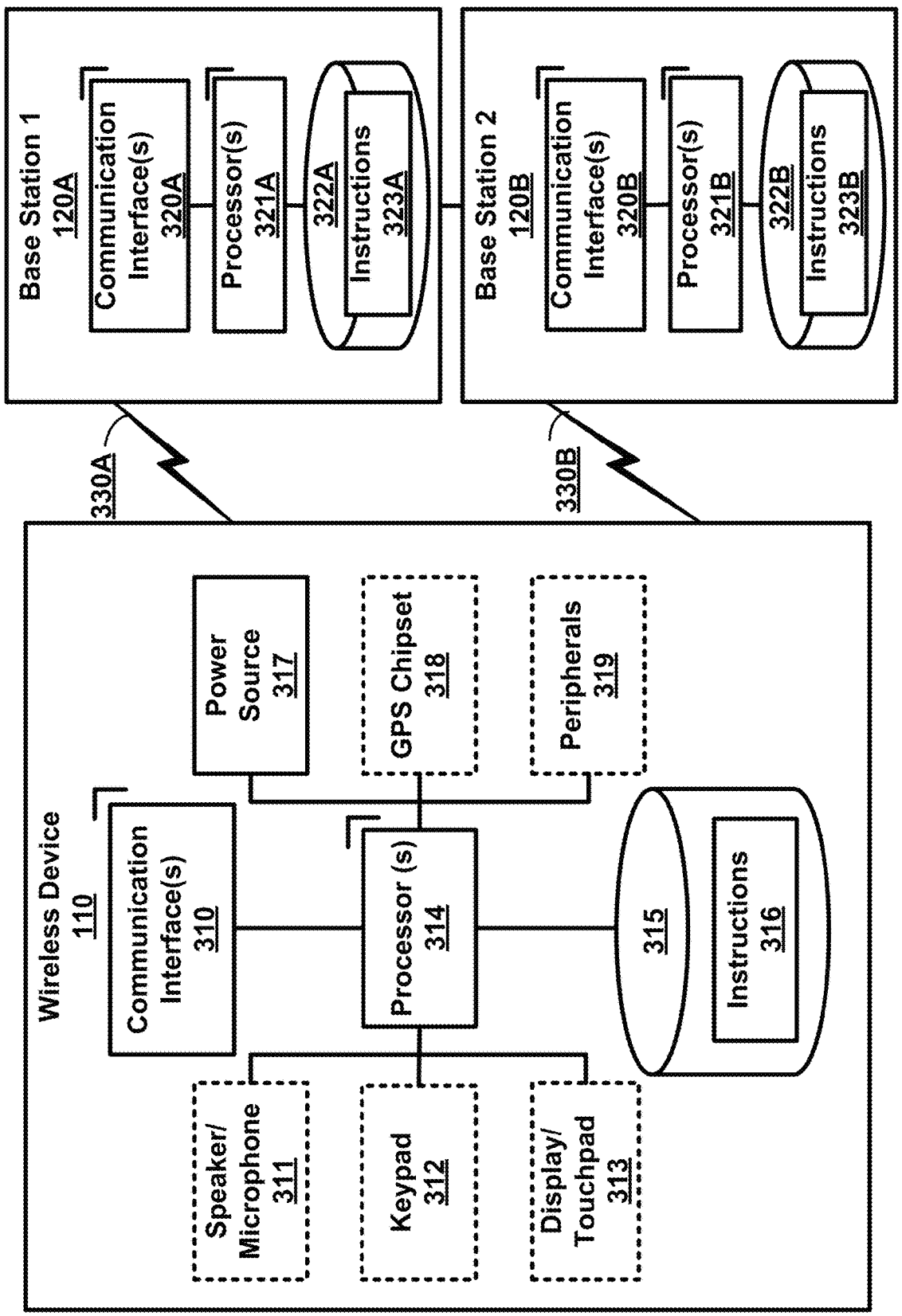
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterinformationBlock and SystemInformationBlockType1). Another SI may be transmitted via SystemInformationBlockType2. For a wireless device in an RRC_Connected state, dedicated RRC signaling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g. AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
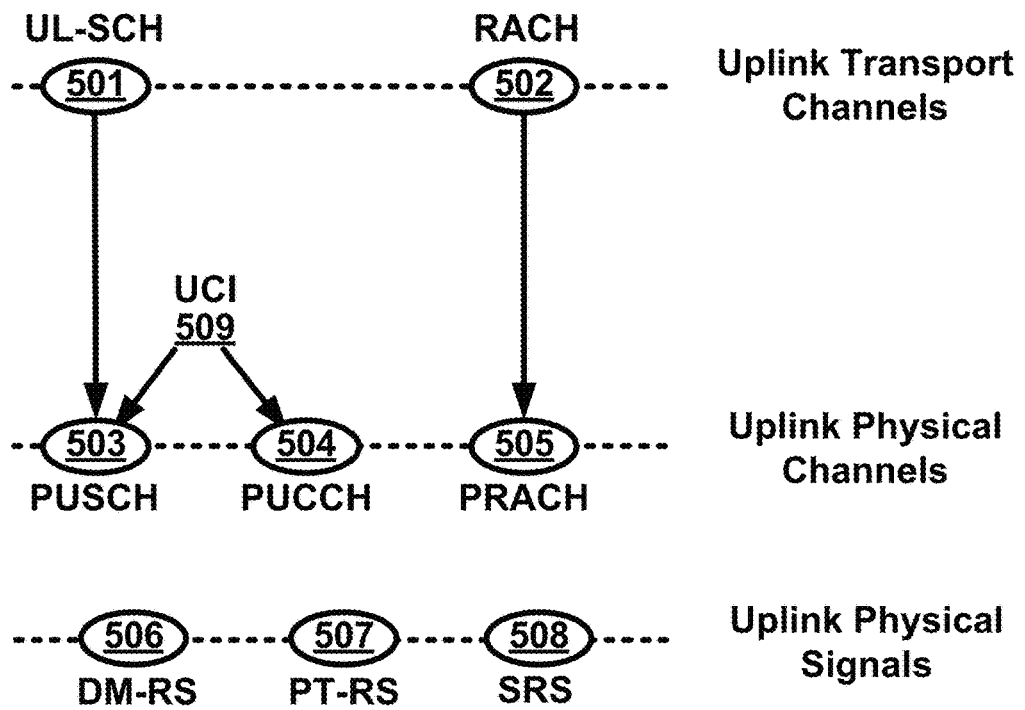
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
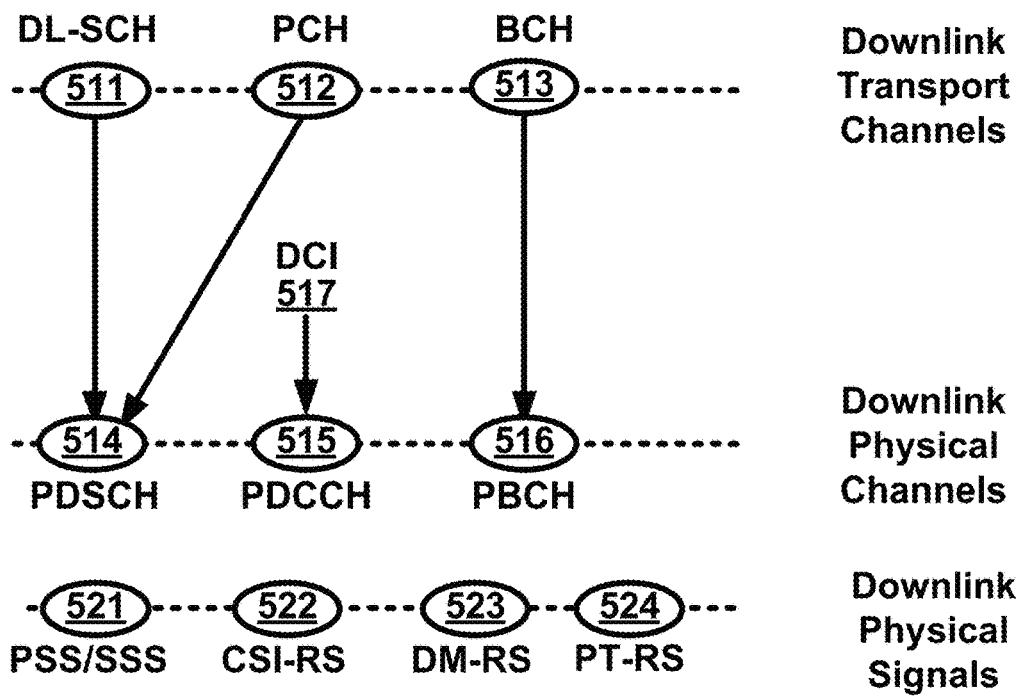
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SS/PBCH blocks, for example, if the downlink CSI-RS 522 and SS/PBCH blocks are spatially quasi co-located and resource elements associated with the downlink CSI-RS 522 are outside of the PRBs configured for the SS/PBCH blocks.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. A DM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
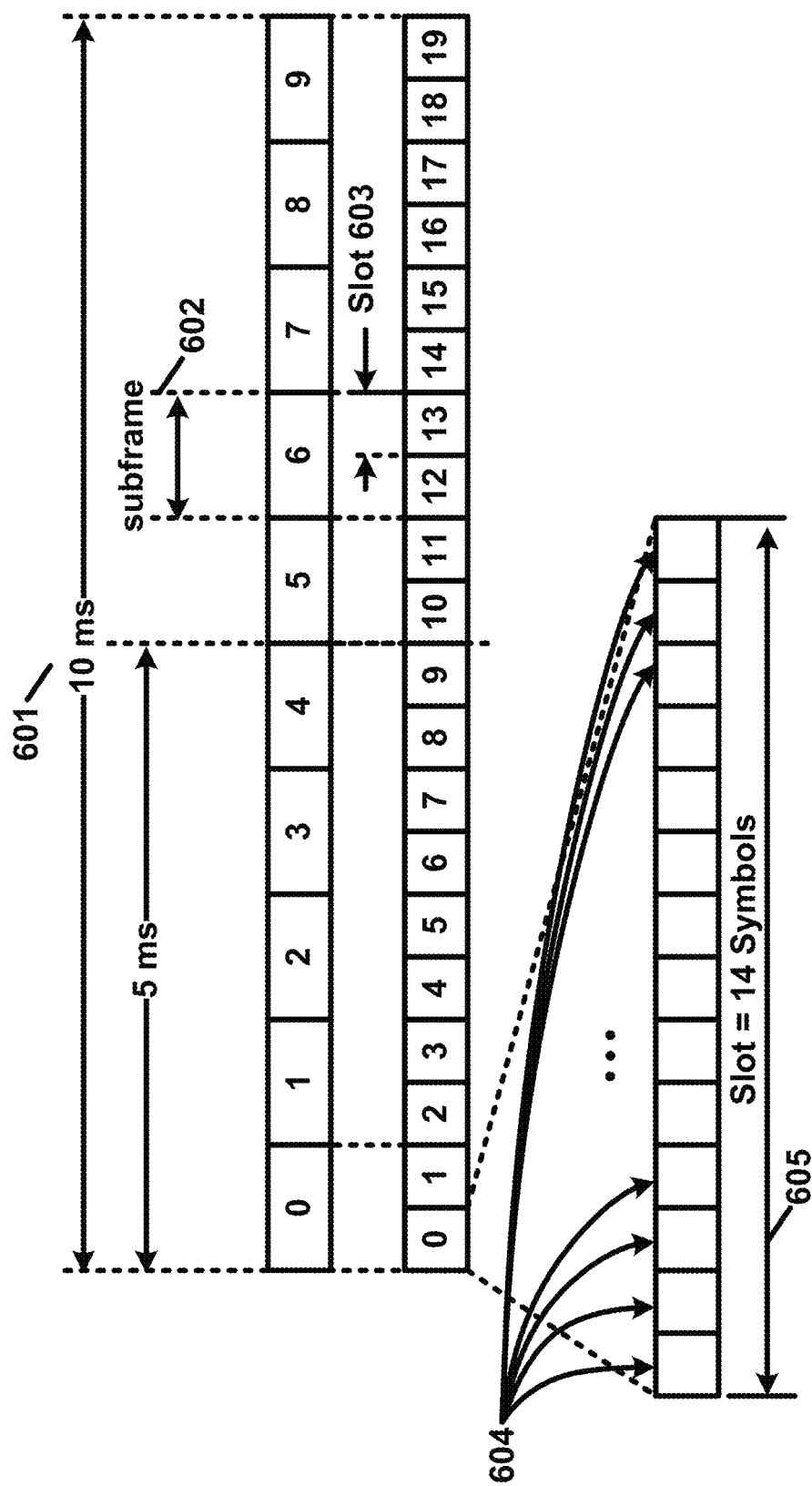
FIG. 6 shows an example transmission time and/or reception time for a carrier.

FIG. 6 shows an example transmission time and reception time for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
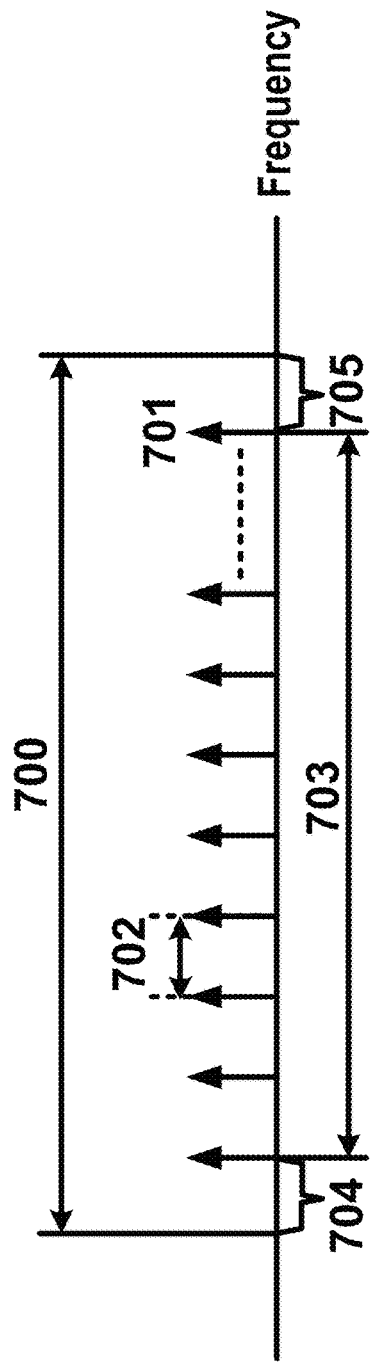
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
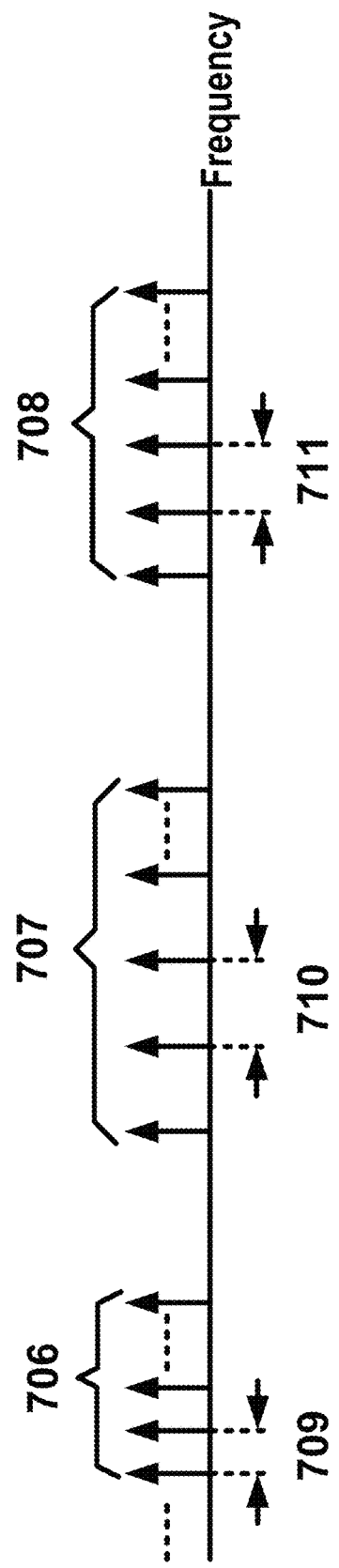

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
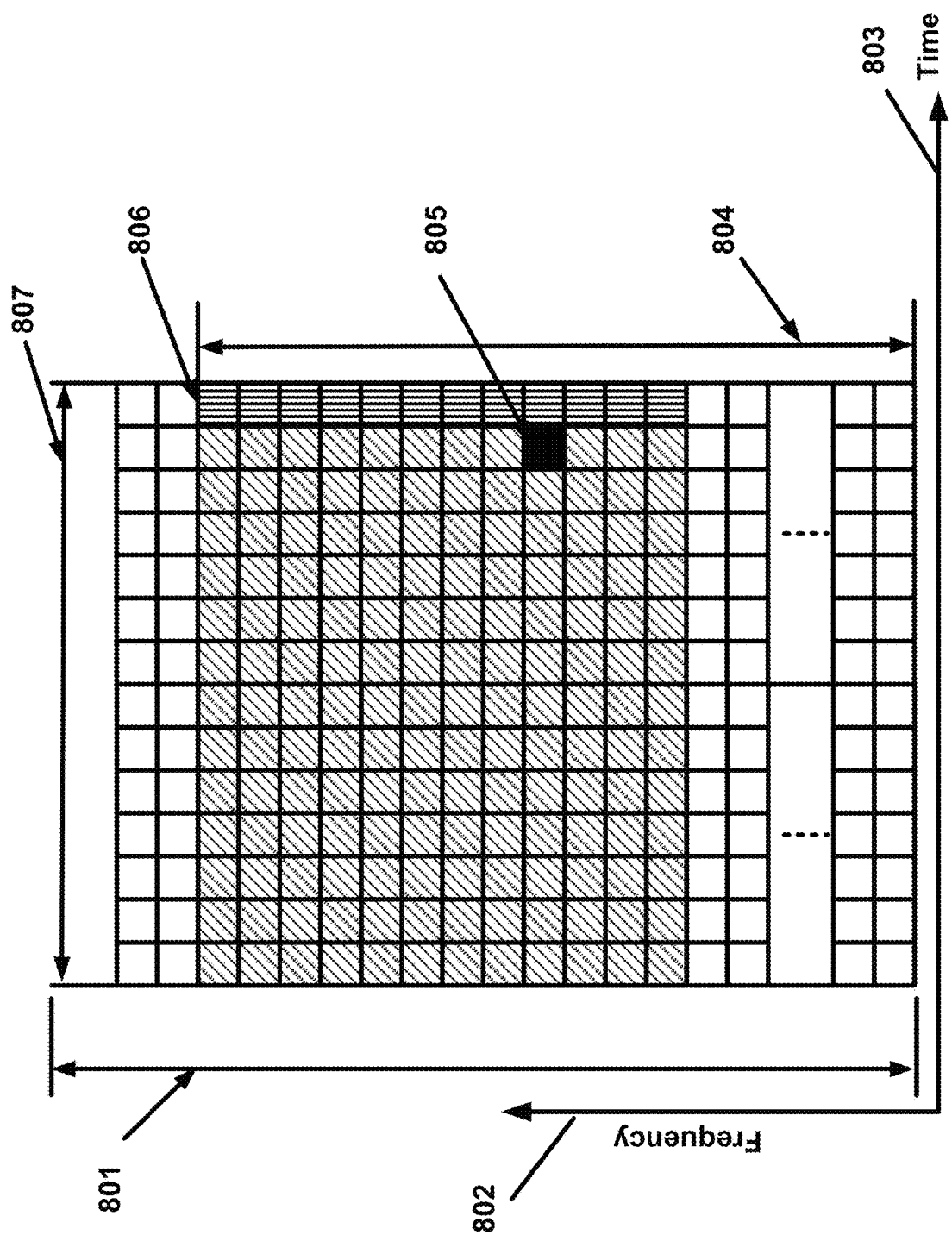
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
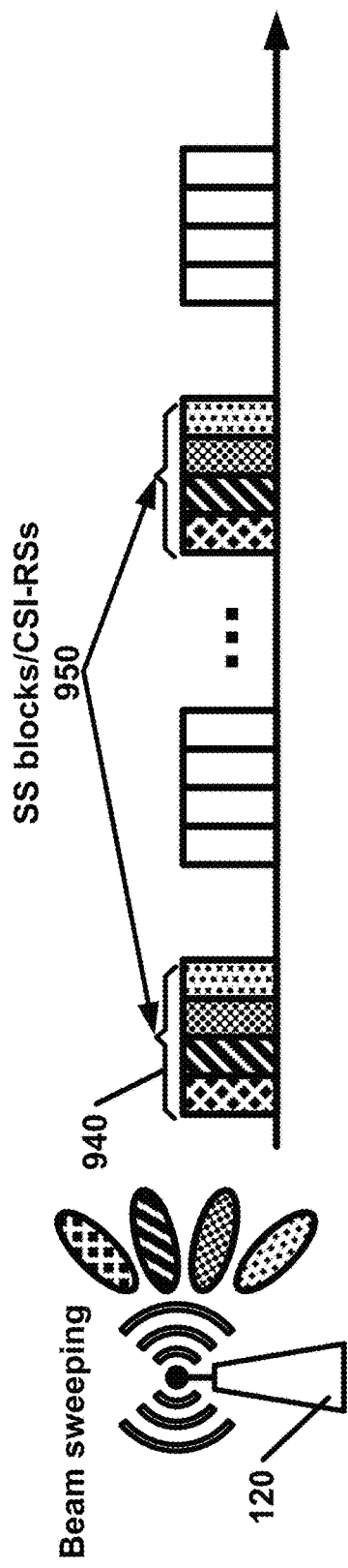
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
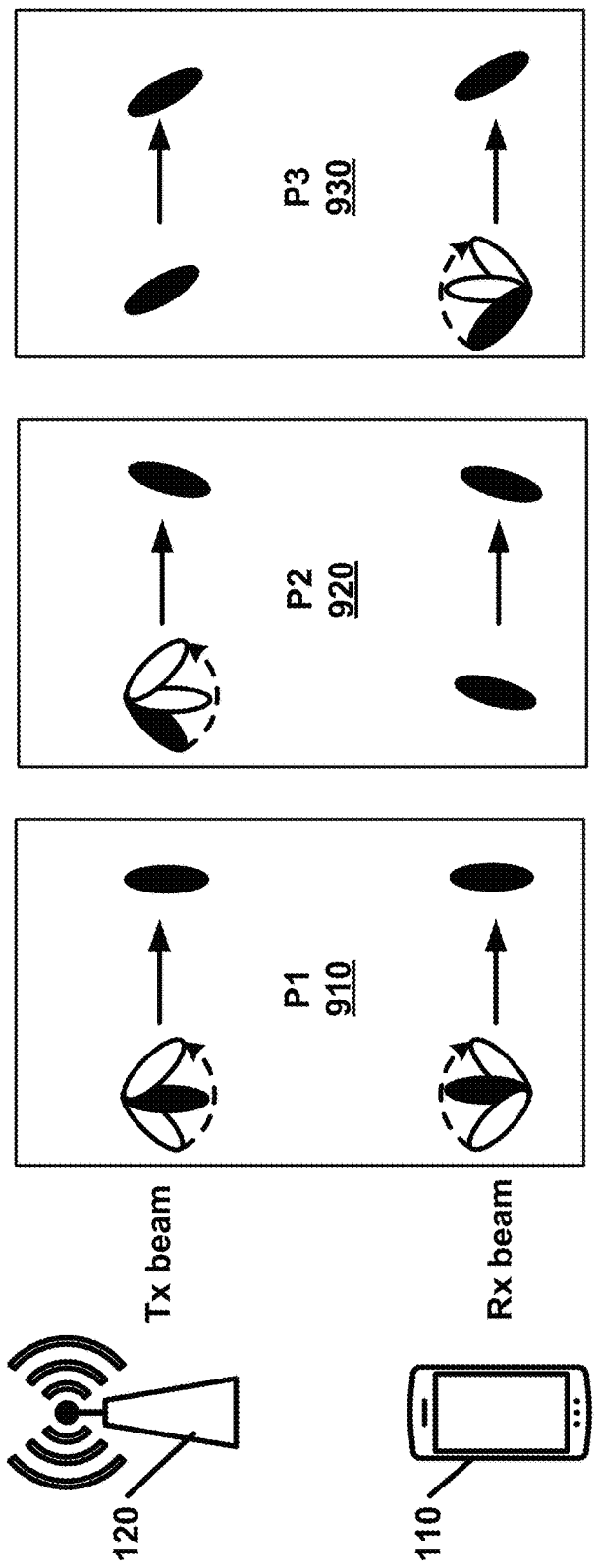
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
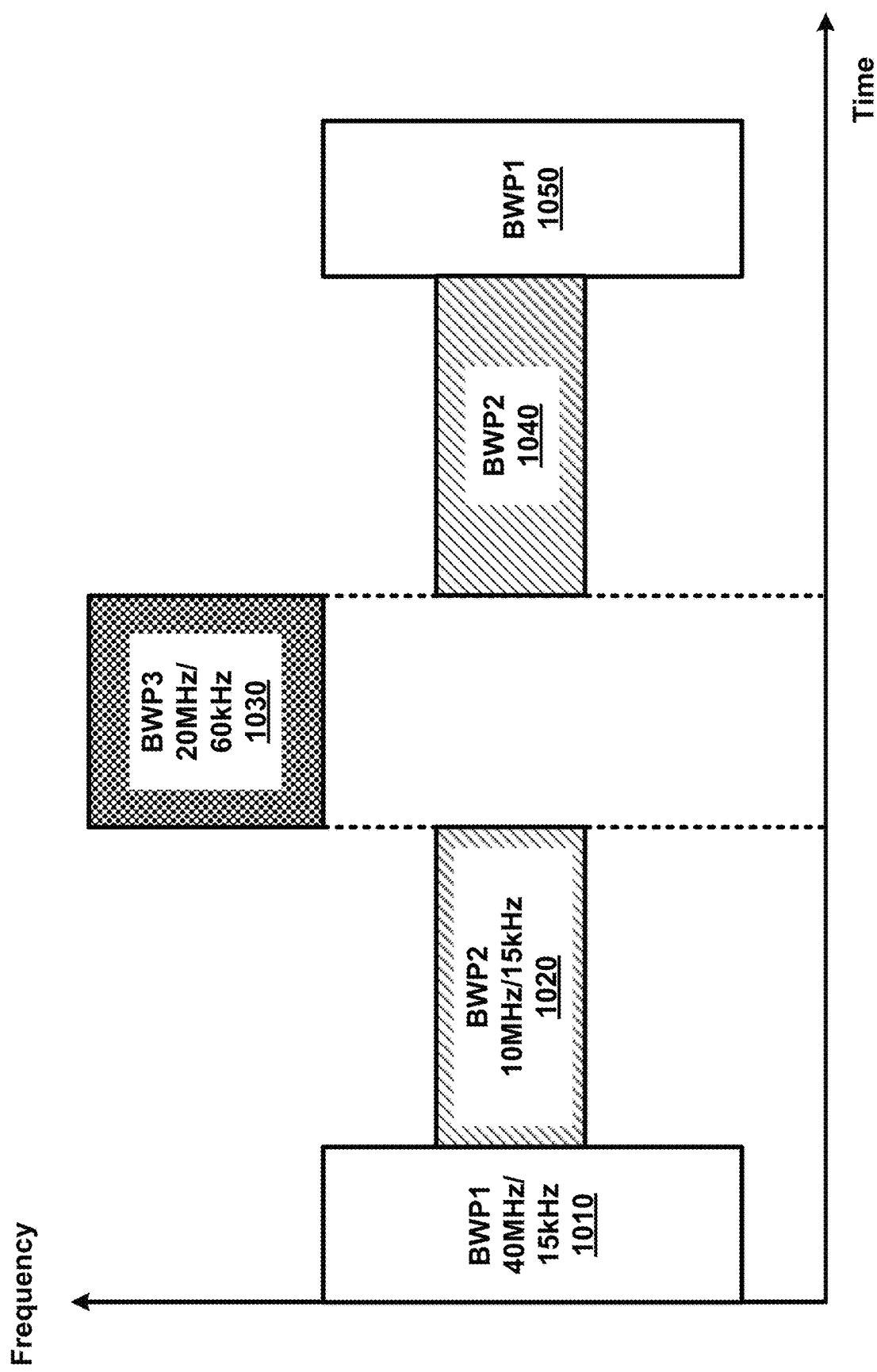
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a control resource set for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base statin may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
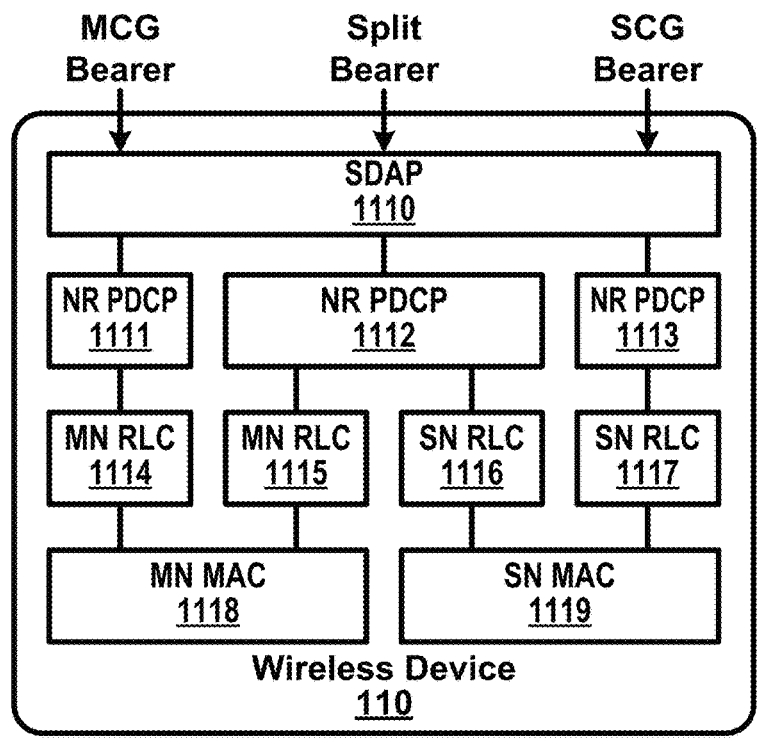
FIG. 11A and FIG. 11B show examples of multi connectivity.
Figure 11B:
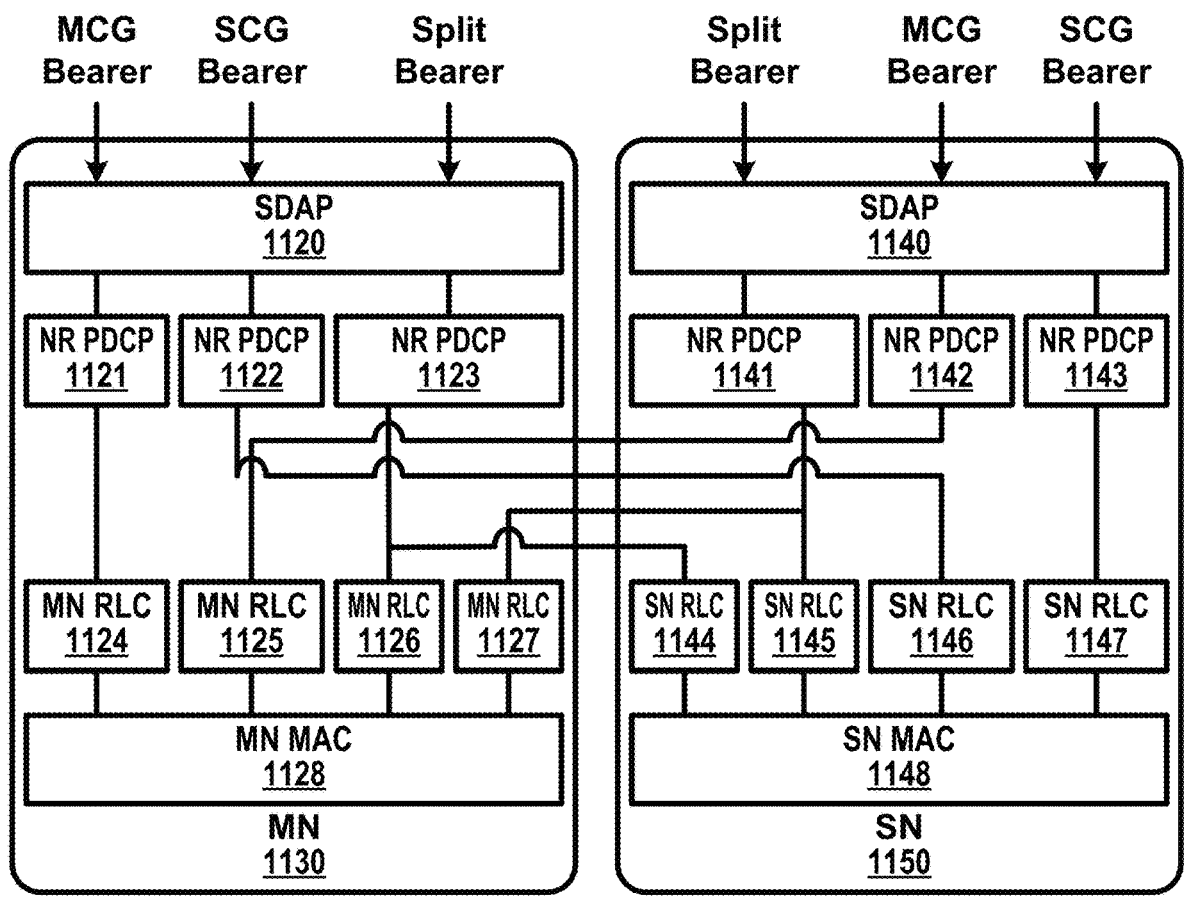

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
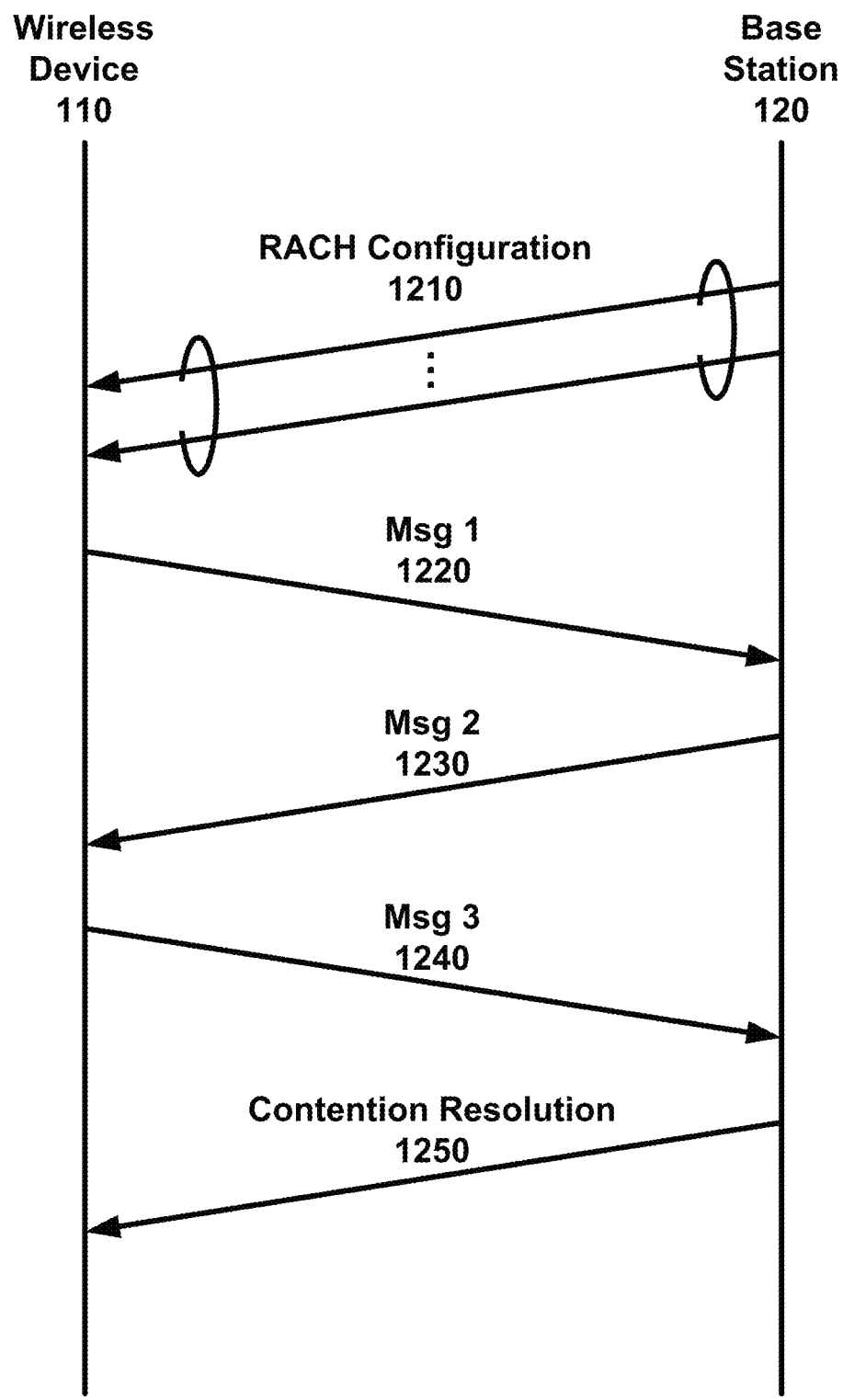
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery procedure and corresponding PRACH resource(s) (e.g., if any), a time window to monitor RA response(s), a time window to monitor response(s) on a beam failure recovery procedure, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery procedure associated with at least one of SS blocks and/or CSI-RSs. A wireless device may select a random access preamble index corresponding to a selected SS block or a CSI-RS from a set of one or more random access preambles for a beam failure recovery procedure, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery procedure. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
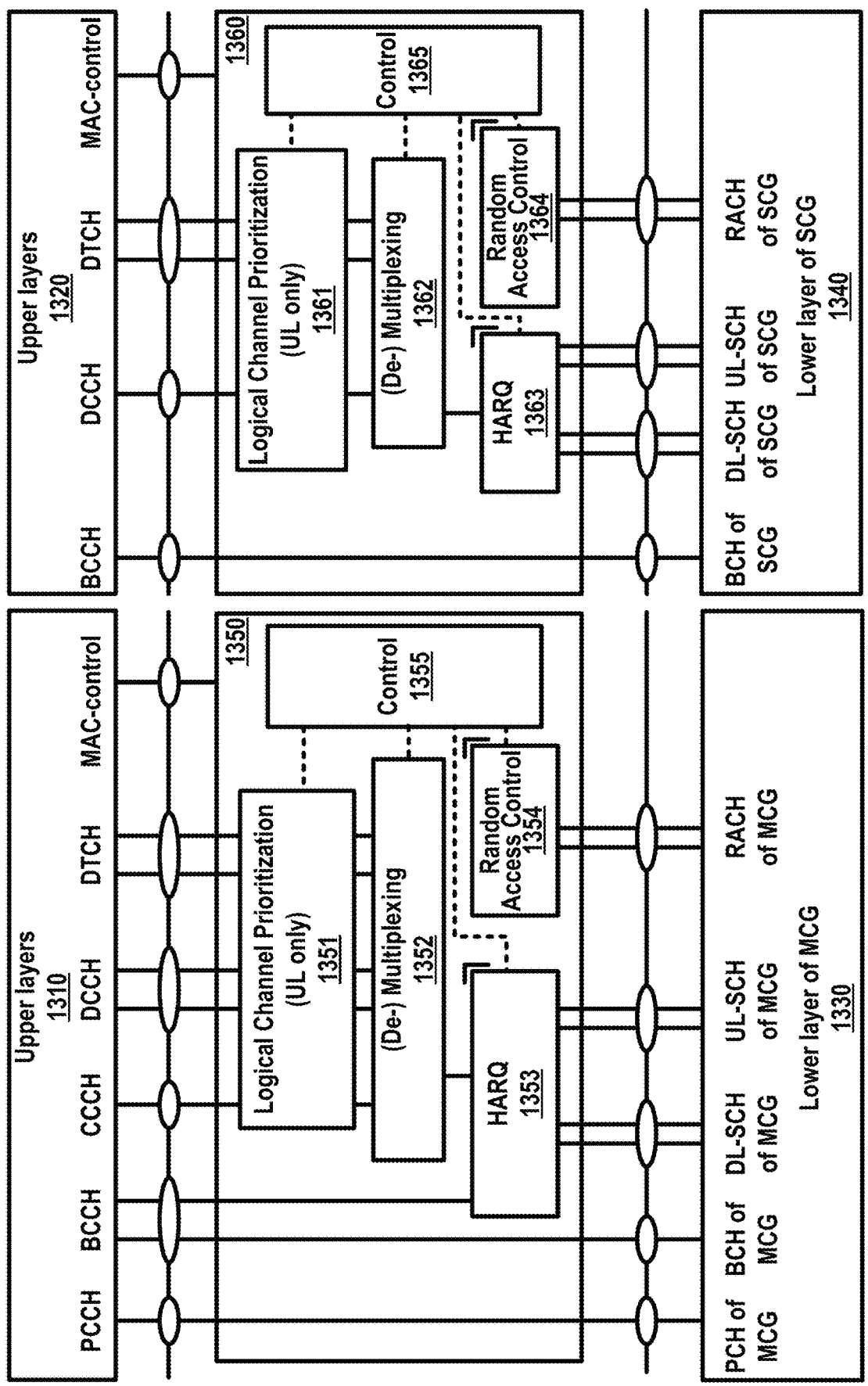
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
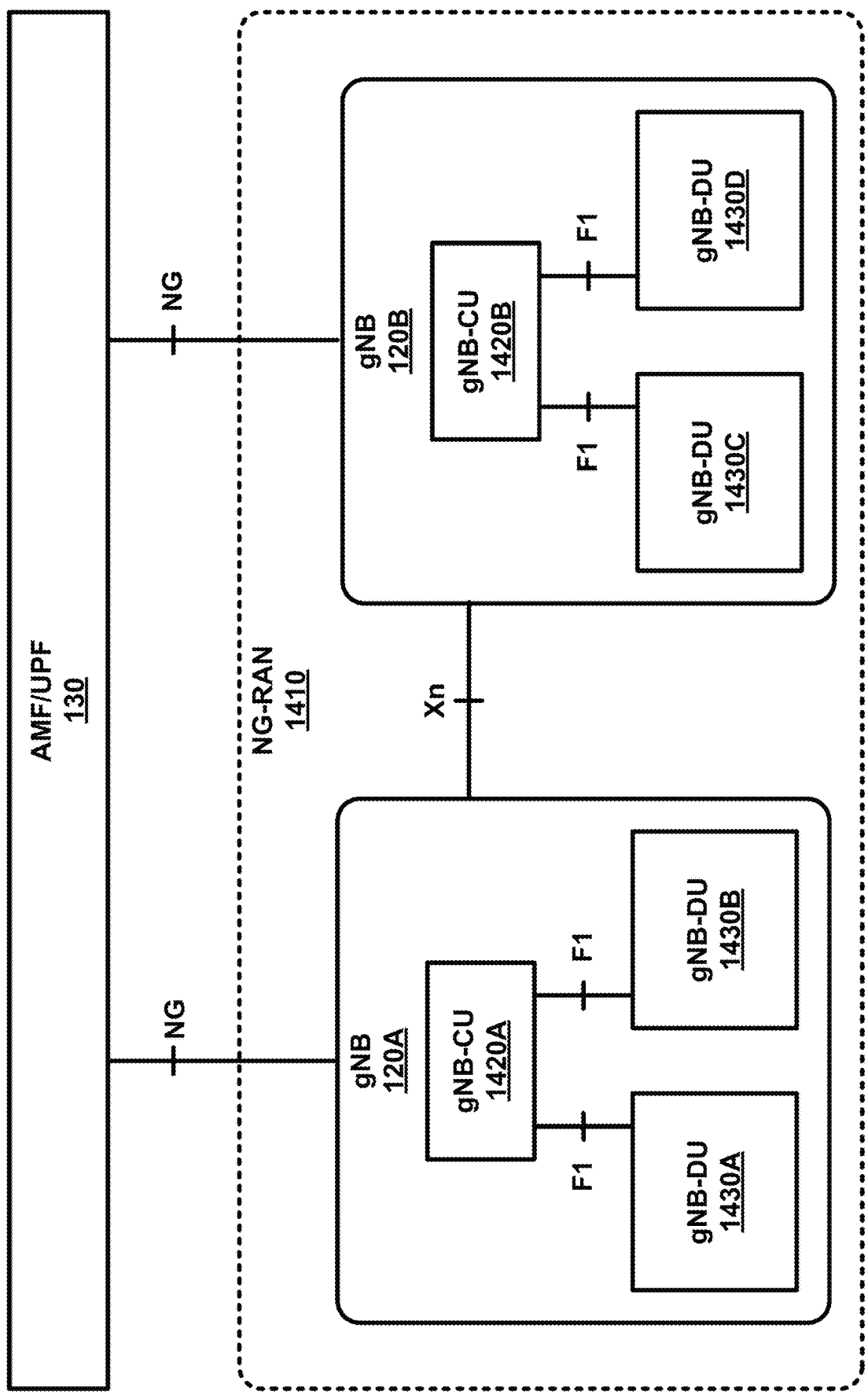
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
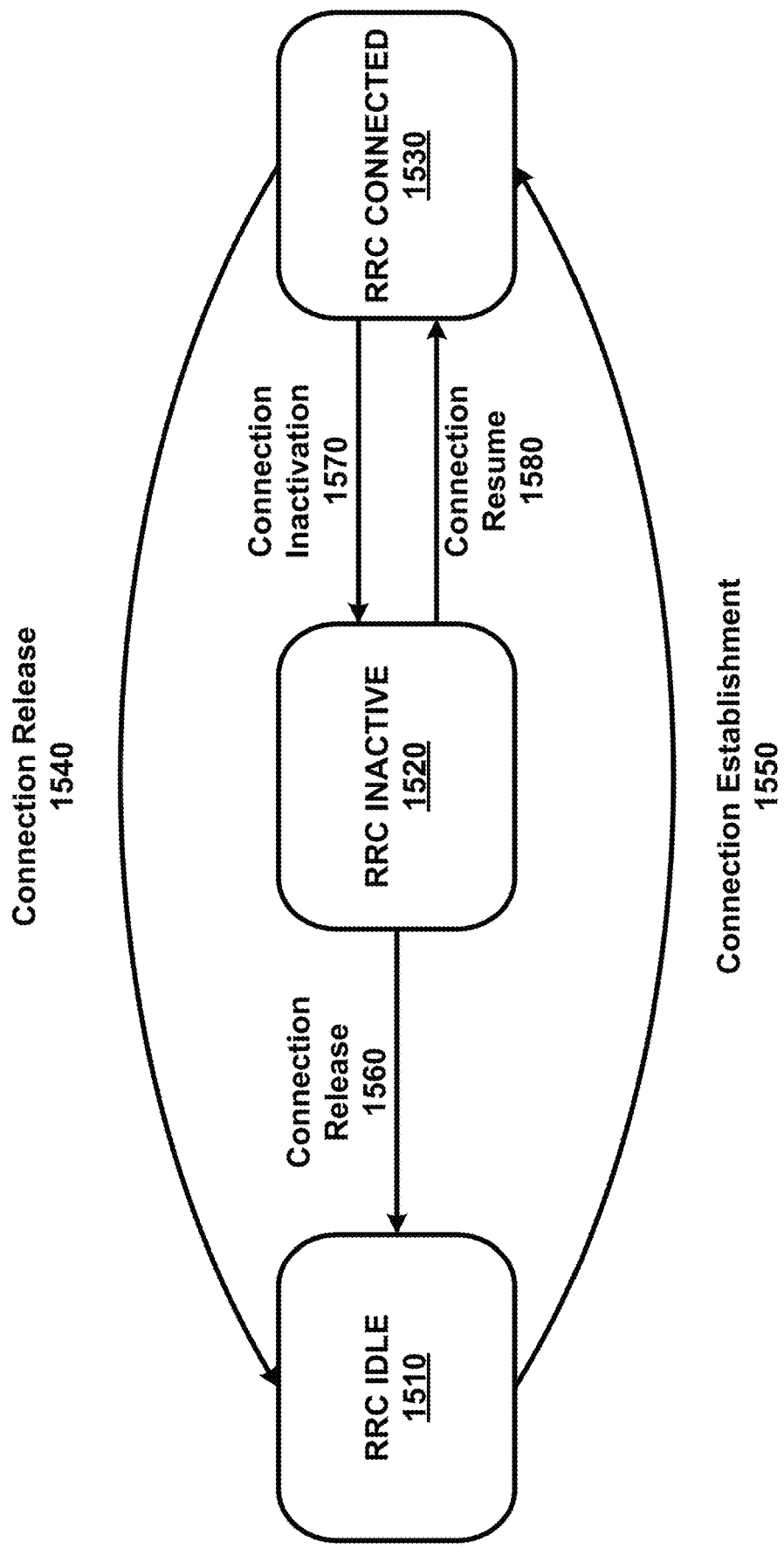
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4 stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more radio technologies (e.g., an NR system, etc.). The one or more radio technologies may comprise at least one of: multiple technologies related to a physical layer; multiple technologies related to a MAC layer; and/or multiple technologies related to an RRC layer. Enhancement of the one or more radio technologies may improve performance of a wireless network. Enhancement of the one or more radio technologies may also increase a system throughput or a data rate of a transmission. Enhancement of the one or more radio technologies may reduce battery consumption of a wireless device Enhancement of the one or more radio technologies may improve latency of a data transmission between a base station and a wireless device. Enhancement of the one or more radio technologies may improve a network coverage of a wireless network Enhancement of the one or more radio technologies may improve transmission efficiency of a wireless network.

A base station (e.g., a gNB) and/or a wireless device may have multiple antennas, for example, to support a transmission with high data rate (such as in an NR system). A wireless device may perform one or more beam management procedures, as shown in FIG. 9B, for example, if configured with multiple antennas.

A wireless device may perform a downlink beam management based on one or more CSI-RSs and/or one or more SS blocks. In a beam management procedure, a wireless device may measure a channel quality of a beam pair link. The beam pair link may comprise a transmitting beam from a base station and a receiving beam at the wireless device. A wireless device may measure the multiple beam pair links between the base station and the wireless device, for example, if the wireless device is configured with multiple beams associated with multiple CSI-RSs and/or SS blocks.

A wireless device may send (e.g., transmit) one or more beam management reports to a base station. The wireless device may indicate one or more beam pair quality parameters, for example, in a beam management report. The one or more beam pair quality parameters may comprise at least one or more beam identifications; RSRP; and/or PMI, CQI, and/or RI of at least a subset of configured multiple beams.

A base station and/or a wireless device may perform a downlink beam management procedure on one or multiple Transmission and Receiving Point (TRPs), such as shown in FIG. 9B. Based on a wireless device's beam management report, a base station may send (e.g., transmit), to the wireless device, a signal indicating that a new beam pair link is a serving beam. The base station may transmit PDCCH and/or PDSCH to the wireless device using the serving beam.

A wireless device and/or a base station may trigger a beam failure recovery mechanism. A wireless device may trigger a beam failure recovery request (BFRQ) procedure, for example, if at least a beam failure occurs. A beam failure may occur if a quality of beam pair link(s) of at least one PDCCH falls below a threshold. The threshold may comprise an RSRP value (e.g., −140 dbm, −110 dbm, or any other value) and/or a Signal to Interference & Noise Ratio (SINR) value (e.g., −3 dB, −1 dB, or any other value), which may be configured in an RRC message.

Figure 16A:
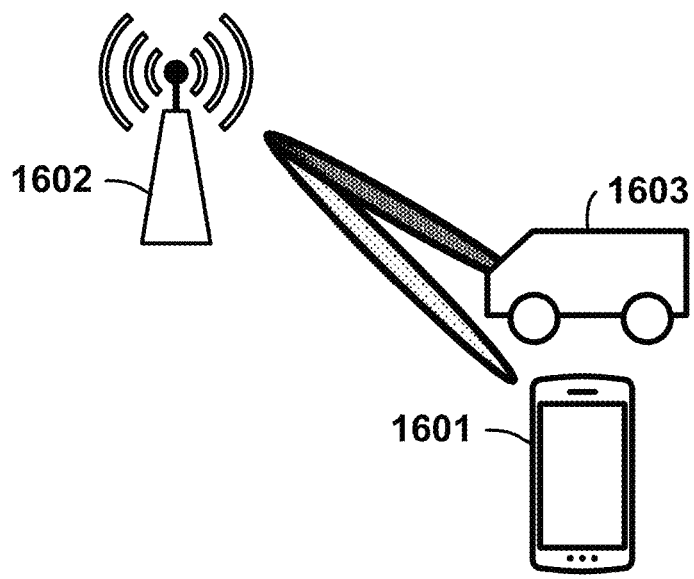
FIG. 16A and FIG. 16B show examples of a downlink beam failure event.

FIG. 16A shows an example of a first beam failure event. A base station 1602 may send (e.g., transmit) a PDCCH from a transmission (Tx) beam to a receiving (Rx) beam of a wireless device 1601 from a TRP. The base station 1602 and the wireless device 1601 may start a beam failure recovery procedure on the TRP, for example, if the PDCCH on the beam pair link (e.g., between the Tx beam of the base station 1602 and the Rx beam of the wireless device 1601) have a lower-than-threshold RSRP and/or SINR value due to the beam pair link being blocked (e.g., by a moving vehicle 1603, a building, or any other obstruction).

Figure 16B:
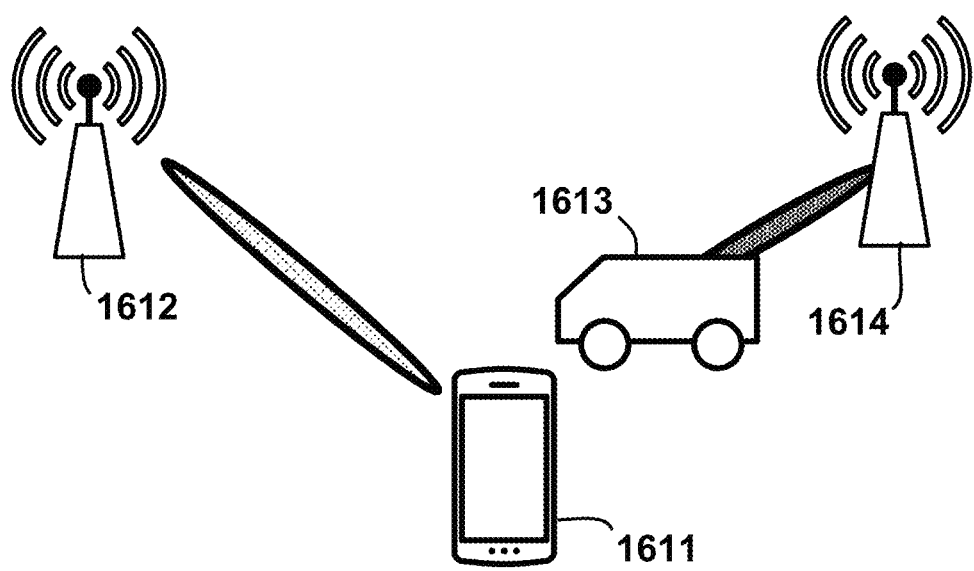

FIG. 16B shows an example of a second beam failure event. A base station 1610 may send (e.g., transmit) a PDCCH from a beam to a wireless device 1611 from a first TRP 1614. The base station 1602 and the wireless device 1611 may start a beam failure recovery procedure on a new beam on a second TRP 1612, for example, if the PDCCH on the beam is blocked (e.g., by a moving vehicle, building, or any other obstruction).

A wireless device may measure a quality of beam pair links using one or more RSs. The one or more RSs may comprise one or more SS blocks and/or one or more CSI-RS resources. A CSI-RS resource may be determined by a CSI-RS resource index (CRI). A quality of beam pair links may be indicated by, for example, an RSRP value, a reference signal received quality (e.g., RSRQ) value, and/or a CSI (e.g., SINR) value measured on RS resources. A base station may indicate whether an RS resource, used for measuring beam pair link quality, is QCLed (Quasi-Co-Located) with DM-RSs of a PDCCH. The RS resource and the DM-RSs of the PDCCH may be QCLed, for example, if the channel characteristics from a transmission on an RS to a wireless device, and that from a transmission on a PDCCH to the wireless device, are similar or same under a configured criterion. The RS resource and the DM-RSs of the PDCCH may be QCLed, for example, if Doppler shift and/or Doppler shift of the channel from a transmission on an RS to a wireless device, and that from a transmission on a PDCCH to the wireless device, are the same.

A wireless device may monitor a PDCCH on M (e.g., 2, 4, 8) beam pair links simultaneously, where M≥1 and the value of M may depend at least on capability of the wireless device. Monitoring a PDCCH may comprise detecting a DCI via the PDCCH transmitted on common search spaces and/or wireless device specific search spaces. Monitoring multiple beam pair links may increase robustness against beam pair link blocking. A base station may send (e.g., transmit) one or more messages comprising parameters indicating a wireless device to monitor PDCCH on different beam pair link(s) in different OFDM symbols.

A base station may send (e.g., transmit) one or more RRC messages and/or MAC CEs comprising parameters indicating Rx beam setting of a wireless device for monitoring PDCCH on multiple beam pair links. A base station may send (e.g., transmit) an indication of a spatial QCL between DL RS antenna port(s) and DL RS antenna port(s) for demodulation of DL control channel. The indication may comprise a parameter in a MAC CE, an RRC message, a DCI, and/or any combinations of these signaling.

A base station may indicate spatial QCL parameters between DL RS antenna port(s) and DM-RS antenna port(s) of DL data channel, for example, for reception of data packet on a PDSCH. A base station may send (e.g., transmit) DCI comprising parameters indicating the RS antenna port(s) are QCLed with DM-RS antenna port(s).

A wireless device may measure a beam pair link quality based on CSI-RSs QCLed with DM-RS for PDCCH, for example, if a base station sends (e.g., transmits) a signal indicating QCL parameters between CSI-RS and DM-RS for PDCCH. The wireless device may start a BFR procedure, for example, if multiple contiguous beam failures occur.

A wireless device may send (e.g., transmit) a BFR signal (e.g., a BFRQ signal) on an uplink physical channel to a base station, for example, if starting a BFR procedure. The base station may send (e.g., transmit) a DCI via a PDCCH in a CORESET, for example, after or in response to receiving the BFR signal (e.g., the BFRQ signal) on the uplink physical channel. The wireless device may determine that the BFR procedure is successfully completed, for example, after or in response to receiving the DCI via the PDCCH in the CORESET.

A base station may send (e.g., transmit) one or more messages comprising configuration parameters of an uplink physical channel, or signal, for transmitting a beam failure recovery request. The uplink physical channel or signal may be based on one of: a contention-free PRACH (e.g., BFR-PRACH), which may be a resource orthogonal to resources of other PRACH transmissions; a PUCCH (e.g., BFR-PUCCH); and/or a contention-based PRACH resource (e.g., CF-PRACH). Combinations of these candidate signals and/or channels may be configured by the base station. A wireless device may autonomously select a first resource for transmitting a BFR signal (e.g., a BFRQ signal), for example, if the wireless device is configured with multiple resources for the BFR signal (e.g., the BFRQ signal). The wireless device may select a BFR-PRACH resource for transmitting a BFR signal (e.g., a BFRQ signal), for example, if the wireless device is configured with the BFR-PRACH resource, a BFR-PUCCH resource, and/or a CF-PRACH resource. The base station may send (e.g., transmit) a message to the wireless device indicating a resource for transmitting the BFR signal (e.g., the BFRQ signal), for example, if the wireless device is configured with a BFR-PRACH resource, a BFR-PUCCH resource, and/or a CF-PRACH resource.

A base station may send (e.g., transmit) a response to a wireless device, for example, after receiving one or more BFR signals (e.g., one or more BFRQ signals). The response may comprise the CRI associated with the candidate beam that the wireless device may indicate in the one or multiple BFR signals (e.g., the one or multiple BFRQ signals).

Wireless communications may be associated with various services and/or capabilities, such as beam forming capabilities, beam correspondence capabilities, beam failure recovery capabilities, and/or other communication capabilities (e.g., a transmission beam filter and a receiving beam filter of a wireless device may not be tuned for beam correspondence). Some wireless communications (e.g., a RACH-based BFR procedure) may cause some problems and/or inefficiencies, for example, based on different capabilities and/or other information. A wireless device and/or a base station may not be able to determine a transmission beam for transmitting uplink data for a BFR, for example, if beam correspondence is not supported by the wireless device and/or by the base station. Different services and/or capabilities may cause an unsuccessful BFR procedure, for example, if the wireless device and/or the base station is(are) not able to determine a transmission beam, other resources, and/or other information. An occurrence of an unsuccessful BFR procedure, a failure in determining a transmission beam and/or other problems may result in an increase of power consumption, an increase of a time delay, and/or a decrease of spectrum efficiency.

A base station and a wireless device may perform a PUCCH-based BFR procedure with or without beam correspondence. A base station may configure one or more PUCCH resources dedicated for a BFR. The one or more PUCCH resources may comprise one or more parameters (e.g., beam indexes, RS indexes) associated with one or more transmission beams of a wireless device. A base station may set a predefined value for a transmission beam index, for example, for beam correspondence. The transmission beam index may be comprised in the one or more PUCCH resources dedicated for a BFR. A wireless device may select a candidate beam of the base station for a BFR. The wireless device may determine (e.g., select) a transmission beam of the wireless device that corresponds to the selected candidate beam of the base station, for example, if the transmission beam index is set to the predefined value for beam correspondence. The transmission beam index may be set differently for different beam non-correspondence configurations. Advantages may be achieved by providing a unified solution for a transmission beam selection for both beam correspondence and beam non-correspondence.

A base station may configure a BFR PUCCH resource set comprising a plurality of BFR PUCCH resources. A wireless device may receive one or more messages comprising the BFR PUCCH resource set. The wireless device may select one or more BFR PUCCH resources based on determining one or more candidate beams of the base station (e.g., for a downlink communication). Each of the BFR PUCCH resources may be associated with a different RS. The base station may send, to the wireless device and via the candidate beams, the different RSs. By selecting a BFR PUCCH resource associated with a first RS, the wireless device may implicitly select a first candidate beam, of the base station, associated with the first RS. Each BFR PUCCH resource may comprise a transmission beam index indicating a transmission beam of a wireless device. The transmission beam index may be an RS index that indicates a second RS associated with a transmission beam (e.g., a transmission beam corresponding to a receiving beam on which the wireless device receives the second RS sent from the base station, or a transmission beam corresponding to a transmission beam on which the wireless device transmits an SRS to the base station). The wireless device may retrieve a value of a transmission beam index comprised in the selected BFR PUCCH resource. The wireless device may select, based on the value indicated by the transmission beam index, a transmission beam, of the wireless device, for sending an uplink signal (e.g., PUCCH signal) for a BFR. The second RS indicated by the transmission beam index may be the same to the first RS for beam correspondence or may be different from the first RS for beam non-correspondence. The wireless device may select, based on the second RS, the transmission beam for an uplink transmission for a BFR while implicitly selecting, by selecting a BFR PUCCH resource, the candidate beam of the base station associated with the first RS. By configuring different transmission beam index values for each BFR PUCCH resource, the wireless device may flexibly select one or more transmission beams of the wireless devices and one or more candidate beams of the base station. The base station and the wireless device may perform a robust BFR procedure with or without beam correspondence.

Advantages may be achieved by configuring a plurality of BFR PUCCH resources. The wireless device may implicitly indicate, to the base station, a selection of a candidate beam without adding an additional data field, for example, if different RSs of the base station are associated with different BFR PUCCH resources. Transmission beam indexes of the plurality of BFR PUCCH resources may provide flexibility for the wireless device to select one or more transmission beams of the wireless device (e.g., other than the active transmission beam of the wireless device) for an uplink transmission for a BFR while independently selecting one or more candidate beams of the base station.

A base station may configure a (e.g., single) BFR PUCCH resource. The BFR PUCCH resource may comprise a transmission beam index indicating a transmission beam of a wireless device. The transmission beam index may be an RS index that indicates a value of an RS associated with a transmission beam (e.g., a transmission beam corresponding to a receiving beam that receives the second RS sent from the base station, or a transmission beam corresponding to a transmission beam on which the wireless device transmits an SRS to the base station). The wireless device may receive one or more messages comprising the BFR PUCCH resource and may select a candidate beam of the base station (e.g., for a downlink communication). The wireless device may generate an uplink signal for a BFR to indicate the selection of the candidate beam. The uplink signal may comprise a beam indicator indicating the selected candidate beam of the base station. The selected candidate beam may be associated with a first RS. The wireless device may retrieve a value of a transmission beam index comprised in the BFR PUCCH resource. The wireless device may select, based on the value indicated by the transmission beam index, the transmission beam, of the wireless device, for sending the uplink signal (e.g., a PUCCH signal) for a BFR. The value of a transmission beam index may indicate a second RS. The second RS may be the same to the first RS for beam correspondence or may be different from the first RS for beam non-correspondence. The wireless device may select, based on the second RS, the transmission beam for an uplink transmission for a BFR. The wireless device may perform a robust BFR procedure with or without beam correspondence, for example, by independently selecting the candidate beam of the base station and the transmission beam of the wireless device.

Advantages may be achieved by configuring a BFR PUCCH resource and/or an uplink signal comprising a beam indicator. The wireless device may independently select, based on a transmission beam index of the BFR PUCCH resource, a transmission beam of the wireless device and may indicate, via the beam indicator, a selection of a candidate beam. A transmission beam index of the BFR PUCCH resource may enable the wireless device to select a candidate transmission beam of the wireless device (e.g., other than the active transmission beam of the wireless device) for an uplink transmission for a BFR. A mapping relationship between a value of the beam indicator and an RS index of a set of RS resources configured for the wireless device may reduce a signaling overhead by reducing the size of the beam indicator.

A base station may send (e.g., transmit) a DCI via a PDCCH. The DCI may be used for at least one of: a scheduling assignment/grant; a slot format notification; a pre-emption indication; and/or a power-control command. The DCI may comprise at least one of: an identifier of a DCI format; downlink scheduling assignment(s); uplink scheduling grant(s); a slot format indicator; a pre-emption indication; power-control command(s) for PUCCH and/or PUSCH; and/or a power-control command for an SRS.

A downlink scheduling assignment DCI may comprise parameters indicating at least one of: an identifier of a DCI format; a PDSCH resource indication; a transport format; HARQ information; control information related to multiple antenna schemes; and/or a command for a power control of the PUCCH. An uplink scheduling grant DCI may comprise parameters indicating at least one of: an identifier of a DCI format; a PUSCH resource indication; a transport format; HARQ-related information; and/or a power control command of the PUSCH.

Different types of control information may correspond to different DCI message sizes. Supporting multiple beams and/or spatial multiplexing in a spatial domain and noncontiguous allocation of RBs in a frequency domain may require a larger scheduling message, in comparison with an uplink grant allowing for a frequency-contiguous allocation. DCIs may be categorized into different DCI formats. A particular DCI format may have a certain message size and/or usage.

A wireless device may monitor one or more PDCCHs for detecting one or more DCIs with one or more DCI formats. The wireless device may monitor the PDCCH in a common search space and/or in a wireless device-specific search space. A wireless device may monitor a PDCCH with a limited set of DCI formats, for example, to save power and/or reduce power consumption. The wireless device may consume more power, for example, if the wireless device attempts to detect more types of DCI formats.

Information in the DCI formats used for a downlink scheduling may comprise at least one of: an identifier of a DCI format; a carrier indicator; an RB allocation; a time resource allocation; a bandwidth part indicator; a HARQ process number; one or more MCSs; one or more NDIs; one or more RVs; MIMO-related information; a downlink assignment index (DAI); a TPC for a PUCCH; an SRS request; and/or a padding if necessary. The MIMO-related information may comprise at least one of: a PMI; precoding information; a transport block swap flag; a power offset between a PDSCH and a reference signal; a reference-signal scrambling sequence; a number of layers; and/or one or more antenna ports for the transmission; and/or a Transmission Configuration Indication (TCI). Information in the DCI formats used for an uplink scheduling may comprise at least one of: an identifier of a DCI format; a carrier indicator; a bandwidth part indication; a resource allocation type; an RB allocation; a time resource allocation; an MCS; an NDI; Phase rotation of the uplink DMRS; precoding information; a CSI request; an SRS request; an Uplink index/DAI; a TPC for a PUSCH; and/or a padding if necessary.

A base station may perform a CRC scrambling for a DCI, for example, before transmitting the DCI via a PDCCH. The base station may perform a CRC scrambling by binarily adding multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, SRS-TPC-RNTI, INT-RNTI, SFI-RNTI, etc.) on the CRC bits of the DCI. The wireless device may check the CRC bits of the DCI, for example, if the wireless device attempts to detect the DCI. The wireless device may receive the DCI, for example, if the CRC is scrambled by a sequence of bits that is the same as the at least one wireless device identifier.

To support a wide bandwidth operation, a base station may send (e.g., transmit) one or more PDCCHs in different control resource sets (coresets). A base station may send (e.g., transmit) one or more RRC messages comprising configuration parameters of one or more coresets. A coreset may comprise at least one of: a first OFDM symbol; a number of consecutive OFDM symbols; a set of resource blocks; and/or a CCE-to-REG mapping. A base station may send (e.g., transmit) a PDCCH in a dedicated coreset for a particular purpose, for example, for a beam failure recovery confirmation. A wireless device may monitor a PDCCH for detecting a DCI in one or more configured coresets, to reduce the power consumption.

A base station (e.g., a gNB) and/or a wireless device may perform one or more beam management procedure, for example, if the base station and/or the wireless device are configured with multiple beams (e.g., in a system such as an NR system). The wireless device may perform a BFR procedure, for example, if one or more beam pair links between the base station and the wireless device fail.

Figure 17:
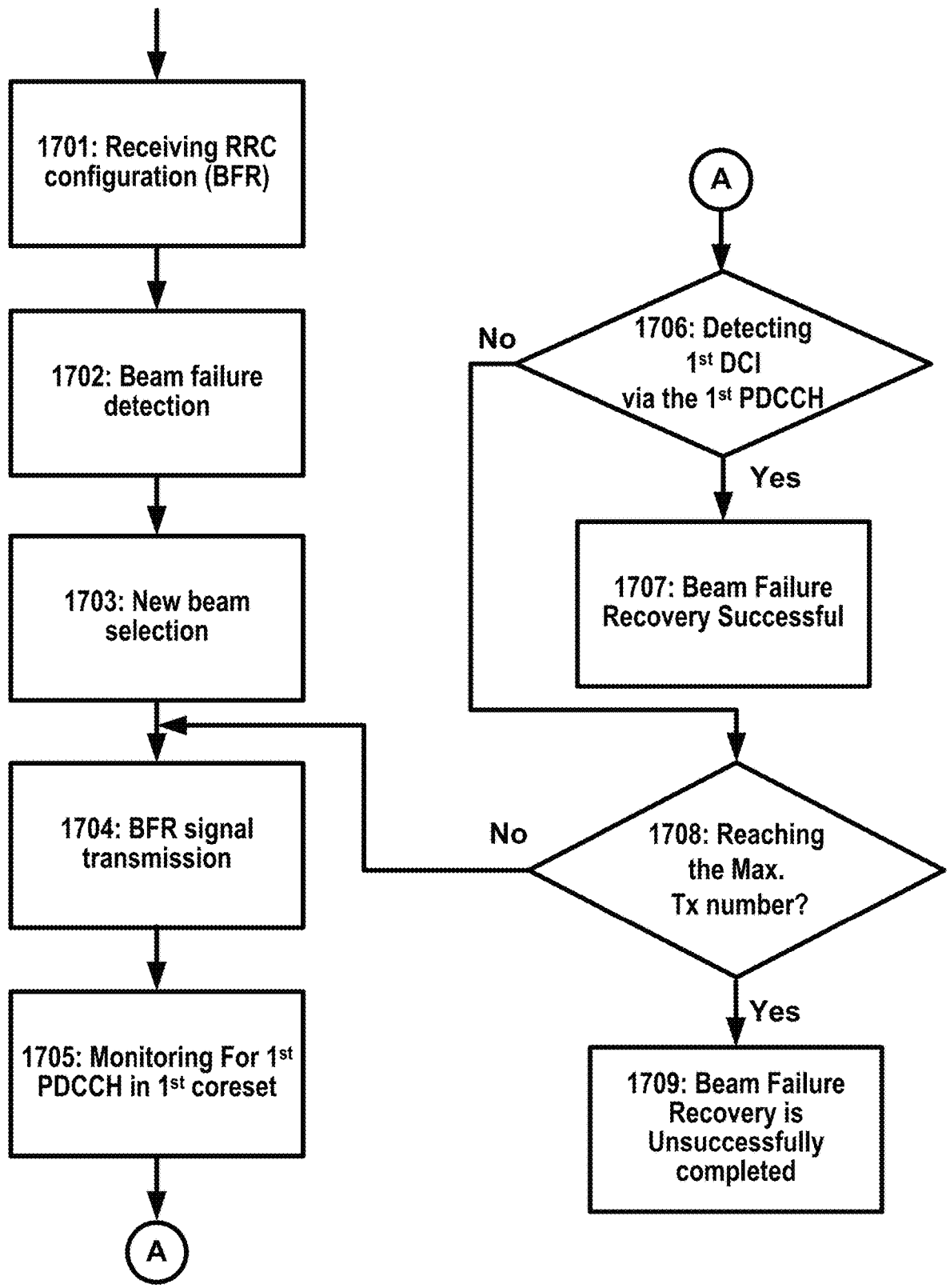
FIG. 17 shows an example of a downlink beam failure recovery (BFR) procedure.

FIG. 17 shows an example of a BFR procedure. The BFR procedure may be for a primary cell or a secondary cell. At step 1701, a wireless device may receive one or more messages (e.g., RRC messages) comprising BFR parameters (e.g., BFRQ parameters). At step 1702, the wireless device may detect at least one beam failure according to at least one of BFR parameters, for example, the BFR parameters received at step 1701. The wireless device may start a first timer, for example, after or in response to detecting the at least one beam failure. At step 1703, the wireless device may select a candidate beam (e.g., based on a received power of downlink reference signal such as SSB, CSI-RS, and/or DMRS), for example, after or in response to detecting the at least one beam failure. The selected beam may be a beam with a good channel quality (e.g., based on RSRP, SINR, and/or Block Error Rate (BLER)) from a set of candidate beams. The candidate beams may be identified by a set of reference signals (e.g., SSBs, or CSI-RSs). At step 1704, the wireless device may send (e.g., transmit) a BFR signal (e.g., at least a first BFR signal) to a base station, for example, after or in response to the selecting the candidate beam. The BFR signal may be associated with the selected beam. The wireless device may send (e.g., transmit) the BFR signal with a transmission beam corresponding to a receiving beam associated with the selected beam. The BFR signal may comprise a preamble transmitted via a PRACH resource, an SR signal transmitted via a PUCCH resource, a beam failure recovery signal transmitted via a PUCCH resource, and/or a beam report transmitted via a PUCCH and/or PUSCH resource. The wireless device may start a response window, for example, after or in response to sending (e.g., transmitting) the BFR signal. The response window may be determined by a timer using a value configured (or determined) by the base station. At step 1705, the wireless device may monitor a PDCCH in a first coreset, for example, if the response window is running (e.g., the response window is not expired). The first coreset may be associated with the BFR procedure. The wireless device may monitor the PDCCH in the first coreset, for example, in condition of sending (e.g., transmitting) the BFR signal. At step 1706, the wireless device may receive a DCI (e.g., a first DCI) via the PDCCH in the first coreset, for example, during the response window. At step 1707, the wireless device may determine that the BFR procedure is successfully completed, for example, if the wireless device receives the DCI via the PDCCH in the first coreset before the response window expires. The wireless device may stop the first timer, for example, after or in response to the BFR procedure successfully being completed. The wireless device may stop the response window, for example, after or in response to the BFR procedure successfully being completed.

The wireless device may increment a transmission count (e.g., an unsuccessful transmission count), for example, if the wireless does not receive the DCI during the response window. The transmission count may be initialized to a first number (e.g., 0), for example, before the BFR procedure is triggered. At step 1708, the wireless device may repeat one or more actions (e.g., steps of FIG. 17), for example, if the transmission count is less than a configured maximum transmission number. The one or more actions may comprise at least one of: a BFR signal transmission (e.g., at step 1704); starting the response window; monitoring for the PDCCH (e.g., at step 1705); incrementing the transmission count, for example, if no response is received during the response window. At step 1709, the wireless device may determine that the BFR procedure is unsuccessfully completed, for example, if the transmission count is equal to or greater than the configured maximum transmission number.

A wireless device may trigger an SR for requesting a UL-SCH resource, for example, if the wireless device has data for a new transmission. A base station may send (e.g., transmit) to a wireless device at least one message comprising parameters indicating zero SR configuration or indicating one or more SR configurations. An SR configuration may comprise a set of PUCCH resources for an SR on one or more BWPs and/or one or more cells. On a BWP, at most one PUCCH resource for an SR may be configured. Each SR configuration may correspond to one or more logical channels. Each logical channel may be mapped to zero or one SR configuration configured by the at least one message. An SR configuration of a logical channel (LCH) that triggers a buffer status report (BSR) may be considered as a corresponding SR configuration for a triggered SR.

The at least one message may further comprise (e.g., for each SR configuration) one or more parameters indicating at least one of: an SR prohibit timer; a maximum number of an SR transmission; a parameter indicating a periodicity and offset of an SR transmission; and/or a PUCCH resource. The SR prohibit timer may be a duration during which the wireless device is not allowed to transmit the SR. The maximum number of SR transmission may be a number of allowed SR transmissions for the wireless device.

A PUCCH resource may be indicated by at least: a frequency location (e.g., a starting PRB); and/or a PUCCH format associated with an initial cyclic shift of a base sequence and a time domain location (e.g., a starting symbol index). A PUCCH format may be PUCCH format 0, PUCCH format 1, PUCCH format 2, PUCCH format 3, or PUCCH format 4, or any other format. The PUCCH format 0 may occupy 1 or 2 OFDM symbols and may have a size (e.g., a payload size) less than or equal to 2 bits. The PUCCH format 1 may occupy a number of symbols (e.g., 4, 5, . . . , or 14 OFDM symbols) and may have a size (e.g., a payload size) less than or equal to 2 bits. The PUCCH format 2 may occupy 1 or 2 OFDM symbols and may have a size (e.g., a payload size) greater than 2 bits. The PUCCH format 3 may occupy a number of symbols (e.g., 4, 5, . . . , or 14 OFDM symbols) and may have a size (e.g., a payload size) greater than 2 bits. The PUCCH format 4 may occupy a number of symbols (e.g., 4, 5, . . . , or 14 OFDM symbols) and may have a size (e.g., a payload size) greater than 2 bits.

A PUCCH format for an SR transmission may be the PUCCH format 0 or the PUCCH format 1. A wireless device may send (e.g., transmit) a PUCCH signal via a PUCCH resource for a corresponding SR configuration, for example, if the wireless device sends (e.g., transmits) a positive SR. The wireless device may not send the PUCCH signal via the PUCCH resource for the corresponding SR configuration, for example, if the wireless device does not send a positive SR. A wireless device may send (e.g., transmit) a PUCCH by setting the cyclic shift to a first value (e.g., 0), for example, for a positive SR transmission using the PUCCH format 0. A wireless device may send (e.g., transmit) a PUCCH by setting a first bit (e.g., before BPSK modulated on a sequence) to a first value (e.g., 0), for example, for a positive SR transmission using the PUCCH format 1.

An SR may be multiplexed with a HARQ-ACK or CSI, for example, on a PUCCH format. A wireless device may determine a cyclic shift of the base sequence based on the initial cyclic shift. The wireless device may determine a first cyclic shift based on one or more values of one or more HARQ-ACK bits, for example, if a positive SR is multiplexed with HARQ-ACK. The wireless device may determine a second cyclic shift based on one or more value of the one or more HARQ-ACK bits, for example, if a negative SR is multiplexed with HARQ-ACK. The first cyclic shift may be different from the second cyclic shift.

A wireless device may maintain an SR transmission counter (e.g., SR_COUNTER) associated with an SR configuration. A wireless device may set the SR_COUNTER of the SR configuration to a first value (e.g., 0), for example, if an SR of the SR configuration is triggered, and there are no other pending SRs corresponding to the same SR configuration.

A wireless device may determine that an SR is pending until it is cancelled, for example, if the SR is triggered. All pending SR(s) may be cancelled, for example, if one or more UL grants accommodate all pending data available for a transmission.

A wireless device may determine one or more PUCCH resources on an active BWP as valid PUCCH resources, for example, at an SR transmission occasion. A wireless device may send (e.g., transmit) a PUCCH in a PUCCH resource associated with an SR configuration, for example, if the wireless device sends (e.g., transmits) a positive SR. A wireless device may send (e.g., transmit) the PUCCH, for example, using the PUCCH format 0 or the PUCCH format 1, according to the PUCCH configuration.

Figure 18:
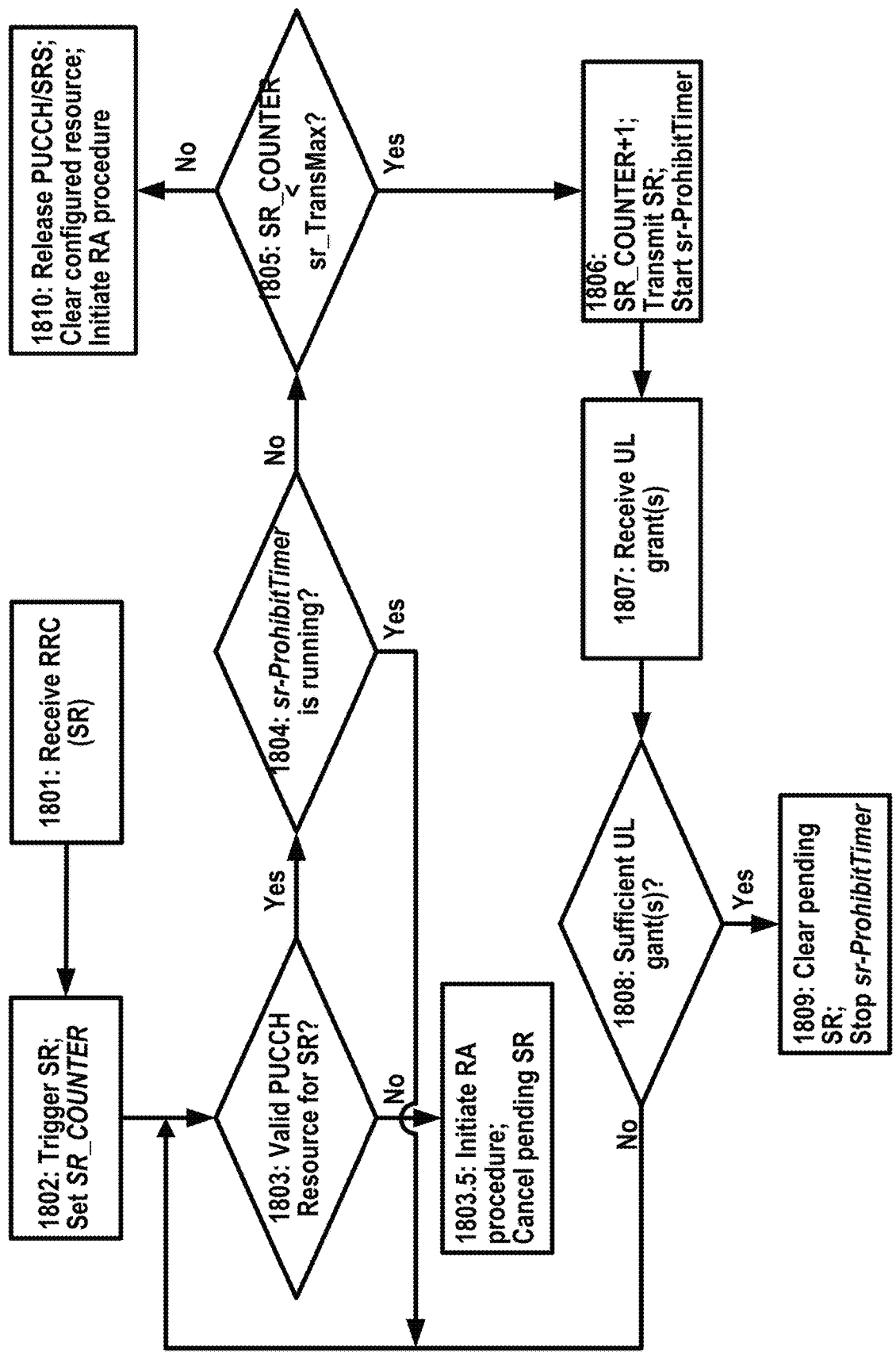
FIG. 18 shows an example of a scheduling request procedure.

FIG. 18 shows an example of an SR procedure. At step 1801, a wireless device may receive one or more messages (e.g., an RRC message) comprising parameters of one or more SR configurations. The parameters may indicate (e.g., for each of the one or more SR configurations) at least one of: an SR prohibit timer; a maximum number of an SR transmission; a parameter indicating a periodicity and offset of an SR transmission; and/or a PUCCH resource. At step 1802, a wireless device may set a counter (e.g., SR_COUNTER) to a first value (e.g., 0), for example, if an SR of a SR configuration is triggered and pending (e.g., after or in response to a BSR being triggered on a LCH corresponding to the SR configuration) and/or if there is no other pending SRs corresponding to the SR configuration.

A step 1803, a wireless device may determine whether there is at least one valid PUCCH resource for the pending SR. The wireless device may initiate a random access procedure on a PCell, for example, if there is no valid PUCCH resource for the pending SR. The wireless device may cancel the pending SR. At step 1803.5, the wireless device may initiate a random access procedure and/or cancel the pending SR, for example, if there is no valid PUCCH resource for the pending SR.

A wireless device may determine an SR transmission occasion on the at least one valid PUCCH resource based on the periodicity and the offset of an SR transmission, for example, if there is at least one valid PUCCH resource for the pending SR. At step 1804, the wireless device may wait for another SR transmission occasion, for example, if the SR prohibit timer is running. As step 1806, the wireless device may increment the SR_COUNTER by one, instruct the physical layer of the wireless device to send (e.g., signal, transmit, etc.) the SR on the at least one valid PUCCH resource for the SR, for example, if the SR prohibit timer is not running and the SR_COUNTER is less than the maximum number of an SR transmission (at step 1805). The physical layer of the wireless device may send (e.g., transmit) a PUCCH on the at least one valid PUCCH resource for the SR. The wireless device may monitor a PDCCH for detecting one or more DCIs for one or more uplink grants, for example, after or in response to transmitting the PUCCH. At step 1807, the wireless device may receive the one or more UL grants.

At step 1808, the wireless device may determine whether the wireless device has received sufficient UL grant(s) (e.g., sufficient number of UL grants, UL grant(s) granting sufficient amount of uplink resources for all pending data, etc.). At step 1809, the wireless device may cancel the pending SR and/or stop the SR prohibit timer, for example, if the wireless device receives one or more uplink grants which may accommodate all pending data available for a transmission.

At step 1808, the wireless device may repeat one or more actions (e.g., one or more steps of FIG. 18), for example, if the wireless device does not receive one or more uplink grants which may accommodate all pending data available for transmission. The one or more actions may comprise at least one of: determining the at least one valid PUCCH resource (e.g., at step 1803); checking whether the SR prohibit timer is running (e.g., at step 1804); whether the SR_COUNTER is equal or greater than the maximum number of an SR transmission (e.g., at step 1805); incrementing the SR_COUNTER (e.g., at step 1806), transmitting the SR and starting the SR prohibit timer (e.g., at step 1806); and/or monitoring for a PDCCH to receive one or more uplink grant(s) (e.g., at step 1807).

At step 1810, a wireless device may release PUCCH(s) for one or more serving cells, may release SRS(s) for the one or more serving cells, may clear one or more configured downlink assignments and uplink grants, may initiate a random access procedure (e.g., on a PCell), and/or may cancel the pending SR, for example, if the SR_COUNTER indicates a number equal to or greater than the maximum number of an SR transmission.

A base station and/or a wireless device may perform a PRACH-based BFR procedure, for example, if at least one beam failure instance is identified and/or if a beam correspondence exists between the base station and the wireless device. A beam correspondence may exist, for example, if a wireless device is configured to send (e.g., transmit) an uplink signal using a transmission beam corresponding to a receiving beam for receiving a downlink signal from a base station. The wireless device may determine the corresponding transmission beam by using RF and/or digital beamforming parameters corresponding to those beamforming parameters for the corresponding receiving beam, for example, if the wireless device identifies the receiving beam by determining RF and/or digital beamforming parameters for receiving downlink signals from the base station. The beamforming parameters for the corresponding transmission beam (e.g., one or more transmission beam parameters comprising spatial filter(s) to determine a beam direction) may be the same as the beamforming parameters for the corresponding receiving beam for the beam correspondence case. Beam correspondence existence may simplify a transceiver design. Using beam correspondence, a wireless device may determine a transmission beam based on a receiving beam. Using beam correspondence, a base station may not indicate the transmission beam (e.g., thereby reducing the signaling overhead) because the wireless device may determine a transmission beam based on information of the corresponding receiving beam. Using beam correspondence, a wireless device may avoid an uplink beam sweeping for helping a base station find a proper uplink beam (e.g., thereby reducing the power consumption of the wireless device). Beam correspondence may exist, for example, in a TDD configuration case, if the transmission and reception of the wireless device share the same set of physical antenna elements, and/or if the transmission and reception of the wireless device have a same or similar beam width.

A beam correspondence may not exist, for example, if a physical antenna for a transmission is separated from a physical antenna for a reception and/or the beam width for the transmission and reception is different. A wireless device may not be able to determine a transmission beam based on a receiving beam for receiving downlink signals. A base station may explicitly indicate a transmission beam of a PUCCH and/or PUSCH transmission (e.g., by an RRC message, a MAC CE, or a DCI), for example, if the wireless device is not able to determine a transmission beam based on a receiving beam. A base station and a wireless device may not perform a PRACH-based BFR procedure, for example, if at least one beam failure instance is identified and if a beam correspondence does not exist. A wireless device may perform a PRACH-based BFR procedure and may determine, for a PRACH preamble transmission, a transmission beam associated with the receiving beam for receiving a signal on a candidate beam, for example, if a beam correspondence does not exist. The base station may not be able to detect the PRACH preamble (e.g., because the base station may not expect that there is any uplink transmission on the transmission beam on which the wireless device transmits the PRACH preamble), for example, due to no beam correspondence between the transmission beam and the receiving beam in the base station and/or the wireless device. The PRACH-based BFR procedure may result in unsuccessful beam failure recovery, which may further lead to a radio link failure, for example, if there is no beam correspondence between the transmission beam and the receiving beam. A beam failure recovery procedure may be improved by designing a PUCCH-based BFR procedure, which may be applicable regardless of the existence of a beam correspondence.

A base station may send (e.g., transmit), to a wireless device, at least one message comprising parameters indicating an RS index, for example, for a normal PUCCH transmission of one or more uplink control data (e.g., an SR transmission, a HARQ-ACK feedback, a CSI report). The RS index may be an SSB resource index, a CSI-RS resource index, and/or an SRS resource index. The SSB resource index comprise one of a set of SSB resource indexes associated to one or more serving beams. The CSI-RS resource index may comprise one of a set of CSI-RS resource indexes associated with one or more serving beams. A serving beam may be a beam via which the base station sends (e.g., transmits) PDCCH and/or PDSCH to the wireless device. The wireless device may determine a transmission beam based on the RS index explicitly indicated by the base station for a PUCCH transmission. The RS index may be further activated by a MAC CE. The wireless device may determine a transmission beam for the PUCCH transmission as same as a transmission beam for the last PRACH transmission in a random access procedure, for example, before receiving the MAC CE. The wireless device may determine, based on the RS index indicated by the MAC CE, the transmission beam for the PUCCH transmission, for example, after receiving the MAC CE. The determination of the transmission beam may be referred to as a spatial domain transmission filter determination.

A base station and a wireless device may perform a PUCCH-based BFR procedure, for example, if at least one beam failure instance is identified and if a beam correspondence does not exist. A wireless device may determine a transmission beam for a PUCCH, for example, if the PUCCH is used for a BFR procedure. In a PUCCH configuration for a normal PUCCH transmission (e.g., for an SR transmission, a HARQ-ACK feedback, and/or a CSI report), a transmission beam for the normal PUCCH transmission may be indicated and/or activated by an RRC message and/or a MAC CE. The transmission beam may be associated with an RS index, for example, based on the RRC message and/or the MAC CE. The RS index may be one of the serving beams. The wireless device may identify beam failures on all or some serving beams (e.g., indicated by multiple SSB resource indexes and/or multiple CSI-RS resource indexes), for example, if the wireless device is triggered with a BFR procedure. The wireless device may select a candidate beam from a second set of beams, other than the failing serving beams, with communication quality (e.g., reference signal received power (RSRP) and/or reference signal received quality (RSRQ)) satisfying (e.g., greater than) a configured threshold (e.g., a power value and/or a quality value). The wireless device may determine a PUCCH resource associated with the candidate beam. The transmission beam for the PUCCH may not be necessarily one of the serving beams (e.g., all the serving beams may fail), for example, where the one of the serving beams for the normal PUCCH transmission is configured and activated by the RRC message and/or the MAC CE. The base station may not successfully receive the PUCCH, for example, if the wireless device uses a transmission beam associated with one of the serving beams which have been failed. One or more enhanced PUCCH configurations for a BFR procedure may reduce beam misalignment for a PUCCH transmission for a triggered BFR procedure. One or more enhanced PUCCH configurations for a BFR procedure may provide a flexible method to indicate a transmission beam for a PUCCH transmission for a BFR procedure, for example, for both the beam correspondence existence and the beam correspondence non-existence. Based on one or more enhanced PUCCH configurations for a BFR procedure, a base station may receive the PUCCH transmission, for example, even if all downlink serving beams fail (e.g., at least a beam failure instance identified).

Figure 19:
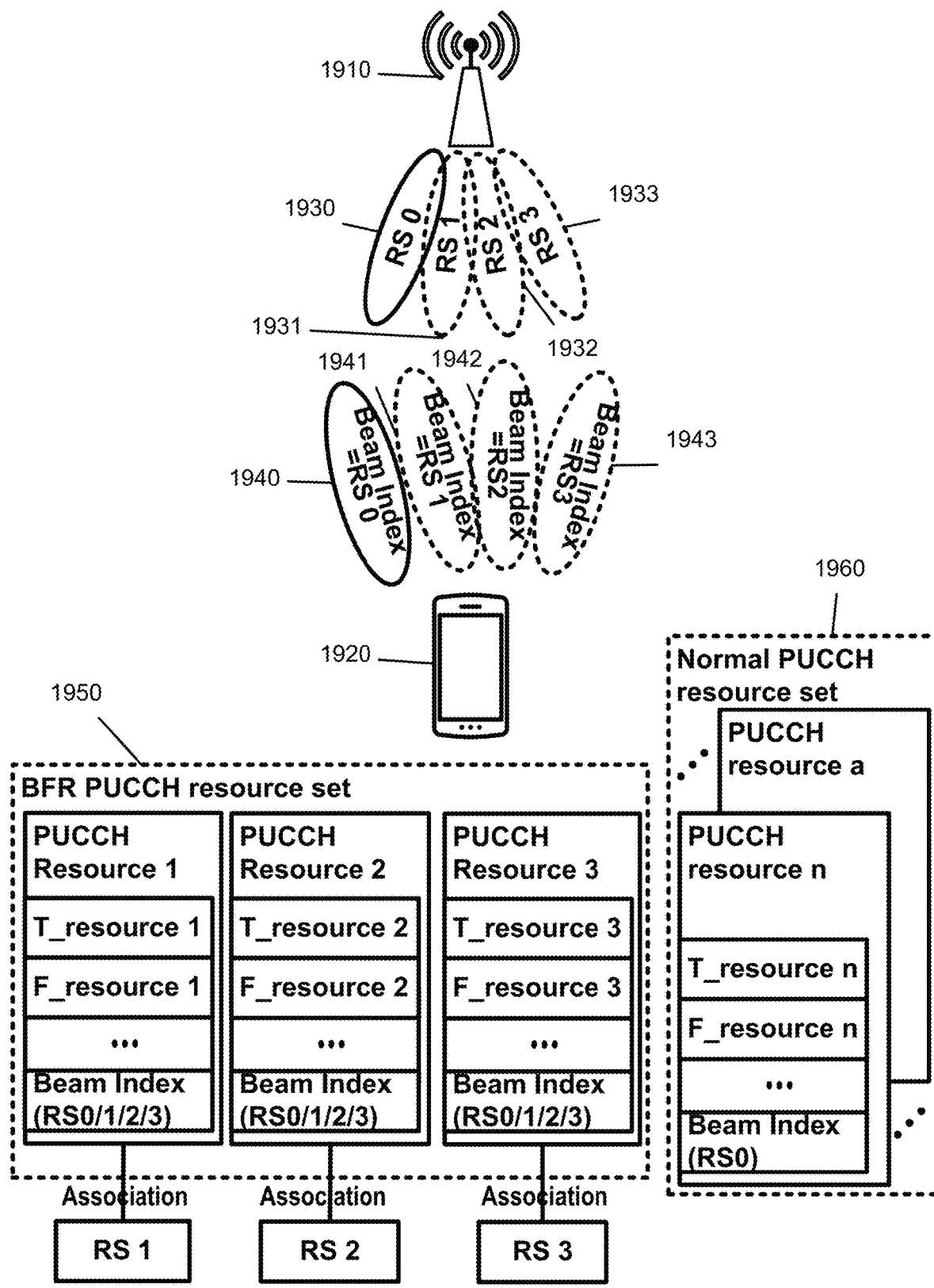
FIG. 19 shows an example of a physical uplink control channel (PUCCH) configuration for a BFR procedure.

FIG. 19 shows an example of a physical uplink control channel (PUCCH) configuration for a BFR procedure. A base station 1910 may support a plurality of beams (e.g., beams 1930, 1931, 1932, and 1933) and may choose at least one serving beam (e.g., the beam 1930). The beams 1931, 1932, and 1933 may not be serving beams but may be candidate beams. A beam may be identified by (or represented by, or associated with) an RS index. The beam 1930 may be associated with RS 0, the beam 1931 may be associated with RS 1, the beam 1932 may be associated with RS 2, and the beam 1933 may be associated with RS 3. The base station 1910 may send (e.g., transmit) at least one message (e.g., an RRC message) comprising parameters indicating a first set of RSs (e.g., one or more active set of RSs, such as the RS 0 of a serving beam) and indicating a second set of RSs (e.g., one or more candidate set of RSs, such as the RS 1, the RS 2, and the RS 3 of candidate beams). The at least one message may be sent to the wireless device 1920 via the serving beam 1930. The first set of RSs may indicate one or more beams (e.g., the beam 1930 associated with the RS 0) via which the base station sends (e.g., transmits) one or more PDCCHs and/or PDSCHs. The second set of RSs may indicate one or more candidate beams (e.g., the beam 1931 associated with the RS 1, the beam 1932 associated with the RS 2, and the beam 1933 associated with the RS 3) from which the wireless device may detect and/or determine a candidate beam with quality better than a threshold, for example, if the one or more beams (e.g., the beam 1930) associated with the first set of RSs (e.g., RS 0) fail.

The at least one message may comprise parameters indicating a BFR PUCCH resource set 1950 comprising first multiple BFR PUCCH resources and indicating at least one normal PUCCH resource set 1960 comprising one or more second multiple normal PUCCH resources. The wireless device 1920 may determine a PUCCH resource from the BFR PUCCH resource set 1950 to send (e.g., transmit) a PUCCH signal for a BFR procedure, for example, if the BFR procedure is triggered. The wireless device 1920 may determine a PUCCH resource from the normal PUCCH resource set 1960, for example, if the wireless device 1920 performs an SR transmission (e.g., by a BSR being triggered), performs a HARQ-ACK transmission, and/or sends a CSI report on a PUCCH.

Each PUCCH resource of the BFR PUCCH resource set 1950 may be associated with an RS index of the second set (e.g., candidate set) of RSs (e.g., the RS 1, the RS 2, and the RS 3). The association between an RS index of the second set and a PUCCH resource of the BFR PUCCH resource set 1950 may be indicated to the wireless device 1920. PUCCH resource 1 of the BFR PUCCH resource set 1950 may be associated with the RS1, PUCCH resource 2 of the BFR PUCCH resource set 1950 may be associated with the RS 2, and PUCCH resource 3 of the BFR PUCCH resource set 1950 may by associated with the RS3. Each PUCCH resource of the BFR PUCCH resource set 1950 may indicate, to the wireless device 1920, a time resource, a frequency resource, and/or a beam index. A PUCCH resource, of the BFR PUCCH resource set 1950, selected by the wireless device 1920 may be determined by the base station 1910 based on the time resource, the frequency resource, and/or the beam index of the selected PUCCH resource. By receiving a PUCCH mapped on a time resource 1 (T_resource 1) and a frequency resource 1 (F_resource 1), the base station 1910 may determine that the wireless device 1920 has selected the PUCCH resource 1 of the BFR PUCCH resource set 1950. By receiving a PUCCH sent using a transmission beam, of the wireless device, associated with a value of the beam index of the PUCCH resource 1, the base station 1910 may determine that the wireless device 1920 has selected the PUCCH resource 1 of the BFR PUCCH resource set 1950. By receiving a PUCCH mapped on a time resource 2 (T_resource 2) and a frequency resource 2 (F_resource 2), the base station 1910 may determine that the wireless device 1920 has selected the PUCCH resource 2 of the BFR PUCCH resource set 1950. By receiving a PUCCH sent using a transmission beam, of the wireless device, associated with a value of the beam index of the PUCCH resource 2, the base station 1910 may determine that the wireless device 1920 has selected the PUCCH resource 2 of the BFR PUCCH resource set 1950. By receiving a PUCCH mapped on a time resource 3 (T_resource 3) and a frequency resource 3 (F_resource 3), the base station 1910 may determine that the wireless device 1920 has selected the PUCCH resource 3 of the BFR PUCCH resource set 1950. By receiving a PUCCH sent using a transmission beam, of the wireless device 1920, associated with a value of the beam index of the PUCCH resource 3, the base station 1910 may determine that the wireless device 1920 has selected the PUCCH resource 3 of the BFR PUCCH resource set 1950. A beam index of a PUCCH resource (e.g., the PUCCH resources 1, 2, or 3) may be an SSB index, a CSI-RS index, or an SRS index. The beam index of the PUCCH resource may be activated by the RRC message, not by a MAC CE, and may be different from a beam index of transmission on a normal PUCCH. The beam index of a PUCCH resource (e.g., the PUCCH resources 1, 2, and 3) may be different from the RS index associated with the PUCCH resource. The RS index associated with a PUCCH resource (e.g., the PUCCH resources 1, 2, or 3) may indicate a candidate beam which has a receiving signal quality, at a receiver of the wireless device 1920, satisfying (e.g., better than) a threshold. The beam index of a PUCCH resource may be used, at a transmitter of the wireless device 1920, to determine a transmission beam for a PUCCH transmission for a BFR.

The beam index of a PUCCH resource (e.g., the PUCCH resources 1, 2, or 3) may indicate an RS index that is associated with a transmission beam of the wireless device 1920. The wireless device 1920 may send, to the base station 1910, a PUCCH for a BFR using a beam 1941, for example, if the wireless device 1920 selects a PUCCH resource, of the BFR PUCCH resource set 1950, having a beam index indicating the RS1. The wireless device 1920 may send, to the base station 1910, a PUCCH for a BFR using a beam 1942, for example, if the wireless device 1920 selects a PUCCH resource, of the BFR PUCCH resource set 1950, having a beam index indicating the RS2. The wireless device 1920 may send, to the base station 1910, a PUCCH for a BFR using a beam 1943, for example, if the wireless device 1920 selects a PUCCH resource, of the BFR PUCCH resource set 1950, having a beam index indicating the RS3.

The beam index of the PUCCH resource 1 may indicate the RS 1, the beam index of PUCCH resource 2 may indicate the RS 2, and the beam index of PUCCH resource 3 may indicate the RS 3, for example, if a beam correspondence exists. The downlink beam 1931 may correspond to the uplink beam 1941, the downlink beam 1932 may correspond to the uplink beam 1942, and the downlink beam 1933 may correspond to the uplink beam 1943. The wireless device 1920 may trigger a PUCCH-based BFR procedure, for example, if the wireless device identifies a number of beam failure instances on the first set of RSs (e.g., RS 0). The wireless device 1920 may identify at least one RS (e.g., RS 2) from the second set of RSs which has a quality (e.g., RSRP, RSRQ, BLER, etc.) satisfying (e.g., better than or equal to) a configured threshold. To select the beam 1932 as a candidate beam for a downlink transmission from the base station 1910 to the wireless device 1920, the wireless device 1920 may determine the PUCCH resource 2 associated with the RS 2. The wireless device 1920 may determine the transmission beam 1942 based on the beam index, of the PUCCH resource 2, indicating RS 2. The wireless device 1920 may send (e.g., transmit) a PUCCH signal for a BFR on the transmission beam 1942 via the PUCCH resource 2 (e.g., via the T_resource 2 and F_resource 2). The PUCCH signal for the BFR may be an SR signal, a beam request signal, or a beam report transmitted via the PUCCH resource 2 (e.g., via the T_resource 2 and F_resource 2). The base station 1910 may receive the PUCCH signal, via the PUCCH resource 2, by tuning (e.g., tuning a receiving antenna of the base station 1910) to a receiving beam (e.g., the beam 1932) corresponding to the transmission beam (e.g., the beam 1942 indicated by the beam index of the PUCCH resource 2). The base station 1910 may determine (e.g., identify) that a BFR procedure is triggered by the wireless device 1920, for example, after or in response to receiving the PUCCH signal for the BFR. The base station 1910 may identify: the candidate beam the wireless device 1920 selected based on the PUCCH resource; the transmission beam of the PUCCH resource; and/or the receiving beam of the base station 1910. The base station 1910 may determine that the candidate beam 1932 is a beam corresponding to RS2, for example, if the base station 1910 receives a PUCCH signal on the PUCCH resource 2 with the receiving beam 1932 corresponding to the beam index associated with PUCCH resource 2. The base station 1910 may send (e.g., transmit) a PDCCH on a dedicated coreset to notify to the wireless device 1920 that the base station 1910 has received the PUCCH signal. The wireless device 1920 may monitor a PDCCH on the dedicated coreset to receive the response of the base station 1910, for example, after the wireless device 1920 transmits the PUCCH signal. The BFR procedure may be successfully completed, for example, after or in response to receiving the PDCCH.

Based on the successful completion of the BFR procedure (e.g., including a successful reception of the PUCCH for the BFR), the base station 1910 may select the candidate beam 1932 (e.g., instead of the serving beam 1930) for sending a downlink signal to the wireless device 1920. A beam correspondence may exist, for example, because the base station 1910 receives, via the beam 1932, the PUCCH for the BFR and selects the same beam 1932 to send the downlink signal to the wireless device 1920.

A beam index of a PUCCH resource (e.g., the PUCCH resources 1, 2, or 3) may not necessarily indicate the RS index associated with a downlink candidate beam of the PUCCH resource, for example, if a beam correspondence does not exist. The base station 1910 may determine an uplink beam (e.g., a beam 1940 for an uplink transmission) has a good signal quality while a downlink beam (e.g., the beam 1930 for a downlink transmission) fails (e.g., the wireless device 1920 fails to reliably receive the downlink signal sent by the transmission beam 1930). The beam indexes of the PUCCH resources 1, 2, and 3 may be configured to indicate the RS 0, for example, if the base station 1910 determines that the uplink beam (e.g., the beam 1940 for an uplink transmission and/or the beam 1930 for an uplink reception) corresponding to the downlink beam (e.g., the beam 1940 for a downlink reception and/or the beam 1930 for a downlink transmission associated with the RS 0) is good enough to detect a PUCCH signal from the wireless device 1920.

The beam index of PUCCH resource 1 may be configured to be a first RS index, the beam index of PUCCH resource 2 may be configured to be a second RS index, and the beam index of PUCCH resource 3 may be configured to be a third RS index. The first RS index may be an SSB index, a CSI-RS index, or an SRS index. The second RS index may be an SSB index, a CSI-RS index, or an SRS index. The third RS index may be an SSB index, a CSI-RS index, or an SRS index. The first RS index, the second RS index, and the third RS index may be same or different, based on implementation capability of the base station and/or the wireless device. A base station and a wireless device may exchange information related to at least one of: the wireless device's capability of beam correspondence; the base station's capability of beam correspondence; and/or a time duration in which a beam correspondence may exist if the base station and the wireless device have the capability for supporting the beam correspondence.

The wireless device 1920 may trigger a PUCCH-based BFR procedure, for example, if the wireless device 1920 indicates a number of beam failure instance on the first set of RSs (e.g., RS 0). The wireless device 1920 may indicate at least one RS (e.g., RS 2) from the second set of RSs which has a signal quality (e.g., RSRP, RSRQ, BLER, etc.) satisfying (e.g., better than) a configured threshold. The wireless device 1920 may determine a PUCCH resource (e.g., the PUCCH resource 2) associated with the at least one identified RS (e.g., RS 2). The wireless device 1920 may determine a transmission beam (e.g., the beam 1940) based on the beam index (e.g., RS 0) of the PUCCH resource (e.g., the PUCCH resource 2). The wireless device 1920 may send (e.g., transmit) a PUCCH signal on the transmission beam 1940 via the PUCCH resource (e.g., the PUCCH resource 2). The PUCCH signal may be an SR signal, a beam request signal, and/or a beam report transmitted on the PUCCH resource. The base station 1910 may receive the PUCCH signal by tuning to a receiving beam (e.g., the beam 1930 for an uplink reception) corresponding to the transmission beam (e.g., the transmission beam 1940 indicated by the RS 0 value of the beam index of the PUCCH resource 2) of the PUCCH resource (e.g., the PUCCH resource 2). The base station 1910 may determine (e.g., identify) that the wireless device 1920 triggered a BFR procedure, for example, after or in response to receiving the PUCCH signal. The base station 1910 may determine the candidate beam 1932 the wireless device 1920 selected (e.g., the wireless device 1902 implicitly selected the candidate beam 1932 for a downlink transmission by selecting the PUCCH resource 2 associated with the RS 2). The base station 1910 may determine the candidate beam is the beam 1932 corresponding to RS2, for example, if the base station 1910 receives a PUCCH signal on PUCCH resource 2 with the receiving beam 1930 corresponding to the beam index (e.g., RS 0) of the PUCCH resource 2. The base station 1910 may send (e.g., transmit) a PDCCH on a dedicated coreset to notify to the wireless device 1920 that the base station 1910 has received the PUCCH signal. The wireless device 1920 may monitor the PDCCH on the dedicated coreset to receive the response of the base station 1910, for example, after the wireless device 1920 sent the PUCCH signal. The BFR procedure may be successfully completed, for example, after or in response to receiving the PDCCH.

The base station 1910 may flexibly indicate a transmission beam, of the wireless device 1920, for a PUCCH transmission used for a BFR procedure. The transmission beam of the PUCCH transmission may be indicated as a beam index value associated with a candidate beam (e.g., the RS 1 of the candidate beam 1931). The transmission beam of the PUCCH transmission may be indicated as a beam index currently being used, for example, a downlink serving beam (e.g., the beam 1930) or an uplink SRS transmission beam (e.g., the beam 1940).

In a PUCCH configuration for a normal PUCCH transmission of an SR, or a HARQ-ACK, or a CSI report on a PUCCH, the base station 1910 may indicate at least one transmission beam for the normal PUCCH transmission. The at least one transmission beam may comprise a beam index value (e.g., RS 0) associated with a serving beam (e.g., the beam 1930) and/or an uplink SRS transmission beam (e.g., the beam 1940), instead of a beam index associated with a candidate beam. A beam from the at least one transmission beam may be further activated by a MAC CE. The normal PUCCH resource set 1960 may comprise one or more normal PUCCH resources, which may not be resources for a BFR procedure. Each of the normal PUCCH resources may comprises different T_resource(s) and F_resource(s) (e.g., PUCCH resource 'a' may comprise T_resource 'a' and F_resource 'a'; and PUCCH resource 'n' may comprise T_resource 'n' and F_resource 'n'). The PUCCH resources (e.g., the PUCCH resource 'a' and the PUCCH resource 'n') may comprise a beam index having the value (e.g., RS 0) associated with an active downlink beam (e.g., the active beam 1930) of the base station 1910. The PUCCH resource 'a' may be used for an SR transmission. A PUCCH resource 'b' may be used for a CSI report. The PUCCH resource 'n' may be used for a HARQ-ACK transmission. Based on the different settings for the beam index values, the base station 1910 and the wireless device 1920 may perform a PUCCH-based BFR procedure for both the beam correspondence existence and/or the beam correspondence nonexistence.

Figure 20:
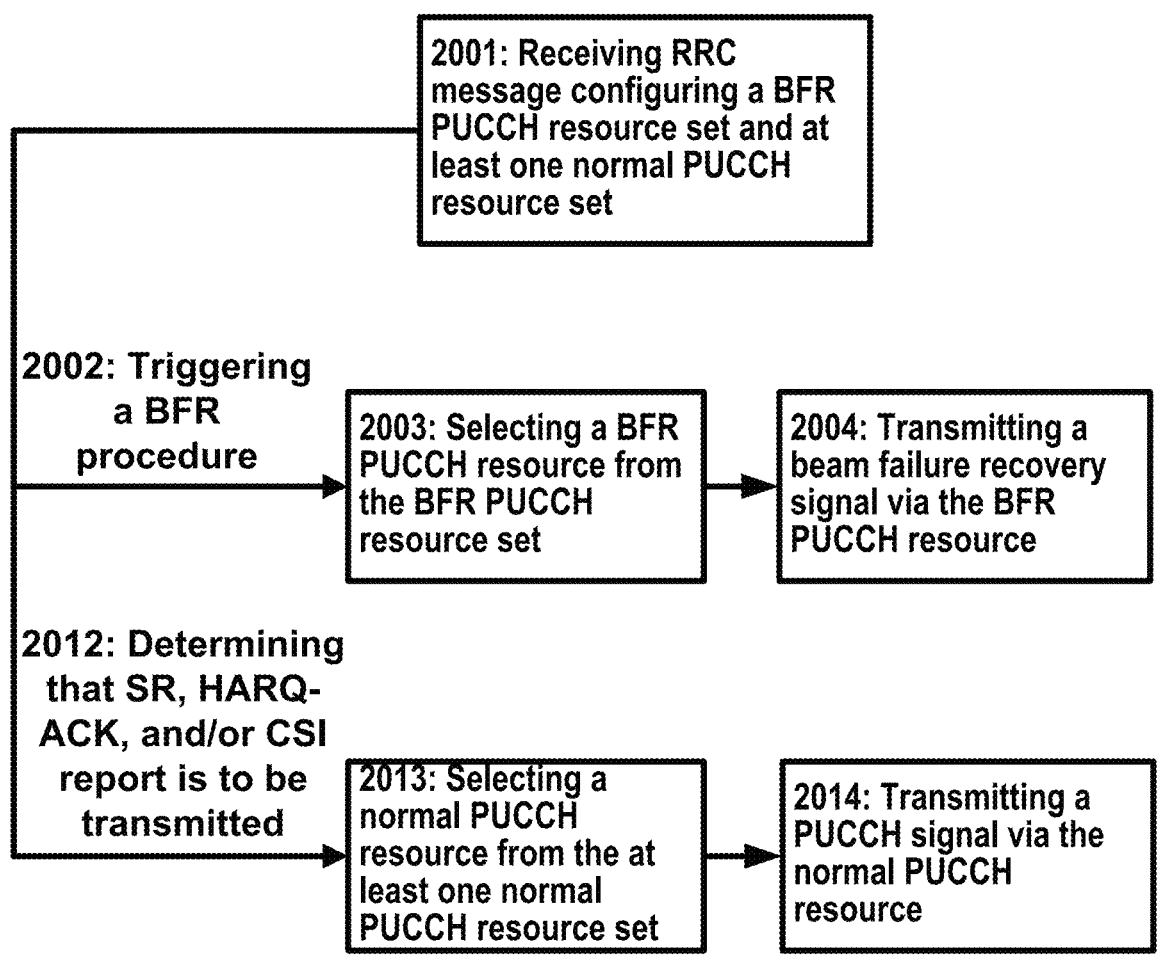
FIG. 20 shows an example of configuring a PUCCH configuration for a BFR procedure.

FIG. 20 shows an example of configuring a PUCCH configuration for a BFR procedure. One or more steps shown in FIG. 20 may be performed by a wireless device (e.g., the wireless device 1920). At step 2001, the wireless device may receive one or more RRC messages configuring a BFR PUCCH resource set and at least one normal PUCCH resource set. At step 2012, the wireless device may determine that an SR, a HARQ-ACK, and/or a CSI report is to be sent (e.g., transmitted) to a base station (e.g., the base station 1910). At step 2013, the wireless device may select a normal PUCCH resource from the at least one normal PUCCH resource set. At step 2014, the wireless device may send (e.g., transmit) a PUCCH signal via the normal PUCCH resource. Via an active beam (e.g., the active beam 1940) of the wireless device, the wireless device may send the SR, the HARQ-ACK, and/or the CSI report. The selected normal PUCCH resource may comprise a beam index field indicating the active beam of the wireless device (e.g., the beam index field may have a value indicating the RS 0 as shown in FIG. 19).

At step 2002, the wireless device may trigger a BFR procedure. The BFR procedure may be triggered, for example, if there is a communication quality problem with a downlink signal communication and/or an uplink signal communication via active beams of the base station and the wireless device (e.g., the active beam 1930 of the base station 1910 and the active beam 1940 of the wireless device 1920). At step 2003, the wireless device may select a BFR PUCCH resource from the BFR PUCCH resource set (e.g., the BFR PUCCH resource set 1950). At step 2004, the wireless device may send (e.g., transmit) a BFR signal via the BFR PUCCH resource. The selection of the BFR PUCCH resource (e.g., the PUCCH resource 2 of FIG. 19) may implicitly indicate, to the base station, that the wireless device has selected an associated candidate beam (e.g., the candidate beam 1932 associated with the RS 2 and associated with the PUCCH resource 2).

Multiple wireless devices may be located in a cell. Each wireless device may be allocated with multiple PUCCH resources for a BFR procedure, and each PUCCH resource may be associated with a candidate beam. A base station may reserve a large number of PUCCH resources for a BFR procedure, which may not be efficient. Reserving a large number of PUCCH resources for a BFR procedure may result in inefficient radio resource utilization. The PUCCH resource allocation efficiency for a BFR procedure may be improved. To improve the PUCCH resource allocation efficiency for a BFR procedure, a dedicated PUCCH resource for a BFR procedure for a wireless device may be used. The wireless device may send (e.g., transmit), to a base station, a PUCCH signal comprising one or more parameters indicating a candidate beam via the dedicated PUCCH resource. The dedicated PUCCH resource may be different from PUCCH resources for a normal PUCCH signal transmission (e.g., an SR, a HARQ-ACK, a CSI, and/or a beam report).

Figure 21:
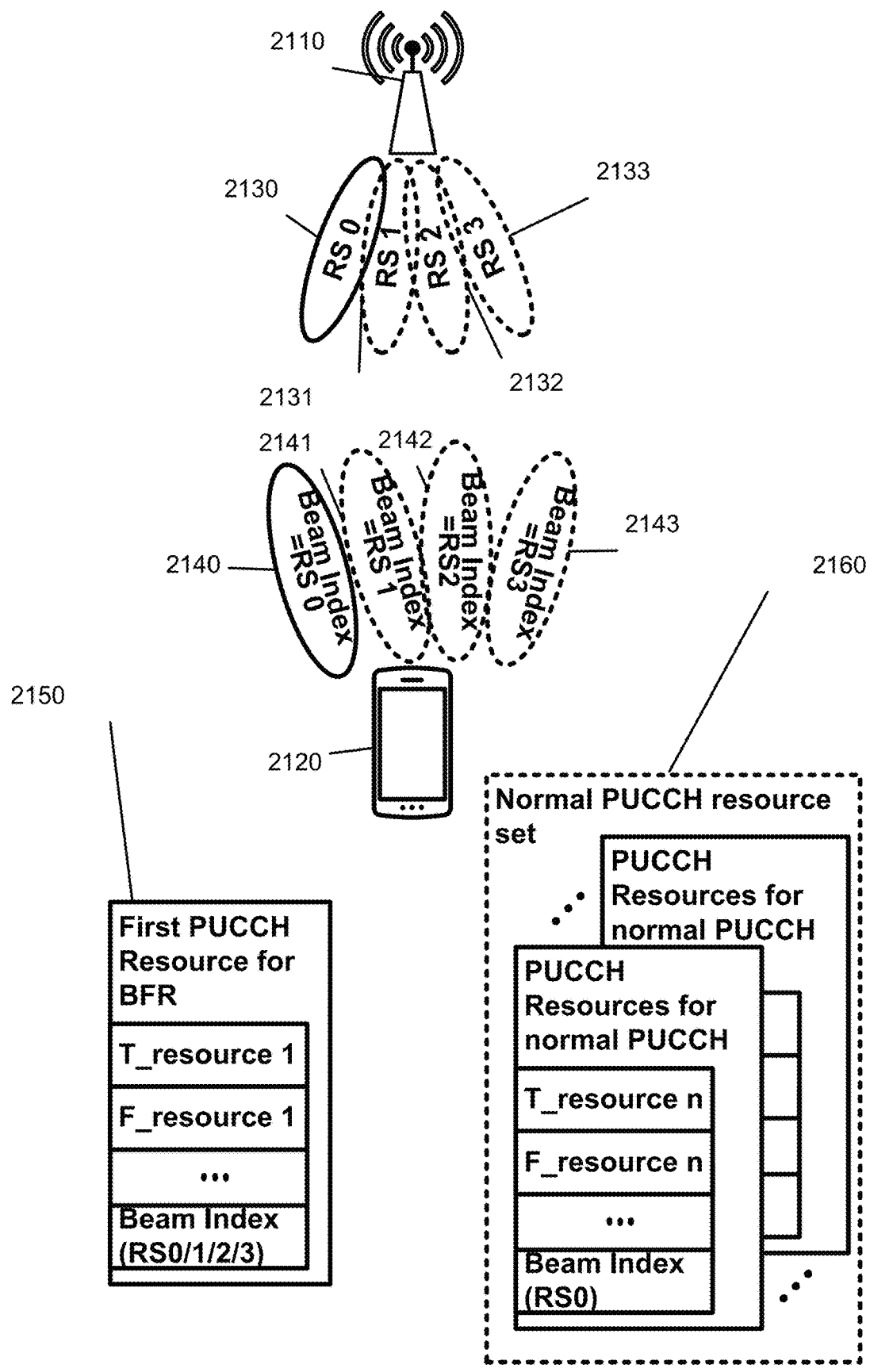
FIG. 21 shows an example of a PUCCH configuration for a BFR procedure.

FIG. 21 shows an example of a PUCCH configuration for a BFR procedure. A base station may send (e.g., transmit) at least one message comprising parameters indicating a first set of RSs (e.g., one or more active set of RSs, such as RS 0) and a second set of RSs (e.g., one or more candidate set of RSs, such as RS 1, RS 2 and RS 3). The at least one message may comprise an RRC message (e.g., an RRC connection reconfiguration message, an RRC connection reestablishment message, an RRC connection setup message, etc.). The first set of RSs may identify one or more active beams (e.g., a beam 2130) via which the base station sends (e.g., transmits) a PDCCH and/or a PDSCH. The second set of RSs may identify one or more candidate beams (e.g., beams 2131, 2132, and 2133) from which the wireless device 2120 may select a candidate beam with quality satisfying (e.g., better than) a threshold, for example, if the one or more beams (e.g., the beam 2130) associated with the first set of RSs fail.

The at least one message may comprise parameters indicating a first PUCCH resource for a BFR 2150 and at least one normal PUCCH resource set 2160 comprising multiple PUCCH resources for normal PUCCH transmissions. The first PUCCH resource 2150 (e.g., a BFR PUCCH resource) may be identified by at least one of: a first time resource (e.g., T_resource 1); a first frequency resource (e.g., F_resource 1); a first cyclic shift of a base sequence; and/or a first beam index. Each of the multiple PUCCH resources for normal PUCCH transmissions may be identified by at least one of: a second time resource (e.g., T_resource n); a second frequency resource (e.g., F_resource n); a second cyclic shift of a base sequence; and/or a second beam index (e.g., indicating the RS 0).

The wireless device 2120 may send (e.g., transmit) a PUCCH signal via the first PUCCH resource 2150, for example, if a BFR procedure is triggered. The PUCCH signal for the BFR may comprise at least one parameter indicating at least one of: a beam failure; a candidate beam; and/or beam quality (e.g., RSRP) of the candidate beam.

The wireless device 2120 may determine a PUCCH resource from the normal PUCCH resource set, for example, if the wireless device 2120 performs an SR transmission (e.g., triggered by a BSR), a HARQ-ACK transmission, or a CSI report (e.g., a beam report) on a PUCCH. The first PUCCH resource may be different from the PUCCH resources of the normal PUCCH resource set (e.g., at least one of: a time resource; a frequency resource; a cyclic shift; an orthogonal code; and/or a beam index may be different).

The base station 2110 may set the first beam index for the first PUCCH resource to a serving beam index (e.g., RS 0 of the serving beam 2130), a candidate beam index (e.g., the RS 1, the RS 2, or the RS 3) other than the serving beam index, or a currently used uplink beam index (e.g., an SRS resource index), for example, for a beam correspondence non-existence. The base station 2110 may set the first beam index for the first PUCCH resource to a candidate beam index (e.g., the RS 1, the RS 2, or the RS 3), for example, for a beam correspondence existence.

The base station 2110 may set the first beam index to a predefined value indicating the wireless device 2120 may determine a transmission beam corresponding to a candidate beam, for example, for a beam correspondence existence. The wireless device 2120 may select, based on the first beam index set to the predefined value, both the candidate beam of the base station 2110 and the transmission beam, of the wireless device 2120, for a PUCCH transmission for a BFR. The wireless device 2120 may determine the transmission beam (e.g., the beam 2142) corresponding to a receiving beam (e.g., the beam 2132 for the RS 2), for example, if the wireless device 2120 selects the RS 2 as the candidate beam. The wireless device 2120 may send (e.g., transmit) a PUCCH signal via the transmission beam. The PUCCH signal may comprise at least one parameter indicating at least one of: a beam failure occurrence; a beam indicator; and/or beam quality of the candidate beam.

The base station 2110 may detect the PUCCH signal sent via the first PUCCH resource by using a receiving beam (e.g., the beam 2132) corresponding to the beam index (e.g., the RS 2) of the first PUCCH resource. The base station 2110 may decode the received PUCCH signal to retrieve information of the PUCCH signal (e.g., a beam indicator and/or beam quality of the candidate beam). The base station 2110 may send (e.g., transmit) a PDCCH on a coreset (e.g., a dedicated coreset for a BFR procedure) to the wireless device 2120. The wireless device 2120 may monitor the PDCCH for detecting downlink control information, for example, after or in response to sending (e.g., transmitting) the PUCCH signal via the first PUCCH resource. The PDCCH may be sent via the candidate beam, of the base station 2110, selected by the wireless device 2120. The wireless device 2120 may complete the PUCCH-based BFR procedure, for example, after or in response to detecting the downlink control information on the coreset.

Figure 22:
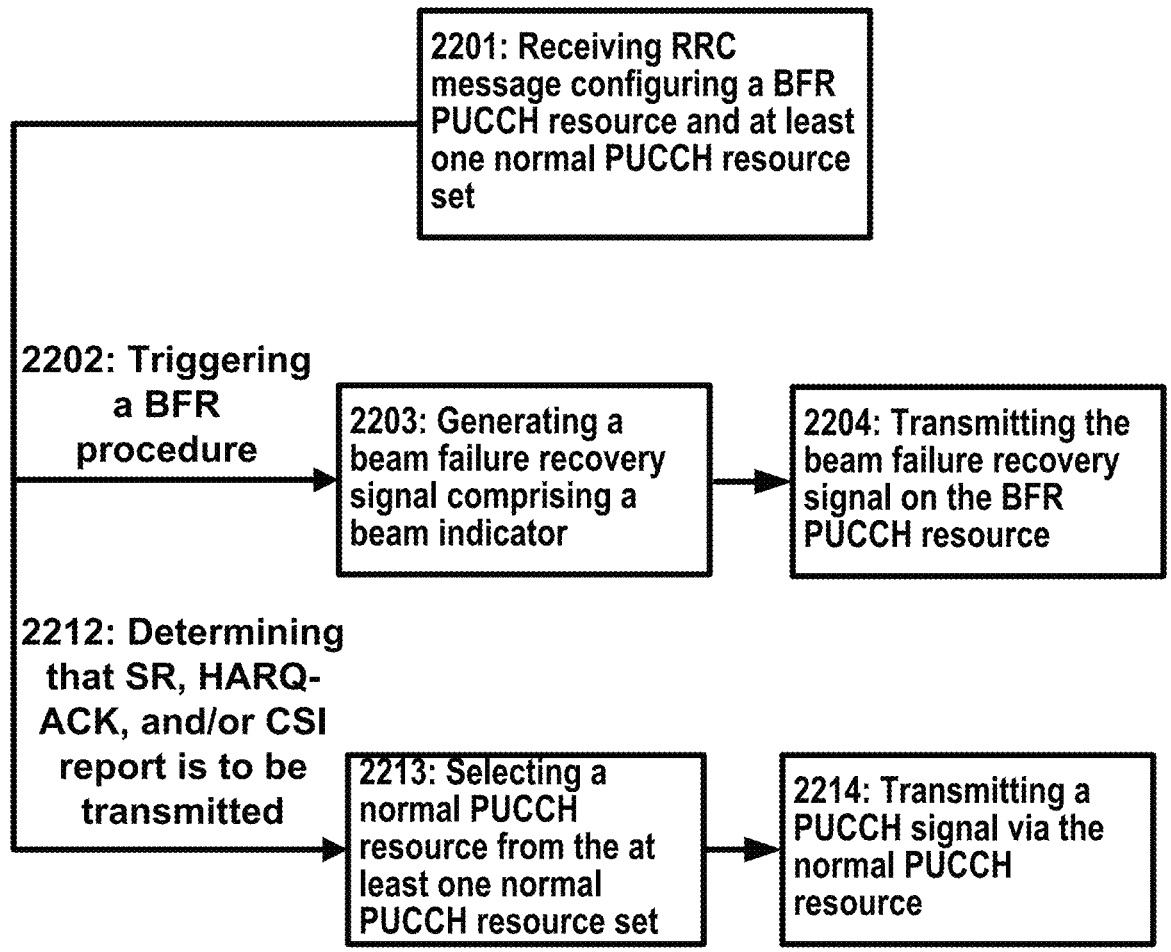
FIG. 22 shows an example PUCCH configuration procedure.

FIG. 22 shows an example of configuring a PUCCH configuration for a BFR procedure. One or more steps shown in FIG. 22 may be performed by a wireless device (e.g., the wireless device 2120). At step 2201, the wireless device may receive one or more RRC messages configuring a BFR PUCCH resource and at least one normal PUCCH resource set. At step 2212, the wireless device may determine that an SR, a HARQ-ACK, and/or a CSI report is to be sent (e.g., transmitted) to a base station (e.g., the base station 2110). At step 2213, the wireless device may select a normal PUCCH resource from the at least one normal PUCCH resource set. At step 2214, the wireless device may send (e.g., transmit) a PUCCH signal via the normal PUCCH resource. Via an active beam (e.g., the active beam 2140) of the wireless device, the wireless device may send the SR, the HARQ-ACK, and/or the CSI report. The selected normal PUCCH resource may comprise a beam index field indicating the active beam of the wireless device (e.g., the beam index field may have a value indicating the RS 0 as shown in FIG. 21).

At step 2202, the wireless device may trigger a BFR procedure. The BFR procedure may be triggered, for example, if there is a communication quality problem with a downlink signal communication and/or an uplink signal communication via active beams of the base station and wireless device (e.g., the active beam 2130 of the base station 2110 and the active beam 2140 of the wireless device 2120). At step 2203, the wireless device may select a BFR PUCCH resource (e.g., the first PUCCH resource for the BFR 2150) and may generate a BFR signal comprising a beam indicator (e.g., one of beam indicators shown in FIG. 23). At step 2204, the wireless device may send (e.g., transmit) the generated BFR signal via the BFR PUCCH resource.

The beam index of the second set of RSs indicated in the at least one message may be a SSB resource index/ID or a CSI-RS resource index/ID (e.g., at most 64). The number of RSs in the second set of RSs may be a number no more than 4, or 8, or 16, depending on a configuration of a base station (e.g., the base stations 1910 and 2110, etc.). It may be necessary to map a beam index associated with an RS index/ID (e.g., at most 64) from the second set of RSs to a beam indicator (e.g., 2 bits, 3 bits or 4 bits) used in a PUCCH signal transmission. The beam indicator may be 2 bits, for example, the number of RSs in the second set of RSs is 4 or less. The beam indicator may be 3 bits, for example, the number of RSs in the second set of RSs is more than 4 and less than 9. The beam indicator may be 4 bits, for example, the number of RSs in the second set of RSs is more than 8 and less than 17. The base station 2110 may (e.g., explicitly) indicate, to the wireless device 2120 and via the at least one message, the size (e.g., the bit width) of the beam indicator determined based on the number of second set of RSs. By indicating the number of second set of RSs, the base station 2110 may implicitly indicate, to the wireless device 2120, the size (e.g., the bit width) of the beam indicator.

FIG. 23 shows an example beam index mapping procedure. The mapping between a bit value of a beam indicator and a beam index (e.g., the SSB resource index/ID or a CSI-RS resource index/ID) of the second set of RSs may be predefined or preconfigured. 4 RSs (RS 12, RS 21, RS 54, and RS 62) may be comprised in the second set of RSs. The first beam index (e.g., RS 12) may be represented by a 2-bit beam indicator (e.g., "00"), the second beam index (e.g., RS 21) may be represented by "01", the third beam index (e.g., RS 54) may be represented by "10", and the fourth beam index (e.g., RS 62) may be represented by "11". A base station and one or more wireless devices may presume that a lower beam index is mapped to a lower bit value of a beam indicator and that a higher beam index is mapped to a higher bit value of a beam indicator (e.g., as shown in FIG. 23). A wireless device may set the beam indicator to "01" in the PUCCH signal, for example, if the wireless device selects a beam corresponding to the RS 21 as a candidate beam. The base station may determine the candidate beam associated with the beam index RS 21 as the candidate beam selected by the wireless device, for example, if the base station receives the PUCCH signal and determines that the beam indicator contained in the PUCCH signal is "01". The example mapping may reduce the bit number used in a PUCCH signal to indicate a candidate beam index, and may improve the PUCCH transmission robustness and/or efficiency.

The number of RSs in the second set of RSs may be more than 4 and no more than 8 (e.g., the second set of RSs may have 5 RSs, 6 RSs, 7 RSs, or 8 RSs). The first beam index in the second set of RSs may be mapped to a first 3-bit beam indicator "000", the second beam index mapped to a second 3-bit beam indicator "001", . . . , and the eighth beam index of the second set of RSs may be mapped to an eighth 3-bit beam indicator "111", for example, according to ascending order. A wireless device may set the beam indicator to "000" in the PUCCH signal, for example, if the wireless device selects a beam corresponding to the first beam index. The mapping in ascending order may apply between different 4-bit beam indicators and different RSs in the second set of RSs, for example, if the number of RSs in the second set of RSs is more than 8 and no more than 16. The bit number used in beam indicator of PUCCH signal may be log 2K, for example, if the number of the second set of RSs is K. The first beam index of the second set of RSs may be represented by an all-zero bit string with a length of log2K bits. The last beam index of the second set of RSs may be represented by an all-one bit string with a length of log 2K bits.

A wireless device may receive, from a base station, at least one message comprising first configuration parameters of one or more first PUCCH resources and comprising second configuration parameters of one or more second PUCCH resources. Each of the one or more first PUCCH resources may be identified by first parameters comprising at least one RS index of the PUCCH resource(s) for a BFR (e.g., RS 0, RS 1, RS 2, RS 3, etc.). Each of the one or more second PUCCH resources may be identified by second parameters comprising at least one RS index of a PUCCH resource for a normal PUCCH (e.g., RS 0). The wireless device may select a first PUCCH resource from one or more first PUCCH resources for a BFR, for example, if a BFR procedure is initiated. The wireless device may determine a first transmission beam based on the at least one RS index of the first PUCCH resource. The wireless device may send (e.g., transmit) at least one first uplink signal via the first transmission beam and via the first PUCCH resource. The wireless device may select a second PUCCH resource from one or more second PUCCH resources of a normal PUCCH resource set, for example, if a PUCCH transmission for an SR, a HARQ-ACK, or a CSI report is triggered. The wireless device may determine a second transmission beam based on the at least one RS index of the second PUCCH resource. The wireless device may send (e.g., transmit) at least one second uplink signal via the second transmission beam and via the second PUCCH resource.

The at least one message may comprise one or more first RS resources (e.g., RS 0) for the normal PUCCH resource set and/or comprise one or more second RS resources for the one or more first PUCCH resources for a BFR. Each of the one or more second RS resources may be associated with one or more first PUCCH resources. A first RS of the one or more second RS resources may be associated with a first PUCCH resource of the one or more first PUCCH resources. A second RS of the one or more second RS resources may be associated with a second PUCCH resource of the one or more first PUCCH resources.

The beam failure recovery procedure being initiated may comprise at least one of: measuring at least one downlink control channel with signal strength not satisfying (e.g., lower than) a first threshold; and/or selecting a candidate RS, in the one or more second RSs, based on a second threshold.

The wireless device may determine the first PUCCH resource associated with the selected RS. Each of the one or more first PUCCH resources may comprise at least one of: a cyclic shift; a time resource; a frequency resource; and/or an orthogonal cover code. The at least one first uplink signal may be a scheduling request.

Figure 24:
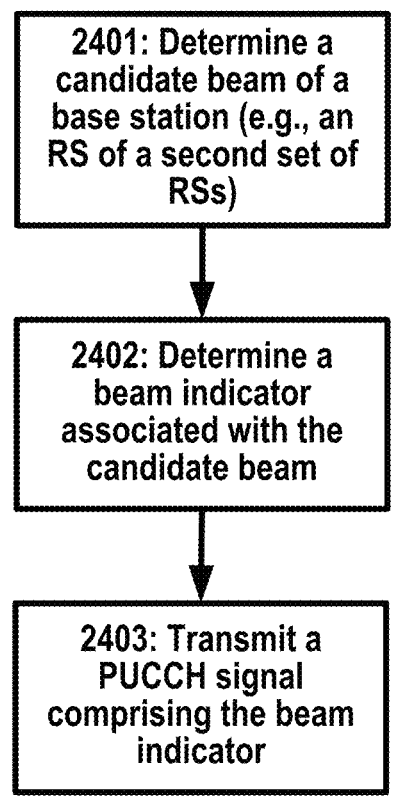
FIG. 24 shows an example beam index mapping procedure.

FIG. 24 shows an example of configuring a beam indicator associated with a beam index. One or more steps shown in FIG. 24 may be performed by a wireless device (e.g., the wireless device 2120). At step 2401, the wireless device may determine a candidate beam of a base station (e.g., the beam 2132 of the base station 2110). The wireless device may determine the candidate beam by selecting an RS from the second set of RSs (e.g., RS 1, RS 2, and RS 3) configured by an RRC message. The wireless device may determine the candidate beam, for example, for a BFR procedure. A downlink signal sent from the serving beam 2130 of the base station 2110 may have a low quality for the wireless device 2120, and the wireless device 2120 may determine one or more beam failure instances. The wireless devices 2120 may measure reference signals of the candidate beams 2131, 2132, and 2133. The candidate beam 2131 may send the RS 1, the candidate beam 2132 may send the RS 2, and the candidate beam may send the RS 3. The wireless device 2120 may select the RS 2 (and the candidate beam 2132), for example, if the signal quality of the RS 2 satisfies one or more threshold (e.g., the RSRP of the RS 2 is greater than a threshold). At step 2402, the wireless device may determine a beam indicator associated with the selected candidate beam. The beam indicator may have a 2-bit value, for example, if the number of candidate beams of the base station configurable for the wireless device is less than or equal to four (e.g., three candidate beams 2131, 2132, and 2133 of the base station 2110 may be configurable for the wireless device 2120 in FIG. 21). A beam indicator value '00' may indicate the candidate beam 2131, a beam indicator '01' may indicate the candidate beam 2132, and the beam indicator '10' may indicate the candidate beam 2133. The beam indicator may have a 3-bit value, for example, if the number of candidate beams of the base station configurable for the wireless device is less than or equal to eight. The beam indicator may have a 4-bit value, for example, if the number of candidate beams of the base station configurable for the wireless device is less than or equal to sixteen. At step 2403, the wireless device may send (e.g., transmit), to the base station, a PUCCH signal comprising the selected beam indicator. The base station may select, after receiving the PUCCH signal and based on the value of the selected beam indicator, one of the candidate beams of the base station for a BFR. The base station may send, after receiving the PUCCH signal comprising the selected beam indicator, a downlink control signal by using the selected candidate beam of the base station.

Figure 25:
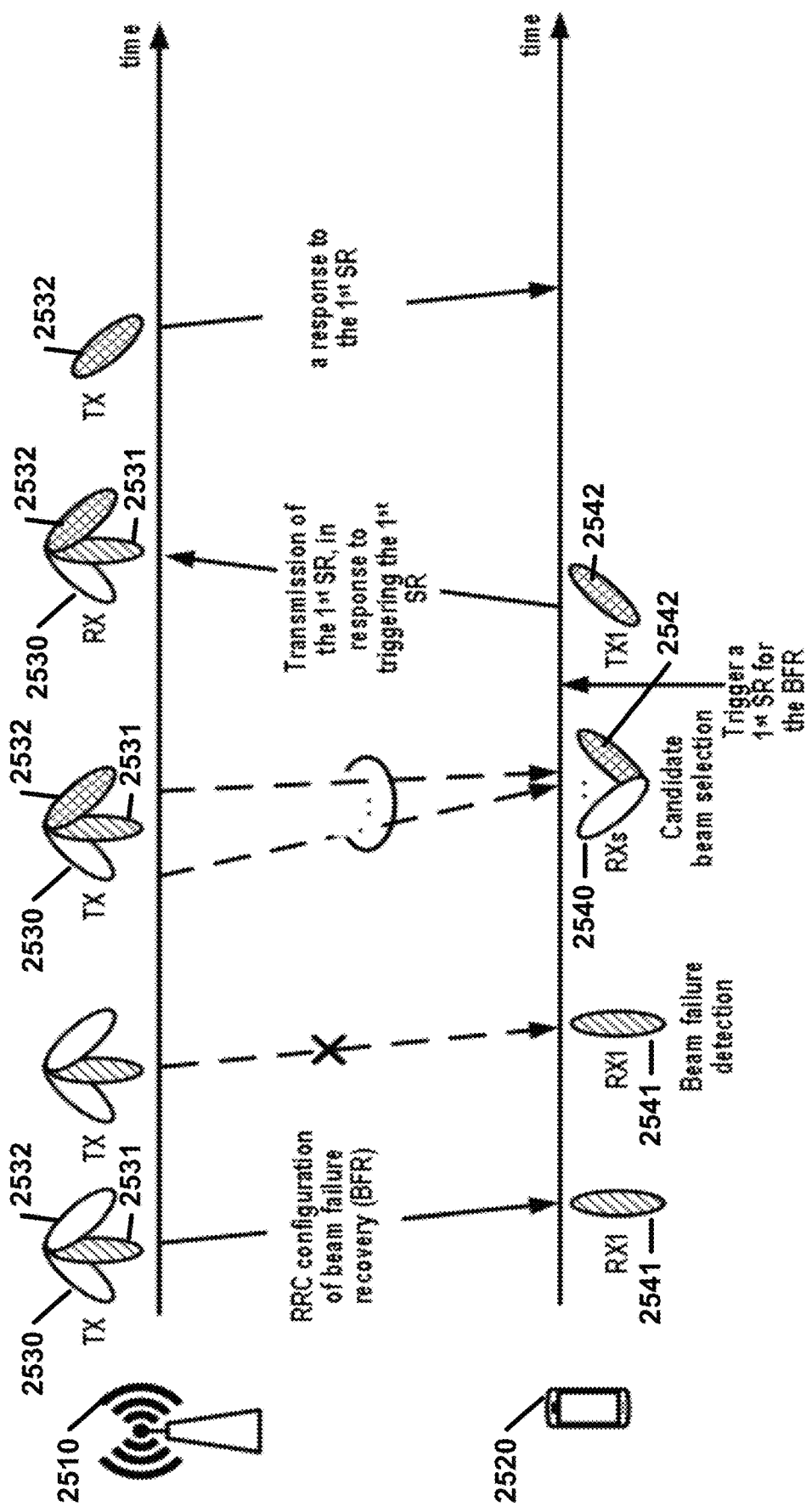
FIG. 25 shows an example of a beam selection for a BFR procedure.

FIG. 25 shows an example of a beam selection for a BFR procedure. A base station 2510 may send, to a wireless device 2520, one or more messages (e.g., one or more RRC messages). The wireless device 2520 may receive the one or more messages via an active beam 2541 of the wireless device 2520. The one or more messages may comprise one or more RRC configuration parameters for a BFR. The one or more messages may be sent via a serving beam (e.g., an active beam) 2531. The one or more RRC configuration parameters for the BFR may comprise a set of RSs indicating a plurality of candidate beams 2530 and 2532 that may be used for the wireless device 2520. A first candidate beam 2530 of the base station 2510 may be associated with a first RS (e.g., RS 0), and a second candidate beam 2532 of the base station 2510 may be associated with a second RS (e.g., RS 2). The serving beam 2531 of the base station 2510 may be associated with a third RS (e.g., RS 1). The one or more RRC configuration parameters for the BFR may comprise one or more beam indexes (e.g., the beam indexes of the BFR PUCCH resource set 1950, the beam index of the first PUCCH resource for BFR 2150, etc.) to indicate a candidate beam of the wireless device 2520 for the BFR.

The one or more messages may comprise at least one normal PUCCH resource set (e.g., the normal PUCCH resource set 1960, the normal PUCCH resource set 2160, etc.). The at least one normal PUCCH resource set may comprise one or more normal PUCCH resources. The one or more normal PUCCH resources may comprise a beam index indicating the third RS associated with the serving beam 2531. The wireless device 2520 may send, to the base station 2510 and via the active beam 2541, an uplink signal (e.g., an SR, a HARQ-ACK, and/or a CSI report). The sending of the uplink signal may be based on the one or more normal PUCCH resources.

The wireless device 2520 may determine a BFR by detecting one or more beam failure instances. The wireless device 2520 may measure a downlink signal sent from the serving beam 2531 and received by the active beam 2541. The downlink signal may comprise the third RS (e.g., RS 1), and the wireless device may measure the signal quality (e.g., RSRP) of the third RS. The wireless device 2520 may detect one or more beam failure instances by determining a failure of decoding the downlink signal, determining the signal quality of the third RS does not satisfy one or more thresholds (e.g., the signal quality is lower than a threshold), etc.

The wireless device 2520 may measure downlink signals sent from the candidate beams 2530 and 2532. The wireless device 2520 may receive, via a candidate beam 2540 of the wireless device 2520, the first RS sent from the candidate beam 2530, and may receive, via a candidate beam 2542 of the wireless device 2520, the second RS sent from the candidate beam 2532. The wireless device 2520 may determine, based on the measurements, that the signal quality of the second RS is better than the signal quality of the first RS, and may select the candidate beam 2532 for the BFR. To indicate the selection of the candidate beam 2532, the wireless device 2520 may trigger an uplink transmission (e.g., a PUCCH transmission, an SR transmission, etc.) for the BFR.

The wireless device 2520 may send, via a candidate beam 2542, the uplink transmission for the BFR. The candidate beam 2542 may be indicated by the one or more beam indexes (e.g., the beam indexes of the BFR PUCCH resource set 1950, the beam index of the first PUCCH resource for BFR 2150, etc.) sent from the base station 2510. The base station 2510 may receive, via the beam 2532 of the base station 2510 associated with the candidate beam 2542, the uplink transmission for the BFR. The base station 2510 may determine, based on the one or more beam indexes set by the base station 2510, the beam 2532 of the base station 2510 associated with the candidate beam 2542. The base station 2510 may retrieve a beam indicator from the received uplink transmission for the BFR, and may determine, based on the beam indicator, the candidate beam 2532 selected by the wireless device 2520 for a response to the uplink transmission for the BFR. The base station 2510 may send, via the candidate beam 2532, the response to complete the BFR for the wireless device 2520. Although FIG. 25 shows that the base station 2510 receives the uplink transmission for the BFR via the candidate beam 2532 and sends the response via the candidate beam 2532, the receiving beam and the transmission beam of the base station 2510 may be different. For example, the base station 2510 may set the one or more beam indexes differently, and the wireless device may send, via the candidate beam 2540, the uplink transmission for the BFR. The base station 2510 may receive, via the candidate beam 2530, the uplink transmission for the BFR. The base station 2510 may determine the candidate beam 2532 for the transmission of the response, for example, if the uplink transmission for the BFR comprises a beam indicator associated with the candidate beam 2532 or if the uplink transmission for the BFR has been sent via a BFR PUCCH resource associated with the candidate beam 2532.

Figure 26:
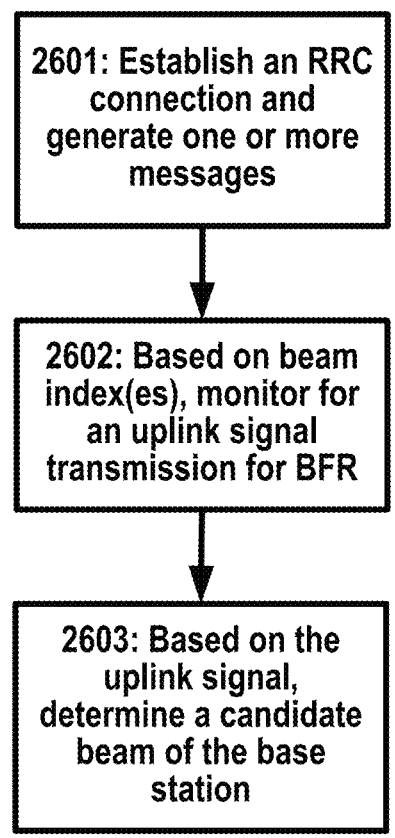
FIG. 26 shows an example of performing a BFR procedure.

FIG. 26 shows an example of performing a BFR procedure. One or more steps shown in FIG. 26 may be performed by a base station (e.g., the base station 1910, 2110, and 2510). At step 2601, the base station may establish an RRC connection with a wireless device (e.g., the wireless device 1920, 2120, and 2520), and may generate one or more messages for the wireless device. The one or more messages may comprise one or more RRC messages and may be the one or more messages discussed above (e.g., the one or more messages discussed with respect to FIGS. 19-25). To set one or more configuration parameters of the one or more messages, the base station may determine the number of the first set of RSs (e.g., one or more active set of RSs, such as the RS 0 of a serving beam) and the number of the second set of RSs (e.g., one or more candidate set of RSs, such as the RS 1, the RS 2, and the RS 3 of candidate beams). The base station may configure normal PUCCH resources for the wireless device and configure one or more BFR PUCCH resources for the wireless device. The number of BFR PUCCH resources may be based on the number of the second set of RSs (e.g., as shown in FIG. 19) or may be less than the number of the second set of RSs (e.g., as shown in FIG. 21). The base station may set a beam index as a configuration parameter. Each of the BFR PUCCH resources may comprise a beam index (e.g., as shown in FIG. 19). Similar to the RS signal measurements by the wireless device, the base station may measure RS signals transmitted from a plurality of transmission beams of the wireless device. Based on the measurements by the base station, the base station may select one or more candidate beams of the wireless device. The base station may determine the one or more beam indexes based on the selected candidate beam(s) of the wireless device. The base station may determine RS 2 as a value of the beam index of the first PUCCH resource for the BFR 2150, for example, if the base station determines that the signal received from the transmission beam 2142 has the best signal quality among the candidate beams 2141, 2142, and 2143. The base station may determine RS 1 as values of the beam indexes of the BFR PUCCH resource set 1950, for example, if the base station determines that the signal received from the transmission beam 1941 has the best signal quality among the candidate beams 1941, 1942, and 1943. The base station may set different beam indexes for different BFR PUCCH resources. The base station may determine RS 1 as values of the beam indexes of the PUCCH resource 1 and the PUCCH resource 3, and may determine RS 2 as a value of the beam index of the PUCCH resource 2.

At step 2602, the base station may monitor an uplink signal transmission, of the wireless device, for the BFR. The base station may monitor the uplink signal transmission based on the beam index(s). The base station may monitor an uplink signal (e.g., RS 2) sent from the beam 2142 and may receive, via the beam 2132, the uplink signal, for example, if the beam index of the first PUCCH resource for the BFR indicates the RS 2. The base station may monitor an uplink signal (e.g., RS 1) sent from the beam 1941, for example, if the beam indexes of the BFR PUCCH resource set 1950 indicate the RS 1. The base station may assume that the uplink signal may be sent via one of the PUCCH resource 1, the PUCCH resource 2, or the PUCCH resource 3. The base station may monitor a first uplink signal (e.g., RS 1) sent from the beam 1941 and may monitor a second uplink signal (e.g., RS 2) sent from the beam 1942, for example, if the beam indexes of the PUCCH resource 1 and the PUCCH resource 3 indicate the RS 1 and if the beam index of the PUCCH resource 2 indicates the RS 2. The base station may assume that the first uplink signal may be sent via one of the PUCCH resource 1 or the PUCCH resource 3 and may assume that the second uplink signal may be sent via the PUCCH resource 2.

At step 2603, the base station may determine, based on the received uplink signal(s), one or more candidate beams of the base station. The base station may retrieve a beam indicator from the received uplink signal, for example, if the wireless device sends an uplink signal comprising one of the beam indicators (e.g., as shown in FIG. 23). The base station may receive one or more uplink signals mapped on one or more of BFR PUCCH resources (e.g., the PUCCH resource 1, the PUCCH resource 2, and the PUCCH resource 3 shown in FIG. 19). The base station (e.g., the base station 1910) may select the candidate beams 1932 and 1933, for example, if the wireless device 1920 sends, via the PUCCH resource 2 and the PUCCH resource 3, uplink signals for the BFR. If the base station 1910 and the wireless device 1920 use more than one BFR PUCCH resource of the BFR PUCCH resource set 1950, the success probability of the BFR procedure may increase.

A base station may send, to a wireless device, one or more configuration parameters associated with a BFR procedure. The one or more configuration parameters may comprise a plurality of RS resources and comprise an RS resource index associated with an uplink control channel (e.g., a PUCCH channel). The one or more configuration parameters may comprise configuration parameters of a PUCCH for the BFR procedure. The wireless device may determine (e.g., select), from the plurality of RS resources, a first RS resource. The wireless device may identify, based on initiating the BFR procedure, the first RS resource. The wireless device may determine, based on one or more thresholds and based on initiating the BFR procedure, the first RS resource. The first RS resource may be associated with a candidate beam of the base station. The configuration parameters may comprise the plurality of RS resources each associated with a different candidate beam of the base station. The wireless device may determine, based on the RS resource index (e.g., the RS resource index being set to a first value), one or more transmission beam parameters (e.g., a spatial filter) for the uplink control channel. The wireless device may transmitting, based on the one or more transmission beam parameters and via the uplink control channel, uplink control information for the BFR procedure and to indicate the first RS resource. The wireless device may initiate, based on one or more beam failures, the BFR procedure. The wireless device may determine, based on the RS resource index, a beam of the wireless device. The wireless device may transmit, based on the beam of the wireless device, the uplink control information for the BFR procedure. The uplink control information may comprise at least one of: information indicating the first RS resource or an RSRP value of the first RS resource. The uplink control information for the BFR procedure may comprise a beam indicator indicating the first RS resource. The selection of the uplink control channel may indicate the first RS resource. The one or more configuration parameters may indicate a plurality of uplink control channel resources each associated with a different RS resource of the plurality of RS resources. A first uplink control channel resource, of the plurality of uplink control channel resources may be associated with the uplink control channel and may comprise the RS resource index. A selection of the first uplink channel resource may indicate, to the base station, at least one of: the first RS resource or a first candidate beam of the base station. The wireless device may select, from the plurality of control channel resources and based on the first RS resource, a first uplink control channel resource.

The wireless device may determine, based on the first uplink control channel resource, the uplink control channel. The first RS resource may comprise at least one of: one or more channel state information RS resources or one or more synchronization signal blocks. The RS resource index may indicate at least one of: one or more channel state information RS resources, one or more synchronization signal blocks, or one or more sounding reference signal resources. The RS resource index associated with the uplink control channel may indicate a candidate transmission beam of the wireless device. The RS resource index may indicate one or more transmission beam parameters of the candidate transmission beam of the wireless device. The uplink control channel may be associated with the first RS. The wireless device may select, based on the first RS resource, the uplink control channel from a plurality of uplink channels. The wireless device may transmit a capability indication message (e.g., a capability response message) comprising a first capability parameter indicating whether a beam correspondence is supported. The capability indication message may indicate that a beam correspondence is not supported. The uplink control information or the uplink control channel indicates a selection of the candidate beam of the base station. The wireless device may receive, based on the first capability parameter indicating a beam correspondence is not supported, the configuration parameters. The wireless device may select the first RS resource, for example, based on channel quality of the first RS resource satisfying (e.g., greater than) the one or more thresholds. The wireless device may initiate the BFR procedure, for example, based on detecting a number of beam failure instances. The wireless device may detect the number of beam failure instances, for example, based on channel quality of one or more second RS resources and one or more thresholds. The one or more second RS resources may be associated with one or more serving beams of the base station. The channel quality of the one or more second RS resources may comprise at least one of: a value of RSRP, a value of channel quality indicator, or a block error rate. The one or more thresholds may be comprised in the configuration parameters. The one or more second RS resources may comprise one or more channel state information RS resources or one or more synchronization signal blocks. The wireless device may detect the number of beam failure instances, for example, based on the channel quality of the one or more second RS resources not satisfying (e.g., lower than) the one or more thresholds. The wireless device may monitor a downlink control channel for a response to the uplink control information, for example, after or in response to transmitting the uplink control information. The wireless device may receive, during monitoring the downlink control channel, the response via the downlink control channel. The wireless device may complete the BFR procedure, for example, based on receiving the response. The wireless device may transmit second uplink control information via a second uplink control channel, for example, after or in response to not receiving the response during the monitoring. The wireless device may increment a BFR request transmission counter, for example, after transmitting the second uplink control information. The wireless device may monitor a second downlink control channel for a second response to the second uplink control information. The wireless device may complete the BFR procedure, for example, after or in response to not receiving the second response during monitoring the second downlink control channel and the BFR request transmission counter satisfying (e.g., equal to or greater than) a first value (e.g., a maximum BFR transmission counter value).

Figure 27:
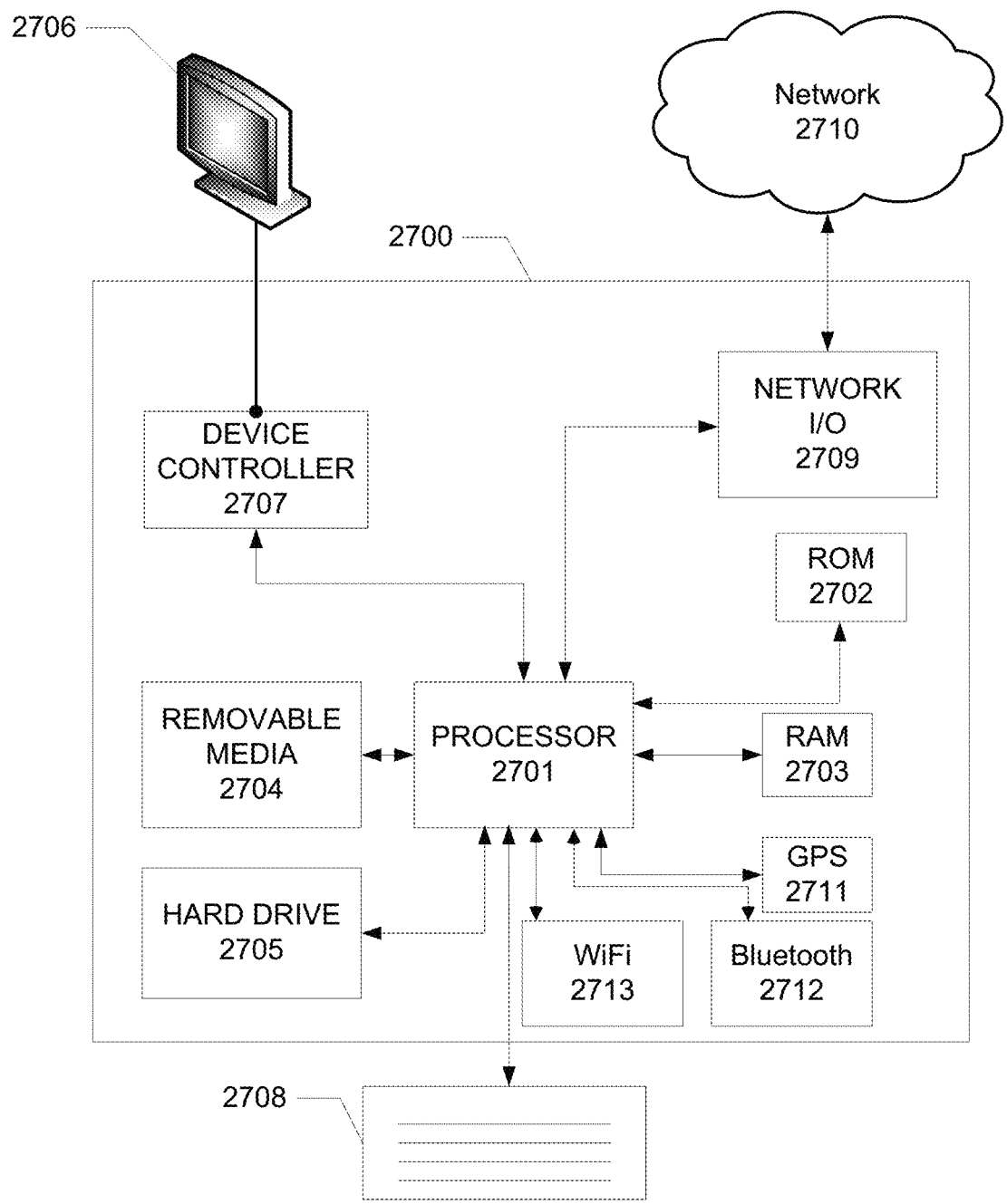
FIG. 27 shows example elements of a computing device that may be used to implement any of the various devices described herein.

FIG. 27 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 2700 may include one or more processors 2701, which may execute instructions stored in the random access memory (RAM) XX03, the removable media 2704 (such as a Universal Serial Bus (USB) drive, compact disk (CD) or digital versatile disk (DVD), or floppy disk drive), or any other desired storage medium. Instructions may also be stored in an attached (or internal) hard drive 2705. The computing device 2700 may also include a security processor (not shown), which may execute instructions of one or more computer programs to monitor the processes executing on the processor 2701 and any process that requests access to any hardware and/or software components of the computing device 2700 (e.g., ROM 2702, RAM 2703, the removable media 2704, the hard drive 2705, the device controller 2707, a network interface 2709, a GPS 2711, a Bluetooth interface 2712, a WiFi interface 2713, etc.). The computing device 2700 may include one or more output devices, such as the display 2706 (e.g., a screen, a display device, a monitor, a television, etc.), and may include one or more output device controllers 2707, such as a video processor. There may also be one or more user input devices 2708, such as a remote control, keyboard, mouse, touch screen, microphone, etc.

The computing device 2700 may also include one or more network interfaces, such as a network interface 2709, which may be a wired interface, a wireless interface, or a combination of the two. The network interface 2709 may provide an interface for the computing device 2700 to communicate with a network 2710 (e.g., a RAN, or any other network). The network interface 2709 may include a modem (e.g., a cable modem), and the external network 2710 may include communication links, an external network, an in-home network, a provider's wireless, coaxial, fiber, or hybrid fiber/coaxial distribution system (e.g., a DOCSIS network), or any other desired network. Additionally, the computing device 2700 may include a location-detecting device, such as a global positioning system (GPS) microprocessor 2711, which may be configured to receive and process global positioning signals and determine, with possible assistance from an external server and antenna, a geographic position of the computing device 2700.

The example in FIG. 27 may be a hardware configuration, although the components shown may be implemented as software as well. Modifications may be made to add, remove, combine, divide, etc. components of the computing device 2700 as desired. Additionally, the components may be implemented using basic computing devices and components, and the same components (e.g., processor 2701, ROM storage 2702, display 2706, etc.) may be used to implement any of the other computing devices and components described herein. For example, the various components described herein may be implemented using computing devices having components such as a processor executing computer-executable instructions stored on a computer-readable medium, as shown in FIG. 27. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
    receiving, by a wireless device, one or more configuration parameters associated with beam failure recovery, wherein the one or more configuration parameters comprise:
        a plurality of candidate reference signal (RS) resource indexes associated with downlink reception; and
        an RS resource index associated with uplink transmission;
    determining, from the plurality of candidate RS resource indexes, a first candidate RS resource index for beam failure recovery;
    determining, based on the RS resource index associated with uplink transmission, one or more transmission beam parameters for beam failure recovery; and
    transmitting, based on the one or more transmission beam parameters and via an uplink channel, uplink information for beam failure recovery.

2. The method of claim 1, wherein:
    the first candidate RS resource index is associated with a candidate beam of a base station;
    the determining the one or more transmission beam parameters for beam failure recovery comprises determining, based on the RS resource index associated with uplink transmission, a transmission beam of the wireless device; and
    the transmitting the uplink information is based on the transmission beam of the wireless device.

3. The method of claim 1, wherein the one or more configuration parameters comprise configuration parameters of a physical uplink control channel (PUCCH) for beam failure recovery, and
    wherein the uplink information comprises at least one of:
        a scheduling request for beam failure recovery; or
        the first candidate RS resource index.

4. The method of claim 1, wherein the first candidate RS resource index indicates at least one of:
    a channel state information RS resource; or
    a synchronization signal block resource.

5. The method of claim 1, wherein the RS resource index associated with uplink transmission indicates at least one of:

a channel state information RS resource;
a synchronization signal block resource; or
a sounding reference signal resource.

6. The method of claim 1, wherein the uplink channel comprises a physical uplink control channel (PUCCH).

7. The method of claim 1, wherein the uplink information indicates the first candidate RS resource index.

8. The method of claim 1, further comprising transmitting, by the wireless device, a capability indication message indicating that a beam correspondence is supported.

9. The method of claim 1, further comprising transmitting, by the wireless device, a capability indication message indicating that a beam correspondence is not supported.

10. The method of claim 1, further comprising:
determining a beam failure associated with a secondary cell,
wherein the transmitting the uplink information is further based on the beam failure associated with the secondary cell.

11. A method comprising:
transmitting, by a base station, one or more configuration parameters associated with beam failure recovery, wherein the one or more configuration parameters comprise:
a plurality of candidate reference signal (RS) resource indexes associated with downlink transmission; and
an RS resource index associated with uplink reception;
determining, based on the RS resource index associated with uplink reception, one or more beam parameters for beam failure recovery;
receiving, based on the one or more beam parameters and via an uplink channel, uplink information for beam failure recovery; and
determining, after receiving the uplink information, a first candidate RS resource index, of the plurality of candidate RS resource indexes, for beam failure recovery.

12. The method of claim 11, wherein:
the first candidate RS resource index is associated with a candidate beam of the base station;
the determining the one or more beam parameters for beam failure recovery comprises determining, based on the RS resource index associated with uplink reception, a reception beam of the base station that is associated with a transmission beam of a wireless device; and
the receiving the uplink information is based on the reception beam of the base station.

13. The method of claim 11, wherein the one or more configuration parameters comprise configuration parameters of a physical uplink control channel (PUCCH) for beam failure recovery, and
wherein the uplink information comprises at least one of:
a scheduling request for beam failure recovery; or
the first candidate RS resource index.

14. The method of claim 11, wherein the first candidate RS resource index indicates at least one of:
a channel state information RS resource; or
a synchronization signal block resource.

15. The method of claim 11, wherein the RS resource index associated with uplink reception indicates at least one of:
a channel state information RS resource;
a synchronization signal block resource; or
a sounding reference signal resource.

16. The method of claim 11, wherein the uplink channel comprises a physical uplink control channel (PUCCH).

17. The method of claim 11, wherein the uplink information indicates the first candidate RS resource index.

18. The method of claim 11, further comprising receiving, from a wireless device, a capability indication message indicating that a beam correspondence is supported.

19. The method of claim 11, further comprising receiving, from a wireless device, a capability indication message indicating that a beam correspondence is not supported.

20. The method of claim 11, further comprising:
determining, after receiving the uplink information, a beam failure associated with a secondary cell; and
transmitting, via a beam associated with the first candidate RS resource index, downlink information.

21. A wireless device comprising:
one or more processors; and
memory storing instructions that, when executed by the one or more processors, cause the wireless device to:
receive one or more configuration parameters associated with beam failure recovery, wherein the one or more configuration parameters comprise:
a plurality of candidate reference signal (RS) resource indexes associated with downlink reception; and
an RS resource index associated with uplink transmission;
determine, from the plurality of candidate RS resource indexes, a first candidate RS resource index for beam failure recovery;
determine, based on the RS resource index associated with uplink transmission, one or more transmission beam parameters for beam failure recovery; and
transmit, based on the one or more transmission beam parameters and via an uplink channel, uplink information for beam failure recovery.

22. The wireless device of claim 21, wherein:
the first candidate RS resource index is associated with a candidate beam of a base station; and
the instructions, when executed by the one or more processors, cause the wireless device to:
determine the one or more transmission beam parameters for beam failure recovery by determining, based on the RS resource index associated with uplink transmission, a transmission beam of the wireless device; and
transmit the uplink information by transmitting, based on the transmission beam of the wireless device, the uplink information.

23. The wireless device of claim 21, wherein the one or more configuration parameters comprise configuration parameters of a physical uplink control channel (PUCCH) for beam failure recovery, and
wherein the uplink information comprises at least one of:
a scheduling request for beam failure recovery; or
the first candidate RS resource index.

24. The wireless device of claim 21, wherein the first candidate RS resource index indicates at least one of:
a channel state information RS resource; or
a synchronization signal block resource.

25. The wireless device of claim 21, wherein the RS resource index associated with uplink transmission indicates at least one of:
a channel state information RS resource;
a synchronization signal block resource; or
a sounding reference signal resource.

26. The wireless device of claim 21, wherein the uplink channel comprises a physical uplink control channel (PUCCH).

27. The wireless device of claim 21, wherein the uplink information indicates the first candidate RS resource index.

28. The wireless device of claim 21, wherein the instructions, when executed by the one or more processors, cause the wireless device to transmit a capability indication message indicating that a beam correspondence is supported.

29. The wireless device of claim 21, wherein the instructions, when executed by the one or more processors, cause the wireless device to transmit a capability indication message indicating that a beam correspondence is not supported.

30. The wireless device of claim 21, wherein the instructions, when executed by the one or more processors, cause the wireless device to:
  determine a beam failure associated with a secondary cell; and
  transmit the uplink information by transmitting, based on the beam failure associated with the secondary cell, the uplink information.

31. A base station comprising:
  one or more processors; and
  memory storing instructions that, when executed by the one or more processors, cause the base station to:
    transmit one or more configuration parameters associated with beam failure recovery, wherein the one or more configuration parameters comprise:
      a plurality of candidate reference signal (RS) resource indexes associated with downlink transmission; and
      an RS resource index associated with uplink reception;
    determine, based on the RS resource index associated with uplink reception, one or more beam parameters for beam failure recovery;
    receive, based on the one or more beam parameters and via an uplink channel, uplink information for beam failure recovery; and
    determine, after receiving the uplink information, a first candidate RS resource index, of the plurality of candidate RS resource indexes, for beam failure recovery.

32. The base station of claim 31, wherein:
  the first candidate RS resource index is associated with a candidate beam of the base station; and
  the instructions, when executed by the one or more processors, cause the base station to:
    determine the one or more beam parameters for beam failure recovery by determining, based on the RS resource index associated with uplink reception, a reception beam of the base station that is associated with a transmission beam of a wireless device; and
    receive the uplink information by receiving, based on the reception beam of the base station, the uplink information.

33. The base station of claim 31, wherein the one or more configuration parameters comprise configuration parameters of a physical uplink control channel (PUCCH) for beam failure recovery, and
  wherein the uplink information comprises at least one of:
    a scheduling request for beam failure recovery; or
    the first candidate RS resource index.

34. The base station of claim 31, wherein the first candidate RS resource index indicates at least one of:
  a channel state information RS resource; or
  a synchronization signal block resource.

35. The base station of claim 31, wherein the RS resource index associated with uplink reception indicates at least one of:
  a channel state information RS resource;
  a synchronization signal block resource; or
  a sounding reference signal resource.

36. The base station of claim 31, wherein the uplink channel comprises a physical uplink control channel (PUCCH).

37. The base station of claim 31, wherein the uplink information indicates the first candidate RS resource index.

38. The base station of claim 31, wherein the instructions, when executed by the one or more processors, cause the base station to receive, from a wireless device, a capability indication message indicating that a beam correspondence is supported.

39. The base station of claim 31, wherein the instructions, when executed by the one or more processors, cause the base station to receive, from a wireless device, a capability indication message indicating that a beam correspondence is not supported.

40. The base station of claim 31, wherein the instructions, when executed by the one or more processors, cause the base station to:
  determine, after receiving the uplink information, a beam failure associated with a secondary cell; and
  transmit, via a beam associated with the first candidate RS resource index, downlink information.

41. A non-transitory computer-readable medium storing instructions that, when executed, cause:
  receiving one or more configuration parameters associated with beam failure recovery, wherein the one or more configuration parameters comprise:
    a plurality of candidate reference signal (RS) resource indexes associated with downlink reception; and
    an RS resource index associated with uplink transmission;
  determining, from the plurality of candidate RS resource indexes, a first candidate RS resource index for beam failure recovery;
  determining, based on the RS resource index associated with uplink transmission, one or more transmission beam parameters for beam failure recovery; and
  transmitting, based on the one or more transmission beam parameters and via an uplink channel, uplink information for beam failure recovery.

42. The non-transitory computer-readable medium of claim 41, wherein:
  the first candidate RS resource index is associated with a candidate beam of a base station;
  the instructions, when executed, cause the determining the one or more transmission beam parameters for beam failure recovery by determining, based on the RS resource index associated with uplink transmission, a transmission beam of a wireless device; and
  the instructions, when executed, cause the transmitting the uplink information based on the transmission beam of the wireless device.

43. The non-transitory computer-readable medium of claim 41, wherein the one or more configuration parameters comprise configuration parameters of a physical uplink control channel (PUCCH) for beam failure recovery, and
  wherein the uplink information comprises at least one of:
    a scheduling request for beam failure recovery; or
    the first candidate RS resource index.

44. The non-transitory computer-readable medium of claim 41, wherein the first candidate RS resource index indicates at least one of:
a channel state information RS resource; or
a synchronization signal block resource.

45. The non-transitory computer-readable medium of claim 41, wherein the RS resource index associated with uplink transmission indicates at least one of:
a channel state information RS resource;
a synchronization signal block resource; or
a sounding reference signal resource.

46. The non-transitory computer-readable medium of claim 41, wherein the uplink channel comprises a physical uplink control channel (PUCCH).

47. The non-transitory computer-readable medium of claim 41, wherein the uplink information indicates the first candidate RS resource index.

48. The non-transitory computer-readable medium of claim 41, wherein the instructions, when executed, further cause transmitting a capability indication message indicating that a beam correspondence is supported.

49. The non-transitory computer-readable medium of claim 41, wherein the instructions, when executed, further cause transmitting a capability indication message indicating that a beam correspondence is not supported.

50. The non-transitory computer-readable medium of claim 41, wherein the instructions, when executed, further cause determining a beam failure associated with a secondary cell, and
wherein the instructions, when executed, cause the transmitting the uplink information further based on the beam failure associated with the secondary cell.

51. A non-transitory computer-readable medium storing instructions that, when executed, cause:
transmitting one or more configuration parameters associated with beam failure recovery, wherein the one or more configuration parameters comprise:
a plurality of candidate reference signal (RS) resource indexes associated with downlink transmission; and
an RS resource index associated with uplink reception;
determining, based on the RS resource index associated with uplink reception, one or more beam parameters for beam failure recovery;
receiving, based on the one or more beam parameters and via an uplink channel, uplink information for beam failure recovery; and
determining, after receiving the uplink information, a first candidate RS resource index, of the plurality of candidate RS resource indexes, for beam failure recovery.

52. The non-transitory computer-readable medium of claim 51, wherein:
the first candidate RS resource index is associated with a candidate beam of a base station;
the instructions, when executed, cause the determining the one or more beam parameters for beam failure recovery by determining, based on the RS resource index associated with uplink reception, a reception beam of the base station that is associated with a transmission beam of a wireless device; and
the instructions, when executed, cause the receiving the uplink information based on the reception beam of the base station.

53. The non-transitory computer-readable medium of claim 51, wherein the one or more configuration parameters comprise configuration parameters of a physical uplink control channel (PUCCH) for beam failure recovery, and wherein the uplink information comprises at least one of:
a scheduling request for beam failure recovery; or
the first candidate RS resource index.

54. The non-transitory computer-readable medium of claim 51, wherein the first candidate RS resource index indicates at least one of:
a channel state information RS resource; or
a synchronization signal block resource.

55. The non-transitory computer-readable medium of claim 51, wherein the RS resource index associated with uplink reception indicates at least one of:
a channel state information RS resource;
a synchronization signal block resource; or
a sounding reference signal resource.

56. The non-transitory computer-readable medium of claim 51, wherein the uplink channel comprises a physical uplink control channel (PUCCH).

57. The non-transitory computer-readable medium of claim 51, wherein the uplink information indicates the first candidate RS resource index.

58. The non-transitory computer-readable medium of claim 51, wherein the instructions, when executed, further cause receiving, from a wireless device, a capability indication message indicating that a beam correspondence is supported.

59. The non-transitory computer-readable medium of claim 51, wherein the instructions, when executed, further cause receiving, from a wireless device, a capability indication message indicating that a beam correspondence is not supported.

60. The non-transitory computer-readable medium of claim 51, wherein the instructions, when executed, further cause:
determining, after receiving the uplink information, a beam failure associated with a secondary cell; and
transmitting, via a beam associated with the first candidate RS resource index, downlink information.

61. A system comprising:
a base station configured to transmit one or more configuration parameters associated with beam failure recovery, wherein the one or more configuration parameters comprise:
a plurality of candidate reference signal (RS) resource indexes associated with downlink; and
an RS resource index associated with uplink; and
a wireless device configured to:
determine, from the plurality of candidate RS resource indexes, a first candidate RS resource index for beam failure recovery;
determine, based on the RS resource index associated with uplink, one or more transmission beam parameters for beam failure recovery; and
transmit, based on the one or more transmission beam parameters and via an uplink channel, uplink information for beam failure recovery.

62. The system of claim 61, wherein:
the first candidate RS resource index is associated with a candidate beam of the base station; and
the wireless device is configured to:
determine the one or more transmission beam parameters for beam failure recovery by determining, based on the RS resource index associated with uplink, a transmission beam of the wireless device; and
transmit the uplink information by transmitting, based on the transmission beam of the wireless device, the uplink information.

63. The system of claim 61, wherein the one or more configuration parameters comprise configuration parameters of a physical uplink control channel (PUCCH) for beam failure recovery, and
wherein the uplink information comprises at least one of:
a scheduling request for beam failure recovery; or
the first candidate RS resource index.

64. The system of claim 61, wherein the first candidate RS resource index indicates at least one of:
a channel state information RS resource; or
a synchronization signal block resource.

65. The system of claim 61, wherein the RS resource index associated with uplink transmission indicates at least one of:
a channel state information RS resource;
a synchronization signal block resource; or
a sounding reference signal resource.

66. The system of claim 61, wherein the uplink channel comprises a physical uplink control channel (PUCCH).

67. The system of claim 61, wherein the uplink information indicates the first candidate RS resource index.

68. The system of claim 61, wherein the wireless device is configured to transmit a capability indication message indicating that a beam correspondence is supported.

69. The system of claim 61, wherein the wireless device is configured to transmit a capability indication message indicating that a beam correspondence is not supported.

70. The system of claim 61, wherein the wireless device is configured to:
determine a beam failure associated with a secondary cell; and
transmit the uplink information by transmitting, based on the beam failure associated with the secondary cell, the uplink information.

71. The system of claim 61, wherein the base station is configured to:
determine, based on the RS resource index associated with uplink, one or more beam parameters for beam failure recovery; and
determine, after receiving the uplink information, a first candidate RS resource index, of the plurality of candidate RS resource indexes, for beam failure recovery.

72. The system of claim 61, wherein:
the first candidate RS resource index is associated with a candidate beam of the base station; and
the base station is configured to:
determine one or more beam parameters for beam failure recovery by determining, based on the RS resource index associated with uplink, a reception beam of the base station that is associated with a transmission beam of a wireless device; and
receive the uplink information by receiving, based on the reception beam of the base station, the uplink information.

73. The system of claim 61, wherein the base station is configured to:
determine, after receiving the uplink information, a beam failure associated with a secondary cell; and
transmit, via a beam associated with the first candidate RS resource index, downlink information.

* * * * *

UNITED STATES PATENT AND TRADEMARK OFFICE
CERTIFICATE OF CORRECTION

PATENT NO. : 11,310,859 B2
APPLICATION NO. : 17/157352
DATED : April 19, 2022
INVENTOR(S) : Zhou et al.

It is certified that error appears in the above-identified patent and that said Letters Patent is hereby corrected as shown below:

On the Title Page

Page 3, Column 2, item (56) Other Publications, Line 72:
Delete "Incorpated," and insert --Incorporated,-- therefor Page 4, Column 1, item (56) Other Publications, Line 12:
Delete "Extented" and insert --Extended-- therefor Page 6, Column 2, item (56) Other Publications, Line 22:
Delete "Dormat" and insert --Dormant-- therefor Page 8, Column 1, item (56) Other Publications, Line 12:
Delete "Remaing" and insert --Remaining-- therefor Page 8, Column 1, item (56) Other Publications, Line 35:
Delete "mutli-CC" and insert --multi-CC-- therefor In the Specification Column 10, Detailed Description, Line 51:
Delete "MasterinformationBlock" and insert --MasterInformationBlock-- therefor Column 12, Detailed Description, Line 51:
After "2", insert --, 120B-- therefor Column 14, Detailed Description, Line 12:
After "channel", insert --.-- therefor Column 24, Detailed Description, Line 66:
Delete "statin" and insert --station-- therefor Signed and Sealed this
First Day of August, 2023

Katherine Kelly Vidal
*Director of the United States Patent and Trademark Office*

CERTIFICATE OF CORRECTION (continued)
U.S. Pat. No. 11,310,859 B2

Column 27, Detailed Description, Line 8:
Delete "1119)." and insert --1118).-- therefor Column 30, Detailed Description, Line 53:
After "running", insert --.-- therefor Column 31, Detailed Description, Line 52:
Delete "1250," and insert --1240,-- therefor Column 32, Detailed Description, Line 36:
After "channel", insert --.-- therefor Column 35, Detailed Description, Line 64:
After "device", insert --.-- therefor Column 36, Detailed Description, Line 1:
After "network", insert --.-- therefor Column 36, Detailed Description, Line 58:
Delete "1610" and insert --1602-- therefor Column 44, Detailed Description, Line 5:
After "valid", delete "¶"

Column 51, Detailed Description, Line 7:
Delete "1902" and insert --1920-- therefor Column 60, Detailed Description, Line 39:
After "resource.", delete "¶"

Column 63, Detailed Description, Line 37:
Delete "Lab VIEWMathScript." and insert --LabVIEWMathScript.-- therefor Column 64, Detailed Description, Lines 18-19:
After "manner", insert --.-- therefor